(12) United States Patent
Jiang

(10) Patent No.: US 11,960,890 B2
(45) Date of Patent: Apr. 16, 2024

(54) HETEROGENEOUS EMBEDDED METHOD AND DEVICE FOR TABULAR PROCESSING AND EXECUTION OF OPERATION FLOW

(71) Applicant: SHANGHAI BAOJIE INTELLIGENT TECHNOLOGY CO., LTD., Shanghai (CN)

(72) Inventor: Zhifeng Jiang, Shanghai (CN)

(73) Assignee: SHANGHAI BAOJIE INTELLIGENT TECHNOLOGY CO., LTD., Shanghai (CN)

( * ) Notice: Subject to any disclaimer, the term of this patent is extended or adjusted under 35 U.S.C. 154(b) by 263 days.

(21) Appl. No.: 17/764,534

(22) PCT Filed: Sep. 30, 2020

(86) PCT No.: PCT/CN2020/119383
§ 371 (c)(1),
(2) Date: Mar. 28, 2022

(87) PCT Pub. No.: WO2021/068840
PCT Pub. Date: Apr. 15, 2021

(65) Prior Publication Data
US 2022/0350601 A1 Nov. 3, 2022

(30) Foreign Application Priority Data

Oct. 8, 2019 (CN) .......................... 201910949220.1

(51) Int. Cl.
*G06F 9/30* (2018.01)
*G06F 9/38* (2018.01)

(52) U.S. Cl.
CPC .......... *G06F 9/3005* (2013.01); *G06F 9/3838* (2013.01)

(58) Field of Classification Search
None
See application file for complete search history.

(56) References Cited

U.S. PATENT DOCUMENTS 7,139,271 B1 * 11/2006 Parruck ............... H04L 12/5601
370/476
7,266,088 B1 * 9/2007 Virgin ................... H04L 43/026
709/224

(Continued)

FOREIGN PATENT DOCUMENTS

| CN | 105867294 A | 8/2016 |
| CN | 107015491 A | 8/2017 |

(Continued)

*Primary Examiner* — Philip Wang
(74) *Attorney, Agent, or Firm* — H&I PARTNERS; Chai Im; C. Andrew Im

(57) ABSTRACT

Method and device for tabular processing and execution of operation flow, and generation of an operation flow table by the same. The flow steps of the operation flow are sequentially acquired and the continuous flow steps in the operation flow are combined into a flow step sequence corresponding to the operation flow type according to the predetermined flow step sequence combination rule. Based on a predetermined row generation rule corresponding to the flow step sequence having the operation flow types, in the operation flow table, the operation flow table rows corresponding to the flow step sequence are sequentially generated until all the flow steps are processed and a final operation flow table is outputted. The operation flow table is executed by the aforesaid method and device. The editing, processing and execution of the complex operation flow can be made more concise and efficient by the aforesaid operation flow processing.

15 Claims, 8 Drawing Sheets

(56) References Cited

U.S. PATENT DOCUMENTS

| | | | |
|---|---|---|---|
| 2004/0049622 A1* | 3/2004 | Opaterny | G05B 19/0426 |
| | | | 710/268 |
| 2008/0086724 A1* | 4/2008 | Ogata | G05B 19/4155 |
| | | | 717/162 |
| 2010/0031137 A1 | 2/2010 | Amaral et al. | |
| 2018/0181435 A1* | 6/2018 | Ebine | G06F 9/4881 |
| 2019/0158388 A1* | 5/2019 | Bianchi | H04L 45/64 |
| 2020/0371513 A1* | 11/2020 | Morisawa | G05B 23/0283 |

FOREIGN PATENT DOCUMENTS

| | | |
|---|---|---|
| CN | 107368055 A | 11/2017 |
| CN | 108256716 A | 7/2018 |
| CN | 110632878 A | 12/2019 |

* cited by examiner

FIG. 10

| | condition | | | instruction | switching target | |
|---|---|---|---|---|---|---|
| 40000 | | | | | | 40001 |
| | TRUE — 611 — 612 — 613 | | | switch (manipulator_state) | | |
| 6211 | index | comment | indicator state | | | 41001 |
| 41000 | 100 | manipulator stopping | yellow_on | | | 21001 |
| 21000 | ● manipulator_start — 6212 — 6213 | | | manipulator_start = false; | | 21101 |
| 21100 | ● workpiece_in_manipulator_jaws | | | manipulator_place_start(); | | 21102 |
| | ○ protective_door_open_properly && workpiece_in_output_area | | | manipulator_grasp_start(); | manipulator_state = 400; | 21103 |
| 6221 | ○ ELSE — 6222 — 6223 | | | | manipulator_state = 300; | 41002 |
| 22000 | 200 | manipulator waiting to grasp workpiece | yellow_on | | | 22001 |
| 22100 | ● manipulator_start | | | manipulator_start = false; | | 22101 |
| | ● protective_door_open_properly && workpiece_in_output_area | | | manipulator_grasp_start(); | manipulator_state = 400; | 22102 |
| 6231 | ○ ELSE — 6232 — 6233 | | | | manipulator_state = 300; | 41003 |
| 23000 | 300 | manipulator workpiece grasping error alarm | red_on | | | 23001 |
| 6241 | ● — 6242 — 6243 | | | | | 41004 |
| 24000 | 400 | manipulator grasping workpiece | green_on | | | 24001 |
| 6251 | ● manipulator_grasp_done — 6252 — 6253 | | | manipulator_place_start(); | manipulator_state = 500; | 41005 |
| 25000 | 500 | manipulator placing workpiece | green_on | | | 25001 |
| 25100 | ● manipulator_place_done | | | | | 25101 |
| | ● workpiece_in_manipulator_jaws | | | | manipulator_state = 600; | 25102 |
| 6261 | ○ ELSE — 6262 — 6263 | | | | manipulator_state = 200; | 41006 |
| 26000 | 600 | manipulator workpiece placing error alarm | red_on | | | 25001 |
| | ● | | | | | |

FIG. 11

| | condition | | | instruction | switching target | |
|---|---|---|---|---|---|---|
| ● | TRUE | | | switch (machine_tool_state) | | |
| | | index | comment | protective door state | | |
| | | "100" | machine_tool_stopping | | | |
| | ● | machine_tool_start | | | machine_tool_start = false; | |
| | | ● | workpiece_in_output_area | | | |
| | | | ● | !(protective_door_open_properly) | protective_door_open = true; | machine_tool_state = 400; |
| | | | ○ | ELSE | manipulator_start = true; | machine_tool_state = 500; |
| | | ○ | !(protective_door_close_properly) | | protective_door_open = false; | machine_tool_state = 200; |
| | | ○ | ELSE | | machine_tool_work_start(); | machine_tool_state = 300; |
| | | "200" | machine_tool_protective_door_closing | protective_door_closing | | |
| | ● | protective_door_close_properly | | | machine_tool_work_start(); | machine_tool_state = 300; |
| | | "300" | machine_tool_working | protective_door_closed | | |
| | ● | machine_tool_work_done | | | protective_door_open = true; | machine_tool_state = 400; |
| | | "400" | machine_tool_protective_door_opening | protective_door_opening | | |
| | ● | protective_door_open_properly | | | manipulator_start = true; | machine_tool_state = 500; |
| | | "500" | machine_tool_waiting_to_grasp_workpiece | protective_door_opened | | |
| | ● | manipulator_grasp_done && !(workpiece_in_output_area) | | | protective_door_open = false; | machine_tool_state = 200; |

FIG. 12

| index | comment | protective door state | | condition | instruction | switching target |
|---|---|---|---|---|---|---|
| | | | ● | TRUE | switch (machine_tool_state) | |
| "100" | machine_tool_stopping | | | machine_tool_start | machine_tool_start = false; | |
| | | | | workpiece_in_output_area | | |
| | | | ● | !(protective_door_open_properly) | protective_door_open = true; | machine_tool_state = 400; |
| | | | ○ | ELSE | manipulator_start = true; | machine_tool_state = 500; |
| | | | ○ | !(protective_door_close_properly) | protective_door_open = false; | machine_tool_state = 200; |
| | | | ○ | ELSE | machine_tool_work_start(); | machine_tool_state = 300; |
| "200" | machine_tool_protective_door_closing | protective_door_closing | ● | protective_door_close_properly | machine_tool_work_start(); | machine_tool_state = 300; |
| "300" | machine_tool_working | protective_door_closed | ● | machine_tool_work_done | protective_door_open = true; | machine_tool_state = 400; |
| "400" | machine_tool_protective_door_opening | protective_door_opening | ● | protective_door_open_properly | manipulator_start = true; | machine_tool_state = 500; |
| "500" | machine_tool_waiting_to_grasp_workpiece | protective_door_opened | ● | manipulator_grasp_done && !(workpiece_in_output_area) | protective_door_open = false; | machine_tool_state = 200; |

HETEROGENEOUS EMBEDDED METHOD AND DEVICE FOR TABULAR PROCESSING AND EXECUTION OF OPERATION FLOW

RELATED APPLICATIONS

This application is a § 371 application of PCT/CN2020/119383 filed Sep. 30, 2020, which claims priority from Chinese Patent Application No. 201910949220.1 filed Oct. 8, 2019, each of which is incorporated herein by reference in its entirety.

FIELD OF THE INVENTION

The present invention belongs to the field of automatic control, and in particular relates to a heterogeneous embedded method and device for tabular processing and execution of operation flow.

BACKGROUND OF THE INVENTION

In the field of automatic control, text-based program codes, such as Basic, Pascal, C, etc., are usually used for compiling and executing operation flows to realize automatic control.

However, for complex operation flows, the amount of program codes is usually very large, the program structure is very complex, and the readability of the codes is poor. In addition, the traditional text-based program not only has a large input workload when compiling, but also needs to parse and process a large number of text-based grammar in instructions during program parsing or execution, such as: IF, THEN, ELSIF, ELSE, END_IF, etc. This process consumes computer resources and affects the performance of operation flow parsing or execution.

SUMMARY OF THE INVENTION

In order to solve the aforementioned problems, a heterogeneous embedded method and device for tabular processing and execution of operation flow that make the compilation and/processing of a complex operation flow more concise and efficient are provided.

The present invention provides a method for tabular processing of operation flow, used for processing an operation flow comprising a plurality of flow steps, characterized by comprising: step S1, creating an operation flow table; step S2, sequentially acquiring the flow steps of the operation flow and sequentially determining the operation flow types corresponding to each of the flow steps in the operation flow; step S3, combining, according to a predetermined flow step sequence, the continuous flow steps in the operation flow into at least one flow step sequence corresponding to the operation flow types; step S4, sequentially acquiring the flow step sequence from the operation flow, according to the operation flow type of the flow step sequence, on the basis of a predetermined row generation rule corresponding to the flow step sequence having the operation flow types, sequentially generating, in the operation flow table, operation flow table rows corresponding to the flow step sequence; step S5, judging whether the flow steps have all been acquired, if it is judged to be no, returning to said step S2, if it is judged to be yes, obtaining and outputting the final operation flow table, wherein, the operation flow table comprises a condition column and an instruction column, each of the operation flow table rows comprises a condition cell positioned at the condition column and an instruction cell positioned at the instruction column, the condition cell is at least configured to add the flow step for executing determination in the operation flow and to take the flow step as execution condition corresponding to the instruction cell in the same operation flow table row, the instruction cell is at least configured to add the flow step for executing operation in the operation flow as operation instruction.

Further, the method for tabular processing of operation flow is characterized by that: wherein, the operation flow types comprises at least an instruction type operation flow, the instruction type operation flow comprises at least one continuous flow step as an operation instruction, the flow step combination rule for the corresponding instruction type operation flow is combining the continuous flow step into an operation instruction type flow step sequence, the predetermined row generation rule corresponding to the operation instruction type flow step sequence is: step A1, sequentially generating an operation flow table row as a current operation flow table row in the operation flow table; step A2, adding a true value as execution condition to the condition cell of the current operation flow table row; step A3, sequentially acquiring the flow steps in the corresponding operation instruction type flow step sequence and adding the flow steps to the instruction cell of the current operation flow table row.

Further, the method for tabular processing of operation flow is characterized by that: wherein, the operation flow type further comprises a conditional branch operation flow, the conditional branch operation flow comprises at least one branch operation flow and mutually exclusive execution conditions corresponding to each of the branch operation flow, the flow step combination rule for the conditional branch operation flow is combining the branch operation flow in the conditional branch operation flow and the execution condition corresponding to the branch operation flow into a conditional branch type flow step sequence, the predetermined row generation rule corresponding to the conditional branch type flow step sequence is: step B1, sequentially generating corresponding operation flow table rows in the operation flow table according to the conditional branch type flow step sequence; step B2, adding the execution conditions corresponding to the conditional branch type flow step sequence to the condition cell of the operation flow table rows, and setting the generated operation flow table rows to be mutually exclusive; step B3, for the conditional branch type flow step sequence, sequentially acquiring the flow steps in the branch operation flow and sequentially determining the corresponding operation flow type corresponding to each of the flow steps in the corresponding branch operation flow, further, combining the continuous flow steps in the conditional branch type flow step sequence into at least one sub-flow step sequence having corresponding operation flow type according to a predetermined flow step sequence combination rule, if the first sub-flow step sequence is an instruction type flow step sequence, sequentially adding each flow step in the sub-flow step sequence as an operation instruction to the instruction cell of the operation flow table row of the corresponding branch operation flow, if the sub-flow step sequence is conditional branch type flow step sequence, generating a sub-operation flow table corresponding to the corresponding branch operation flow, and sequentially generating operation flow table rows corresponding to the sub-flow step sequence in the sub-operation flow table based on the predetermined row generation rule corresponding to the conditional branch type flow step sequence, the sub-operation flow table is hierarchically embedded under the operation flow table rows corresponding to the branch operation flow.

Further, the method for tabular processing of operation flow is characterized by that: wherein, the operation flow type further comprises a switching branch operation flow, the switching branch operation flow comprises a plurality of branch operation flows, branch switching instruction for switching the branch operation flow and mutually exclusive branch index conditions corresponding to the branch operation flows, the flow step combination rule for the switching branch operation flow is combining each branch operation flow included in the switching branch operation flow and a corresponding branch index condition into a switching branch type flow step sequence, the predetermined row generation rule corresponding to the switching branch type flow step sequence is: step C1, if the continuous flow steps before the flow steps of the corresponding branch switching instruction belong to the operation instruction type flow step sequence, taking the operation flow table row generated according to the operation instruction type flow step sequence as current operation flow table row; step C2, adding the flow steps corresponding to the branch switching instruction as operation instruction to the instruction cell of the current operation flow table row; step C3, generating a branch operation flow table corresponding to the switching branch type flow step sequence, the branch operation flow table is hierarchically embedded under the current operation flow table row, and the branch operation flow table comprises index columns; step C4, for each of the branch operation flow, sequentially generating, in the branch operation flow table, branch operation flow table rows comprising index cells positioned at the index columns, and adding the branch index conditions to the index cells, meanwhile, creating a sub-operation flow table hierarchically embedded under the branch operation flow table row; step C5, for each of the sub-operation flow tables, sequentially acquiring the flow steps in the corresponding branch operation flow, and sequentially determining the operation flow type corresponding to each of the flow steps in the corresponding branch operation flow, further, respectively combining the continuous flow steps in the branch operation flow into at least one sub-flow step sequence having the corresponding operation flow type according to a predetermined flow step sequence combination rule, and further, sequentially generating operation flow table rows corresponding to the sub-flow step sequence in the sub-operation flow table based on the predetermined row generation rule corresponding to the type of the flow step sequence, the branch switching instruction is used for determining the corresponding branch index condition according to the target index variable, and switching execution of operation flow table rows having the corresponding branch index value.

Further, the method for tabular processing of operation flow is characterized by that: wherein, the branch operation flow table further comprises a switching target column, the branch operation flow table row further comprises a switching target cell positioned at the switching target column, the switching target cell is added with the flow step for setting the value of the target index variable as a switching instruction.

Further, the method for tabular processing of operation flow is characterized by that: wherein, the branch operation flow table further comprises a branch state column, and the operation flow table row further comprises a branch state cell positioned at the branch state column, the branch state cell is added with an operation instruction for assigning state variable corresponding to the branch operation flow.

Further, the method for tabular processing of operation flow is characterized by that: wherein, the operation flow types further comprise a loop operation flow, the loop operation flow comprises an execution condition and a loop sub-flow, the operation flow table further comprises loop attribute column, the operation flow table row comprises a loop attribute cell positioned at the loop attribute column, the flow step combination rule for the loop operation flow is combining the execution condition of the loop operation flow and the loop sub-flow into loop operation flow step sequence, the predetermined row generation rule corresponding to the loop operation flow step sequence is: step D1, sequentially generating an operation flow table row as current operation flow table row in the operation flow table; step D2, adding the current flow step as execution condition to the condition cell of the current operation flow table row, and adding a loop execution attribute in the loop attribute cell; step D3, sequentially acquiring the flow steps in the loop sub-flow, and sequentially determining operation flow type corresponding to each of the flow steps in the loop sub-flow, further, combining the continuous flow steps in the loop operation flow step sequence into sub-flow step sequence having the corresponding operation flow type according to the predetermined flow step sequence combination rule, if the first sub-flow step sequence is an operation instruction type flow step sequence, adding the flow steps in the sub-flow step sequence as operation instruction to the instruction cell of the operation flow table row of the corresponding branch operation flow, if the sub-flow step sequence is a conditional branch type flow step sequence, generating a sub-operation flow table corresponding to the corresponding branch operation flow, and sequentially generating operation flow table rows corresponding to the sub-flow step sequence in the sub-operation flow table based on the predetermined row generation rule corresponding to the conditional branch type flow step sequence, the sub-operation flow table is hierarchically embedded under the operation flow table row corresponding to the branch operation flow.

The present invention also provides a method for executing operation flow according to operation flow table, used for executing operation flow according to the operation flow table obtained by method for tabular processing of operation flow, the method for tabular processing of operation flow comprises: step S1, creating an operation flow table; step S2, sequentially acquiring the flow steps of the operation flow and sequentially determining the operation flow types corresponding to each of the flow steps in the operation flow; step S3, combining, according to a predetermined flow step sequence, the continuous flow steps in the operation flow into at least one flow step sequence corresponding to the operation flow types; step S4, sequentially acquiring the flow step sequence from the operation flow, according to the operation flow type of the flow step sequence, on the basis of a predetermined row generation rule corresponding to the flow step sequence having the operation flow types, sequentially generating, in the operation flow table, operation flow table rows corresponding to the flow step sequence; step S5, judging whether the flow steps have all been acquired, if it is judged to be no, returning to said step S2, if it is judged to be yes, obtaining and outputting the final operation flow table, wherein, the operation flow table comprises a condition column and an instruction column, each of the operation flow table rows comprises a condition cell positioned at the condition column and an instruction cell positioned at the instruction column, the condition cell is at least configured to add the flow step for executing determination in the operation flow and to take the flow step as execution condition corresponding to the instruction cell in the same operation flow table row, the instruction cell is at least configured to add the flow step for executing operation in the operation flow as operation instruction, the method for executing operation flow according to operation flow table comprises: step S11, sequentially acquiring operation flow table rows from the operation flow table as current operation flow table row; step S12, judging whether execution condition of condition cell of the current operation flow table row is true value, if it is judged to be no, return to step S11; step S13, acquiring and executing operation instructions in instruction cell of the current operation flow table row; step S14, judging whether all the flow steps in the operation flow table have been executed, if it judged to be no, return to step S11, if it is judged to be yes, the operation flow has been executed.

Further, the method for executing operation flow according to operation flow table is characterized by that the method for tabular processing of operation flow further comprises: the operation flow type comprises at least operation instruction type operation flow and a conditional branch operation flow, the conditional branch operation flow comprises at least one branch operation flow and mutually exclusive execution conditions corresponding to each of the branch operation flow, the flow step combination rule for the conditional branch operation flow is combining the branch operation flow in the conditional branch operation flow and the execution condition corresponding to the branch operation flow into a conditional branch type flow step sequence, the predetermined row generation rule corresponding to the conditional branch type flow step sequence is: step B1, sequentially generating corresponding operation flow table rows in the operation flow table according to the conditional branch type flow step sequence; step B2, adding the execution conditions corresponding to the conditional branch type flow step sequence to the condition cell of the operation flow table rows, and setting the generated operation flow table rows to be mutually exclusive; step B3, for the conditional branch type flow step sequence, sequentially acquiring the flow steps in the branch operation flow and sequentially determining the corresponding operation flow type corresponding to each of the flow steps in the corresponding branch operation flow, further, combining the continuous flow steps in the conditional branch type flow step sequence into at least one sub-flow step sequence having corresponding operation flow type according to a predetermined flow step sequence combination rule, if the first sub-flow step sequence is instruction type flow step sequence, sequentially adding each flow step in the sub-flow step sequence as operation instruction to the instruction cell of the operation flow table row of the corresponding branch operation flow, if the sub-flow step sequence is conditional branch type flow step sequence, generating a sub-operation flow table corresponding to the corresponding branch operation flow, and sequentially generating operation flow table rows corresponding to the sub-flow step sequence in the sub-operation flow table based on the predetermined row generation rule corresponding to the conditional branch type flow step sequence, the sub-operation flow table is hierarchically embedded under the operation flow table rows corresponding to the branch operation flow, the method for executing operation flow according to operation flow table further comprises: step B11, sequentially acquiring operation flow table rows from the operation flow table as current operation flow table row; step B12, judging whether execution condition of condition cell of the current operation flow table row is true value, if it is judged to be no, return to step B11; step B13, acquiring and executing operation instructions in instruction cell of the current operation flow table row; step B14, judging whether there is the sub-operation flow embedded under the current operation flow table row, if it is judged to be yes, executing the sub-operation flow table until the sub-operation flow table is executed; step B15, judging whether all the flow steps in the operation flow table have been executed, if it is judged to be no, acquiring next operation flow table row whose execution condition is non-mutually exclusive with the execution condition in condition cell of the current operation flow table row as current operation flow table row, and return to step B12, if it judged to be yes, the operation flow has been executed.

Further, the method for executing operation flow according to operation flow table is characterized by that the method for tabular processing of operation flow further comprises: the operation flow type further comprises a switching branch operation flow, the switching branch operation flow comprises a plurality of branch operation flows, a branch switching instruction for switching the branch operation flow and mutually exclusive branch index conditions corresponding to the branch operation flows, the flow step combination rule for the switching branch operation flow is combining each branch operation flow included in the switching branch operation flow and a corresponding branch index condition into a switching branch type flow step sequence, the predetermined row generation rule corresponding to the switching branch type flow step sequence is: step C1, if the continuous flow steps before the flow steps of the corresponding branch switching instruction belong to the operation instruction type flow step sequence, taking the operation flow table row generated according to the operation instruction type flow step sequence as current operation flow table row; step C2, adding the flow steps corresponding to the branch switching instruction as operation instruction to the instruction cell of the current operation flow table row; step C3, generating a branch operation flow table corresponding to the switching branch type flow step sequence, the branch operation flow table is hierarchically embedded under the current operation flow table row, and the branch operation flow table comprises index columns; step C4, for each of the branch operation flow, sequentially generating, in the branch operation flow table, branch operation flow table rows comprising index cells positioned at the index columns, and adding the branch index conditions to the index cells, meanwhile, creating sub-operation flow tables hierarchically embedded under the branch operation flow table row; step C5, for each of the sub-operation flow tables, sequentially acquiring the flow steps in the corresponding branch operation flow, and sequentially determining operation flow type corresponding to each of the flow steps in the corresponding branch operation flow, further, respectively combining the continuous flow steps in the branch operation flow into at least one sub-flow step sequence having the corresponding operation flow type according to a predetermined flow step sequence combination rule, and further, sequentially generating operation flow table rows corresponding to the sub-flow step sequence in the sub-operation flow table based on the predetermined row generation rule corresponding to the type of the flow step sequence, the branch switching instruction is used for determining the corresponding branch index condition according to the target index variable, and switching execution of operation flow table rows having the corresponding branch index value, the method for executing operation flow according to operation flow table further comprises: step C11, sequentially acquiring operation flow table rows from the operation flow table as current operation flow table row; step C12, judging whether execution condition in condition cell of the current operation flow table row is true value, if it is judged to be no, return to step C11; step C13, acquiring operation instruction in instruction cell of the current operation flow table row, and judging whether the operation instruction is branch switching instruction, if it is judged to be yes, acquiring the branch operation flow table corresponding to the branch switching instruction embedded under the current operation flow table row, and acquiring branch operation flow table row in which branch index value of the index cell is consistent with value of the target index variable from the branch operation flow table rows, further, acquiring the first operation flow table row of the sub-operation flow table embedded under the branch operation flow table row as current operation flow table row, and return to step C12, if it is judged to be no, executing the operation instruction; step C14, judging whether there is the branch operation flow table embedded under the current operation flow table row, if it is judged to be yes, executing the branch operation flow table until the branch operation flow table has been executed; step C15, judging whether all the flow steps in the operation flow table have been executed, if it is judged to be no, acquiring the next operation flow table row whose execution condition is non-mutually exclusive with the execution condition in condition cell of the current operation flow table row as current operation flow table row, and return to step C12, if it is judged to be yes, the operation flow has been executed.

Further, the method for executing operation flow according to operation flow table is characterized by that the method for tabular processing of operation flow further comprises: wherein, the branch operation flow table further comprises a switching target column, the branch operation flow table row further comprises a switching target cell positioned at the switching target column, the switching target cell is added with the flow step for setting value of the target index variable as a switching instruction, the method for executing operation flow according to operation flow table further comprises: wherein, the step C13 further comprises acquiring the switching instruction of the switching target cell and executing the switching instruction.

Further, the method for executing operation flow according to operation flow table is characterized by that the method for tabular processing of operation flow further comprises: wherein, the branch operation flow table further comprises a branch state column, the operation flow table row further comprises a branch state cell positioned at the branch state column, the branch state cell is added with operation instruction for assigning value to the state variable corresponding to the branch operation flow, wherein, in the step C13, when acquiring the branch operation flow table row in which the branch index value of the index cell is consistent with the value of the target index variable, the operation instruction in the branch state cell is also acquired and the state variable is assigned a value.

Further, the method for executing operation flow according to operation flow table is characterized by that the method for tabular processing of operation flow further comprises: the operation flow type further comprises a loop operation flow, the loop operation flow comprises an execution condition and a loop sub-flow, the operation flow table further comprises a loop attribute column, the operation flow table row comprises a loop attribute cell positioned at the loop attribute column, the flow step combination rule for loop operation flow is, combining execution condition of the loop operation flow and the loop sub-flow into a loop operation flow step sequence, the predetermined row generation rule corresponding to the loop operation flow step sequence is: step D1, sequentially generating an operation flow table row as current operation flow table row in the operation flow table; step D2, adding the current flow step as execution condition to the condition cell of the current operation flow table row, and adding a loop execution attribute in the loop attribute cell; step D3, sequentially acquiring the flow steps in the loop sub-flow, and sequentially determining operation flow type corresponding to each of the flow steps in the loop sub-flow, further, combining the continuous flow steps in the loop operation flow step sequence into sub-flow step sequence having the corresponding operation flow type, if the first sub-flow step sequence is an operation instruction type flow step sequence, adding the flow steps in the sub-flow step sequence as operation instruction to the instruction cell of the operation flow table row of the corresponding branch operation flow, if the sub-flow step sequence is a conditional branch type flow step sequence, generating a sub-operation flow table corresponding to the corresponding branch operation flow, and sequentially generating operation flow table rows corresponding to the sub-flow step sequence in the sub-operation flow table based on the predetermined row generation rule corresponding to the conditional branch type flow step sequence, the sub-operation flow table is hierarchically embedded under the operation flow table row corresponding to the branch operation flow, the method for executing operation flow according to operation flow table further comprises: step D11, sequentially acquiring an operation flow table row from the operation flow table as current operation flow table row; step D12, judging whether the execution condition of the current operation flow table row is true value, if it is judged to be no, return to step D11; step D13, acquiring operation instruction in instruction cell of the current operation flow table row and executing the operation instruction; step D14, judging whether there is the sub-operation flow table embedded under the current operation flow table row, if it is judged to be yes, executing the sub-operation flow table until the sub-operation flow table has been executed; step D15, judging whether the loop attribute cell of the current operation flow table row has a loop execution attribute, and if it is judged to be yes, return to step D12, repeating executing the current operation flow table row; step D16, judging whether all the flow steps in the operation flow table have been executed, if it is judged to be no, acquiring a next operation flow table row whose execution condition is non-mutually exclusive with the execution condition in condition cell of the current operation flow table row as current operation flow table row, and return to step D12, if it is judged to be yes, ending the execution of the operation flow.

The present invention also provides a device for tabular processing of operation flow, characterized by comprising: a memory, for storing computer programs; a processor, for implementing the method for tabular processing of operation flow according to the claimed invention when executing the computer programs.

The present invention also provides a device for executing operation flow according to operation flow table, characterized by comprising: a memory, for storing computer programs; a processor, for implementing the method for tabular processing of operation flow according to the claimed invention when executing the computer programs.

The heterogeneous embedded method and device for tabular processing and execution of operation flow according to the present invention have the following advantages:

1. The operation flow is processed as an operation flow table and executed based on the operation flow table, it is no longer necessary to process verbose syntax instructions like IF, THEN, ELSIF, ELSE, END_IF, etc., like high-level text-based languages, therefore reducing program input workload and program file size. For computer, the retrieval and processing of data table is faster than the analysis of text program, therefore improving the efficiency of the computer processing operation flow.

2. By tabulating the operation flow and dividing the operation flow into a plurality of columns according to the conditions and instructions, the length of the program is greatly shortened, the content of the program is more concise, the screen display space is better utilized and the complex operation flow is easier to browse and edit. Meanwhile, the layout of the multi-column table makes the separation of different types of flow steps higher, which is conducive to discovering the detailed differences between the operation flows, so as to detect program errors in time.

3. The hierarchically embedded operation flow table and branch operation flow table can be used to precisely define complex operation flow and replace text-based high-level language programs, therefore making the structure of the operation flows clearer and improving the readability of the complex operation flows.

4. By the tabular processing of the complex operation flows, the generated operation flow table retains the details of the original operation flow, therefore, the operation flow table can be executed after editing, achieving control of the complex operation flows, which is used for controlling the operation of physical devices.

5. The operation flow table is easy to process with spreadsheet editing tool, and the operation flows can be compiled and processed by using the convenient function of the spreadsheet editing tool. Further, the operation flow table can directly use existing spreadsheet data as input, thereby reducing manual input and conversion steps.

6. The operation flow table are based on tables, rows, columns and cells. Compared with text instructions, the operation flow table is easier to set up and carry rich formatting and annotation information. Further, the operation flow table is displayed and stored, so as to more clearly reflect the editing and execution state of the operation flows and the intention of the program.

BRIEF DESCRIPTION OF THE DRAWINGS

FIG. 10 shows an operation flow table of the manipulator sub-flow in embodiment 2 of the present invention;

FIG. 11 shows an operation flow table of the machine tool sub-flow in embodiment 2 of the present invention;

FIG. 12 shows an operation flow table of the machine tool sub-flow in embodiment 2 of the present invention.

DETAILED DESCRIPTION OF THE PREFERRED EMBODIMENTS

Figure 1:
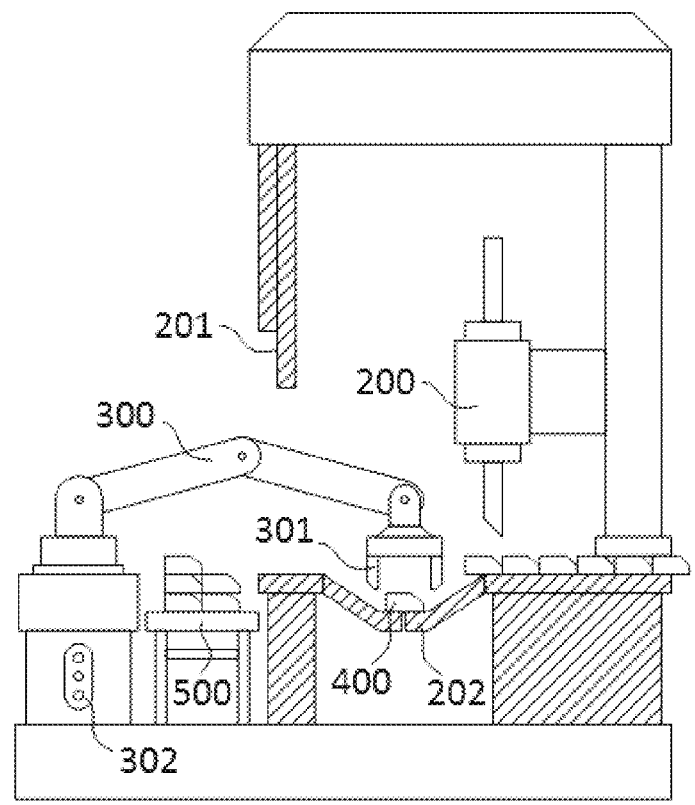
FIG. 1 shows a schematic cross-sectional view of the grasping state of an automated production system manipulator in embodiment 1 of the present invention.

As a first implementation form, the present invention provides a method for tabular processing of operation flow, the operation flow comprises a plurality of flow steps. The flow steps can be operation instructions and/conditional branch operation flows. The conditional branch operation flow comprises an execution condition, a first branch operation flow and/a second branch operation flow. If the execution condition is true, executing the first branch operation flow, otherwise, executing the second branch operation flow. The method comprises: step 1: creating an operation flow table, the operation flow table comprises a condition column and a instruction column; step 2: adding an operation flow table row in the operation flow table, the operation flow table row comprises a condition cell corresponding to the condition column and a instruction cell corresponding to the instruction column; step 3, sequentially acquiring the flow steps of the operation flow and sequentially determining the operation flow types:

A. If the flow step is a conditional branch operation flow, adding the execution condition of the conditional branch operation flow to the condition cell of the operation flow table row; then sequentially acquiring the flow steps in the first branch operation flow of the conditional branch operation flow and judging:

a) if the subsequent flow step is an operation instruction, sequentially adding the subsequent operation instruction to the instruction cell of the operation flow table row;

b) if the subsequent flow step is a conditional branch operation flow, starting processing the conditional branch operation flow from step 1, taking the operation flow table created for the conditional branch operation flow in step 1 as a second operation flow table, further, hierarchically embedding the created second operation flow table under the operation flow table row; after completing the processing of the conditional branch operation flow, continue processing the subsequent flow steps in the first branch operation flow from step 2;

c) acquiring flow steps in the second branch operation flow of the conditional branch operation flow, and executing step 2 for the second branch operation flow, setting the operation flow table row and the operation flow table row added for the second branch operation flow in step 2 to be mutually exclusive; then returning to step 2 to continue processing the subsequent flow steps.

Further, the method for tabular processing of operation flow further comprises the steps of setting the two or one of the two operation flow table rows that are mutually exclusive in the format, thereby reflecting the mutually exclusive relationship between the two. In some embodiments of the present invention, for the two operation flow table rows that are mutually exclusive, the mutually exclusive relationship is reflected by drawing a connecting line segment between the two. In some other embodiments of the present invention, for a plurality of continuous mutually exclusive branch operation flows, setting a different symbol flag for the operation flow table row corresponding to the first branch operation flow and the operation flow table row corresponding to other mutually exclusive branch operation flows, thereby reflecting the mutually exclusive relationship of these branch operation flows.

B. If the flow step is an operation instruction, setting the condition cell of the operation flow table to represent a condition that is always true, and taking the condition that is always true as the execution condition of the subsequent operation instruction; further, sequentially adding the subsequent operation instruction to the instruction cell of the operation flow table row; until the subsequent flow step is a conditional branch operation flow, returning to step 2 to continue processing the subsequent flow steps.

In the first implementation form, as another aspect of the method for tabular processing of operation flow of the present invention, the condition cell of the operation flow table row is set to be empty or set to be a constant indicating true to indicate a condition that is always true. Further, for the second branch operation flow, if the first flow step of the second branch operation flow is an operation instruction rather than a conditional branch operation flow, setting the condition cell of the operation flow table row corresponding to the second branch operation flow to "else" representing the condition that is always true.

In some embodiments of the present invention, using a condition that always represents true as the content of the condition cell of the operation flow table and the execution condition of the subsequent operation instruction, so that the structure of the operation flow table is kept neat and consistent with the logic of the original operation flow.

Further, setting the second operation flow table to align with the parent operation flow table by column.

Further, the method further comprises setting the format for the second operation flow table accordingly to reflect the hierarchical relationship between the second operation flow table and the parent operation flow table row; in some embodiments of the present invention, for the condition cell of the operation flow table row of the second operation flow table, setting the indent width according to the level of the second operation flow table.

In the first implementation form, as another aspect of the method for tabular processing of operation flow of the present invention, the operation flows further comprises a loop operation flow, and the loop operation flow is executed cyclically according to the predetermined mode when the execution condition is met. The method is characterized by that: the operation flow table row further comprises a loop execution attribute, the method further comprises the step of judging that when the operation flow corresponding to the operation flow table row is a loop operation flow, setting the loop execution attribute value of the operation flow table row according to the loop mode of the operation flow.

Further, the loop execution attribute value comprises parameters of loop execution judgement, loop execution period and/loop execution task scheduling priority.

Further, the method further comprises the step of setting the format accordingly for the operation flow table row corresponding to the loop operation flow to reflect the loop execution attribute of the operation flow table row.

In the first implementation form, the operation flow further comprises a switching branch operation flow, the switching branch operation flow comprises a branch switching instruction and a branch operation flow, the branch operation flow comprises a target index variable, the branch operation flow comprises at least one branch index value, branch switching instruction is an operation instruction for judging the value of the target index variable and switching the execution of the branch operation flow in which the branch index value matches the value of the target index variable; the method is characterized by that the step 3 further comprises: judging whether the flow step is a switching branch operation flow, if so, adding the branch switching instruction for switching the branch operation flow to the instruction cell of the operation flow table row, and creating a branch operation flow table for the switching branch operation flow, further, embedding the branch operation flow table hierarchically under the operation flow table row; the branch operation flow table comprises a branch index column, adding a branch operation flow table row for each branch operation flow comprised in the switching branch operation flow, and the branch operation flow table row comprises an index cell corresponding to the index column of the branch operation flow table; the method further comprises adding the branch index value of the switching branch operation flow to the branch index value cell of the branch operation flow table row; then, sequentially executing from step 1 for each branch operation flow comprised in the switching branch operation flow, and embedding the operation flow table created in step 1 hierarchically under the branch operation flow table row corresponding to the branch operation flow.

In some embodiments of the present invention, the branch switching instruction corresponds to a set of mutually exclusive comparison branch index value and the value of the target index variable, this set of mutually exclusive conditional branch operation flows can be processed as a branch switching operation flow that judges the value of the target index variable and switches the execution of branch index value that matches the value of the target index variable.

Further, the branch operation flow table also comprises a comment column, the branch operation flow table row comprises a comment cell corresponding to the comment column, and the method further comprises the step of setting the content of the comment cell according to the meaning of each branch operation flow comprised in the switching branch operation flow.

Further, the operation flow table embedded under the branch flow table row is aligned by column with the upper operation flow table comprising the branch flow table.

In the first implementation form, the operation instruction of the operation flow further comprises an instruction for setting the value of the target index variable, and the method is characterized by that: the operation flow table further comprises a switching target column, correspondingly, the operation flow table row further comprises a switching target cell, in step 3, before adding the operation instruction to the instruction cell, it further comprises the steps of judging whether the operation instruction is an instruction for setting the value of the target index variable, if so, setting the content of the switching target cell according to the instruction for setting the target index variable value, and no longer adding the instruction for setting the target index variable value to the instruction cell of the operation flow table row.

Preferably, the switching target column for setting the operation flow table is positioned at the right side of the instruction column; by setting the switching target column of the operation flow table, the instruction of the switching target branch operation flow in the operation flow table is independent of other operation instructions, thereby improving the separation degree of different types of flow steps; the difference of different branch operation flow switching targets can be compared more clearly, and program errors can be found and avoided in time.

In the first implementation form, the switching branch operation flow further comprises a state variable, and the value of the state variable is determined according to the branch operation flow of the switching branch operation flow, the method is characterized by that: the branch operation flow table further comprises a branch state column, correspondingly, the branch operation flow table row comprises a branch state cell, and the method further comprises the steps of acquiring the state variable in the switching branch operation flow and setting the content of the branch state cell of the branch operation flow table row corresponding to the branch operation flow according to the value of the state variable determined by the branch operation flow of the switching branch operation flow. By setting the branch state column for the branch operation flow table, the differences for different branch operation flows can be compared more clearly, which is helpful to discover and avoid program errors in time and configure the flow steps of the branch operation flow quickly and accurately; also, it is helpful to improve the separation degree of flow steps, thereby reducing the number of rows in the action flow table and better utilizing the screen.

As a second implementation form, the present invention further provides a method for executing operation flow according to operation flow table, the method comprises: step 11, sequentially acquiring operation flow table rows from the operation flow table as current operation flow table row; step 12, judging whether the execution condition of condition cell of the current operation flow table row is true, if so, executing the following steps, otherwise, acquiring the next operation flow table row and returning to step 12 to start execution; step 13, acquiring and executing the operation instructions in instruction cell of the operation flow table row; step 14, judging whether there is an embedded second operation flow table under the operation flow table row, if so, for the second operation flow table, executing from step 11 until the second operation flow table is processed; step 15, acquiring the next operation flow table row that is not mutually exclusive with the operation flow table row, and returning to step 12 to repeat the execution.

In the second implementation form, step 12 of the method further comprises the steps of judging whether the operation flow table row is set with a loop execution attribute, and if so, when the execution condition in the condition cell of the operation flow table row is true, repeating step 12 to repeat executing the operation flow table row according to the loop mode set by the loop execution attribute value.

In the second implementation form, step 13 of the method further comprises the steps of judging whether the operation instruction is a branch switching instruction, and if so, acquiring the branch operation flow table embedded under the operation flow table row comprising the branch switching instruction, searching for the branch operation flow table row whose index cell content matches the value of the target index variable of the branch switching instruction, acquiring the operation flow table embedded under the branch operation flow table row, and starting processing the operation flow table from step 11.

In the second implementation form, step 13 of the method further comprises acquiring the content of the switching target cell of the operation flow table row, and executing the instruction for setting the value of the target index variable in the switching target cell.

Preferably, the instruction for setting the value of the target index variable in the switching target cell is executed after the operation instruction of the instruction cell is processed.

In the second implementation form, the method further comprises the steps of judging whether the branch state cell of the branch operation flow table row has been set, and if so, acquiring the content of the branch state cell of the branch operation flow table row, and setting the state variable value of the branch operation flow according to the content of the branch state cell.

As a third implementation form, the present invention further provides a device for tabular processing of operation flow, the flow steps of the operation flow comprises operation instruction and conditional branch operation flow, the conditional branch operation flow comprises an execution condition, a first branch operation flow and/a second branch operation flow, if the execution condition is true, executing the first branch operation flow, otherwise, executing the second branch operation flow, and the device comprises: an operation flow table creation part for creating an operation flow table, the operation flow table comprises a condition column and an instruction column; the created operation flow table is used by an operation flow table row creation part for further processing; the operation flow table row creation part for adding operation flow table rows to the operation flow table and calling the flow step processing part for processing, the operation flow table row comprises a condition cell corresponding to the condition column of the operation flow table and an instruction cell corresponding to the instruction column of the operation flow table; the created operation flow table row is used by a flow step processing part for further processing; the flow step processing part for sequentially acquiring the flow steps of the operation flow, and judging:

A. If the flow step is a conditional branch operation flow, adding the execution condition of the conditional branch operation flow to the condition cell of the operation flow table row; then sequentially acquiring the flow steps in the first branch operation flow of the conditional branch operation flow and judging:
  a) if the subsequent flow step is an operation instruction, then sequentially adding the subsequent operation instruction to the instruction cell of the operation flow table row;
  b) if the subsequent flow step is a conditional branch operation flow, processing the conditional branch operation flow by the operation flow table creation part, and taking the operation flow table created by the operation flow table creation part for the conditional branch operation flow as a second operation flow table, and embedding the created second operation flow table hierarchically under the operation flow table row; after the processing of the conditional branch operation flow is completed, continuing to process the subsequent flow steps in the first branch operation flow;
  c) acquiring the flow steps in the second branch operation flow of the conditional branch operation flow and processing the second branch operation flow by the operation flow table row creation part, further, setting the operation flow table row and the operation flow table row added by the operation flow table row creation part for the second branch operation flow to be mutually exclusive; then, continuing to process the subsequent flow steps by the operation flow table row creation part.

B. If the flow step is an operation instruction, setting the condition cell of the operation flow table row to a condition that always represents true, and using the condition that always represents true as the execution condition of the subsequent operation instruction; and adding the subsequent operation instruction to the instruction cell of the operation flow table row; until the subsequent flow step is a conditional branch operation flow, then continuing to process the subsequent flow step by the operation flow table row creation part.

In the third implementation form, the operation flow further comprises a loop operation flow, the loop operation flow is executed in a circular manner according to a predetermined mode when the execution condition is met, and the device is characterized by that: the operation flow table row further comprises a loop execution attribute; the device further comprises a loop execution attribute setting part for setting the loop execution attribute value of the operation flow table row according to the loop mode of the operation flow when the operation flow corresponding to the operation flow table is determined to be a loop operation flow.

In the third implementation form, the operation flow further comprises a switching branch operation flow, the switching branch operation flow comprises a branch switching instruction and a branch operation flow, the branch switching instruction comprises a target index variable, the branch operation flow comprises at least one branch index value, the branch switching instruction is an operation instruction for determining the value of the target index variable and switching execution of the branch operation flow whose branch index value matches the value of the target index variable; the device is characterized by further comprising: a branch operation flow table creation part for creating a branch operation flow table for the switching branch operation flow, the branch operation flow table comprises a branch index column; the created branch operation flow table is used by a branch operation flow table row creation part for further processing; the branch operation flow table row creation part for adding a branch operation flow table row to the branch operation flow table for each branch operation flow comprised in the switching branch operation flow, the branch operation flow table row comprises an index cell corresponding to the index column of the branch operation flow table; the branch operation flow table row creation part is further used for adding the branch index value of the switching branch operation flow to the branch index value cell of the branch operation flow table row; then, sequentially processing each branch operation flow comprised in the switching branch operation flow by the operation flow table creation part, and embedding the operation flow table created by the operation flow table creation part hierarchically under the branch operation flow table row corresponding to the branch operation flow; the flow step processing part is further used for determining whether the flow step is a switching branch operation flow, and if so, adding the branch switching instruction of the switching branch operation flow to the instruction cell of the operation flow table row, and processing the switching branch operation flow by the branch operation flow table creation part, further, hierarchically embedding the branch operation flow table created by the branch operation flow table creation part under the operation flow table row comprising the branch switching instruction.

In the third implementation form, the operation instructions of the operation flow further comprise an instruction for setting the value of the target index variable; the device is characterized by that: the operation flow table further comprises a switching target column, correspondingly, the operation flow table further comprises a switching target cell, before adding the operation instruction to the instruction cell, the operation flow instruction processing part further judging whether the operation instruction is an instruction for setting the value of the target index variable, and if so, setting the content of the switching target cell according to the instruction for setting the target index variable value, and no longer adding the instruction for setting the target index variable value to the instruction cell of the operation flow table row.

In the third implementation form, the switching branch operation flow further comprises a state variable, the value of the state variable is determined according to the branch operation flow of the switching branch operation flow, and the device is characterized by that: the branch operation flow table further comprises a branch state column, correspondingly, the branch operation flow table row comprises a branch state cell, the branch operation flow table row creation part is further used for acquiring the state variable of the switching branch operation flow, and setting the content of the branch state cell of the branch operation flow table row according to the value of the state variable determined by the branch operation flow of the switching branch operation flow.

As a fourth implementation form, the present invention further provides a device for executing operation flow according to operation flow table, the device comprises: an operation flow table row acquiring part for sequentially acquiring operation flow table rows from the operation flow table, and further processing the acquired operation flow table row by an operation flow table row judging part; the operation flow table row judging part for judging whether the execution condition in the condition cell of the acquired operation flow table row is true, and if so, further processing the acquired operation flow table row by an operation instruction execution part, otherwise, acquiring the next operation flow table row by the operation flow table row acquiring part, and the operation flow table row is further processed by the operation flow table row judging part; the operation instruction execution part for acquiring and executing the operation instruction in the instruction cell of the operation flow table row, and the operation instruction is further processed by a second operation flow table processing part; the second operation flow table processing part for judging whether there is a second operation flow table embedded under the operation flow table row, and if so, the second operation flow table is further processed by the operation flow table row acquiring part, until the processing of the second operation flow table is completed, then, further processing by a non-mutually exclusive operation flow table row acquiring part; the non-mutually exclusive operation flow table row acquiring part for acquiring a next operation flow table row that is non-mutually exclusive with the current operation flow table row, and the acquired operation flow table row is further processed by the operation flow table row judging part.

In the fourth implementation form, the operation flow table row judging part is further used for judging whether the operation flow table row comprises a loop execution attribute, and if so, when the execution condition in the condition cell of the operation flow table row is true, repeating execution of the operation flow table row according to the loop mode set according to the loop execution attribute by the operation flow table row judging part.

In the fourth implementation form, the operation instruction judging part is further used for acquiring the branch operation flow table embedded under the operation flow table row comprising the branch switching instruction when the operation instruction is judged to be a branch switching instruction, and searching for a branch operation flow table row whose content of the index cell matches the value of the target index variable of the branch switching instruction in the branch operation flow table, then, the branch operation flow table row is processed by the branch operation flow table row processing part; the branch operation flow table row processing part is used for acquiring the operation flow table embedded under the branch operation flow table row, and processing the operation flow table by the operation flow table row acquiring part.

In the fourth implementation form, the operation instruction execution part is further used for acquiring the content of the switching target cell of the operation flow table row, and setting the value of the target index variable according to the content of the switching target cell.

In the fourth implementation form, as another aspect of the device for executing operation flow according to operation flow table of the present invention, when the operation instruction execution part executes the branch switching instruction, for the branch operation flow table row whose content of the index cell matches the value of the target index variable of branch switching instruction, the operation instruction execution part is further used for judging whether the branch state cell of the branch operation flow table row is set, and if so, acquiring the content of the branch state cell of the branch operation flow table row, and setting the value of the state variable of the branch operation flow according to the content of the branch state cell.

The present invention is further described in the following embodiments, and not only limited to these embodiments. Meanwhile, all the procedures are normal methods and all raw materials are from commercial access unless otherwise specified.

Embodiment 1

Figure 2:
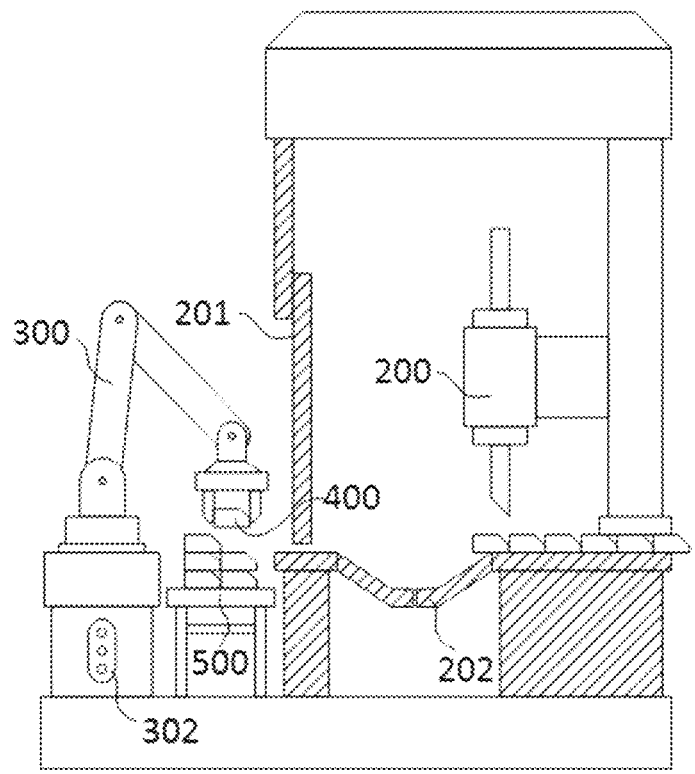
FIG. 2 shows a schematic cross-sectional view of the machining state of an automated production system machine tool in embodiment 1 of the present invention.

The FIGS. 1-2 shows a typical automated production system, the system comprises a machine tool 200 and a manipulator 300. The machine tool 200 comprises a protective door 201. The protective door 201 is closed during machining, and opened after the machining. Sensors are provided at the opening position and the closing position of the protective door 201 for detecting whether the protective door 201 is properly opened or closed. The machine tool further comprises an output area 202 for accepting the finished workpiece 400. The workpiece 400 slides down to the output area 202 after machining. The output area 202 is provided with a sensor for detecting whether there is a workpiece 400 in the output area 202. The manipulator 300 grabs the workpiece 400 from the output area via its gripper jaws 301, and places the workpiece 400 in the workpiece stacking area 500. The gripper jaws 301 of the manipulator are provided with sensors for detecting whether the workpiece 400 has been grasped. When the manipulator 300 is ready to grab the workpiece, but the protective door 201 of the machine tool is not fully opened or there is no workpiece in the output area 202, a "manipulator workpiece grab error alarm" is prompted. When the manipulator 300 places the workpiece in the workpiece stacking area and the workpiece is detected on the gripper jaws 301, a "manipulator workpiece placement error alarm" is prompted. The manipulator 300 is further provided with a three-color indicator 202 consisting of a red light, a yellow light and a green light. When the manipulator 300 is grabbing or placing a workpiece, the green light of the three-color indicator 202 is on. When the manipulator 300 is in waiting or stopped state, the yellow light of the three-color indicator 202 is on. When the manipulator 300 is in error state, the red light of the three-color indicator 202 is on, indicating the error state.

Figure 3:
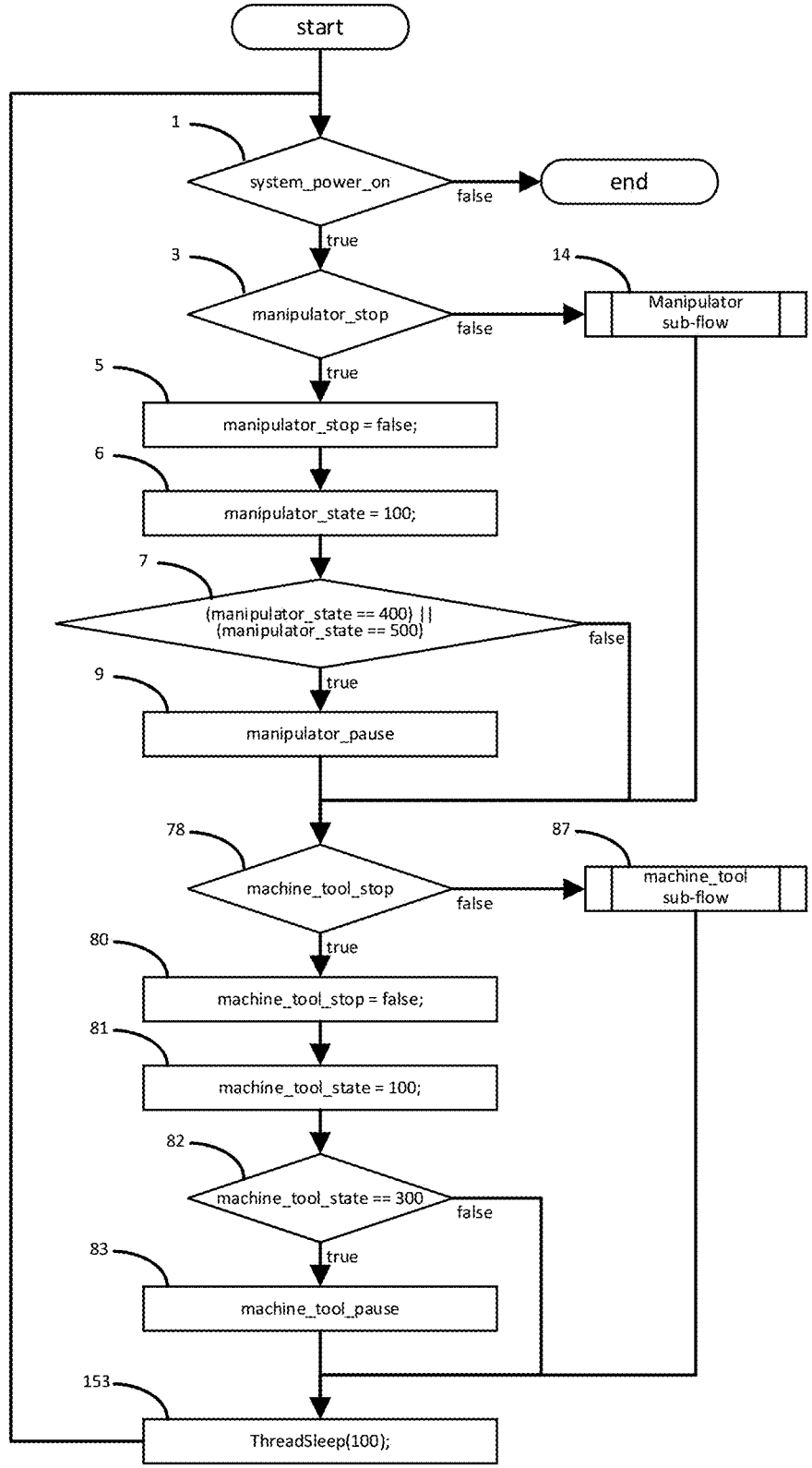
FIG. 3 shows a flow table of the main process in embodiment 1 of the present invention.
Figure 4:
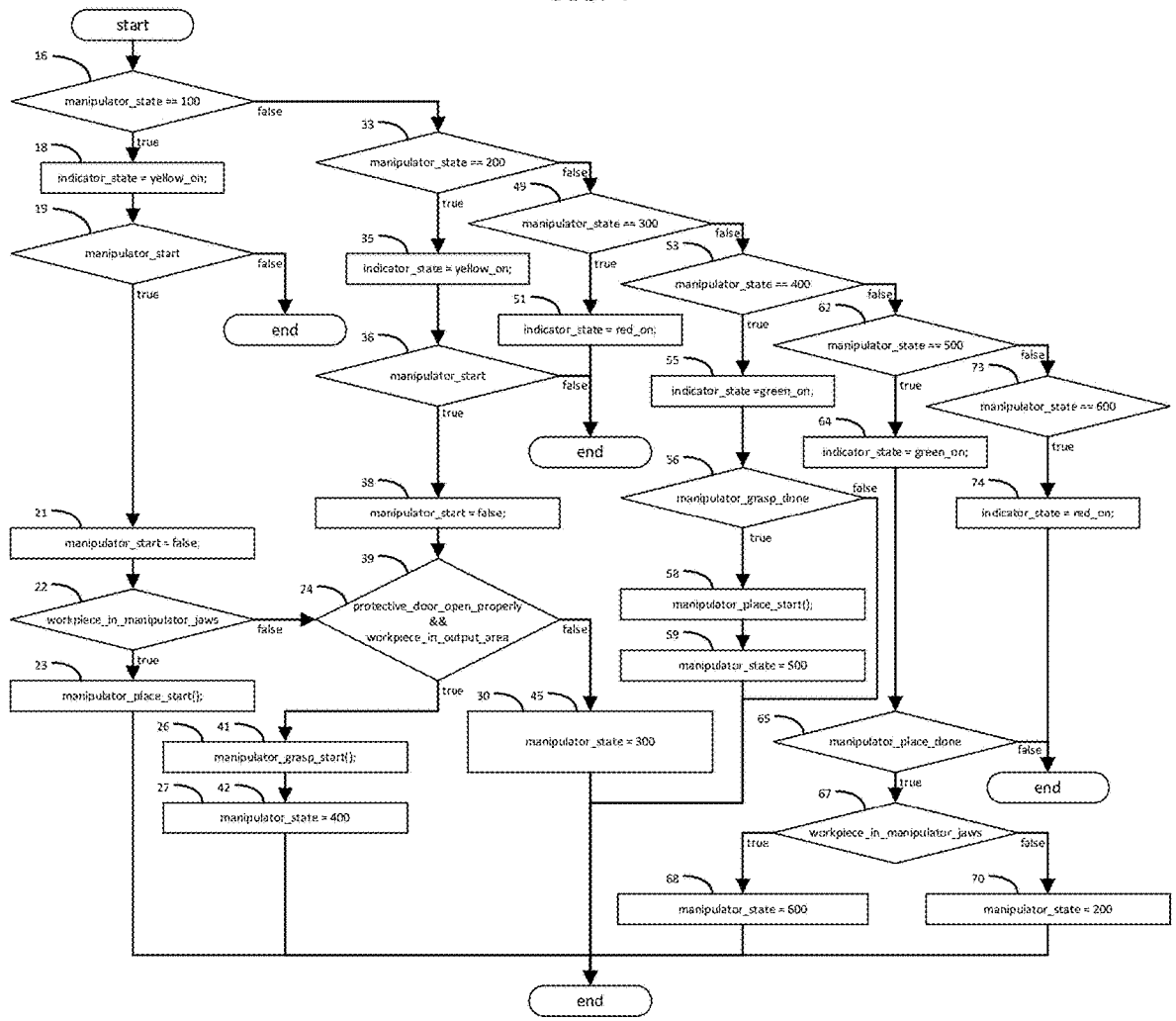
FIG. 4 shows a flow table of the sub-flow of the manipulator in embodiment 1 of the present invention.
Figure 5:
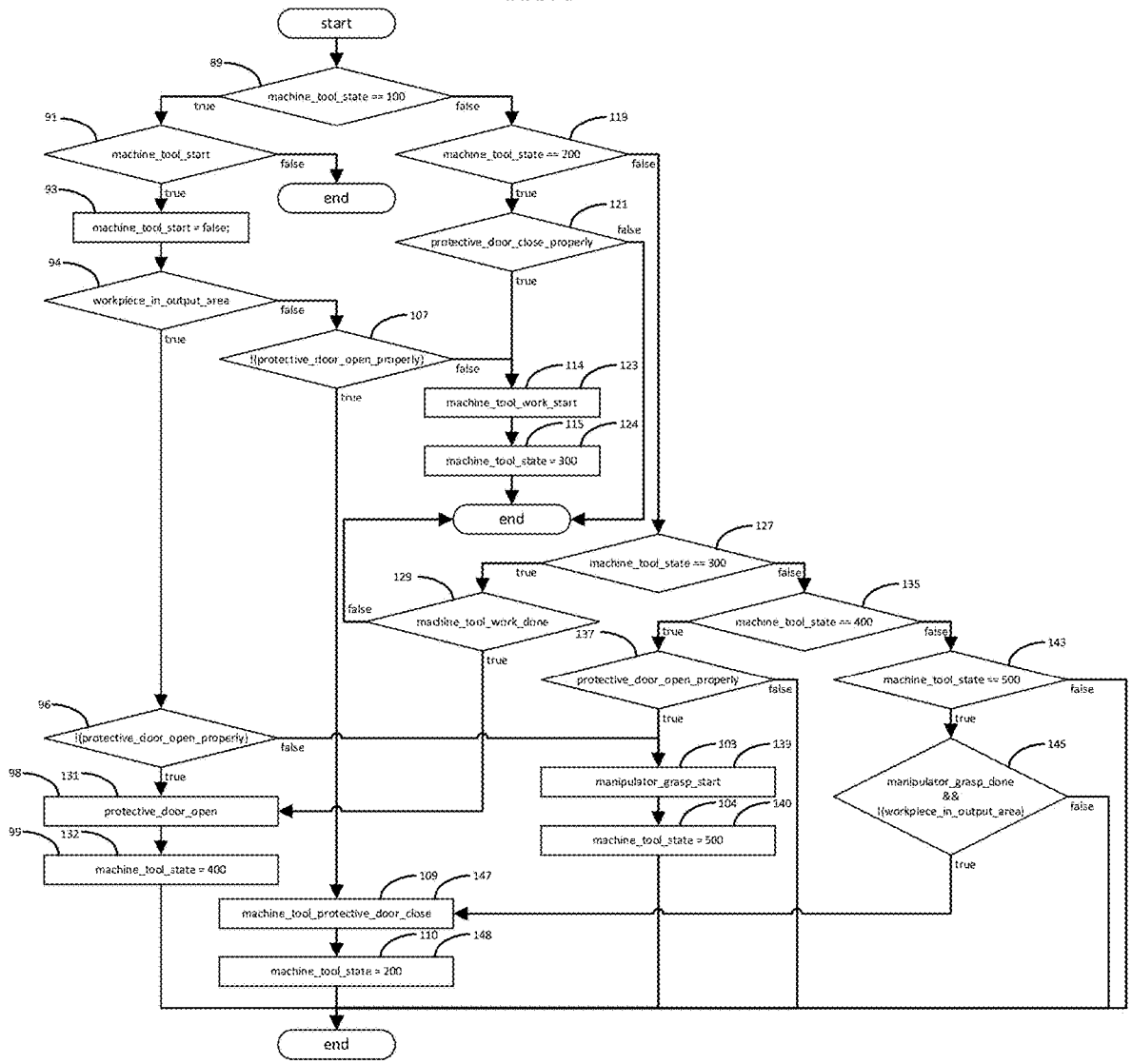
FIG. 5 shows a flow table of the sub-flow of the machine tool in embodiment 1 of the present invention.

The detailed operation flow of the automated production system is described below with reference to FIGS. 3-5.

The initial state of the system is set as: the protective door 201 of the machine tool is closed properly, and there is no workpiece in the output area 202 of the machine tool; the manipulator 300 has no workpiece in its grasp, and the yellow light of the three-color indicator 202 is on; the initial value of the variable "machine tool state" equals to 100, indicating "the machine tool is stopped"; the initial value of the variable "manipulator state" equals to 100, indicating "the manipulator is stopped". At this time, setting the "machine tool start" signal to be true, the "manipulator stop" signal to be false, the "machine tool stop" signal to be false, and start executing the following flow steps.

Flow step 1 is a conditional branch operation flow for determining whether the system is powered on, and if so, executing flow steps 3, 78, 153. And these flow steps are executed cyclically under the condition that the system is powered on.

Flow step 3 is a conditional branch operation flow for determining whether the "manipulator_stop" signal is true, and if so, executing flow steps 5, 6 and 7, otherwise, executing flow step 14.

Flow step 5 is an operation instruction for resetting the "manipulator_stop" signal to be false.

Flow step 6 is an operation instruction for setting the "manipulator_state" to be 100, that is, "manipulator stopping".

Flow step 7 is a conditional branch operation flow for determining whether the "manipulator_state" equals to 400 or 500, and if so, executing flow step 9, otherwise, executing flow step 78.

Flow step 9 is an operation instruction for pausing the operation of the manipulator.

Flow step 14 is an operation instruction for calling a manipulator sub-flow. The manipulator sub-flow is used for switching the execution of a corresponding operation flow according to the state of the manipulator. The first flow step to be executed in the manipulator sub-flow is flow step 16.

Flow step 16 is a conditional branch operation flow for determining whether the variable "manipulator_state" equals to 100, that is, "manipulator stopping", and if so, executing flow step 18, 19, otherwise, executing flow step 33.

Flow step 18 is an operation instruction for setting the value of the variable "indicator_state" to be "yellow_on".

Flow step 19 is a conditional branch operation flow for determining whether the "manipulator_start" signal is true, and if so, executing flow steps 21, 22.

Flow step 21 is an operation instruction for resetting the "manipulator_start" signal to be false.

Flow step 22 is a conditional branch operation flow for determining whether the workpiece 400 is detected between the gripper jaws 301, and if so, executing flow step 23, otherwise, executing flow step 24.

Flow step 23 is an operation instruction for starting the operation of the manipulator to place the workpiece.

Flow step 24 is a conditional branch operation flow for determining whether the protective door 201 of the machine tool is properly opened and there is workpiece 400 detected in the output area 202 of the machine tool, and if so, executing flow steps 26, 27, otherwise, executing flow step 30.

Flow step 26 is an operation instruction for starting the operation of the manipulator to grasp a workpiece.

Flow step 27 is an operation instruction for setting the "manipulator_state" to be 400, that is, "the manipulator grasping a workpiece".

Flow step 30 is an operation instruction for setting the "manipulator_state" to be 300, that is, "the manipulator workpiece grasping error alarm".

Flow step 33 is a conditional branch operation flow for determining whether the "manipulator_state" equals to 200, that is, "the manipulator waiting to grasp a workpiece", and if so, executing flow steps 35, 36, otherwise, executing flow step 49.

Flow step 35 is an operation instruction for setting the value of the variable "indicator_state" to be "yellow_on".

Flow step 36 is a conditional branch operation flow for determining whether the "manipulator_start" signal is true, and if so, executing flow steps 38, 39.

Flow step 38 is an operation instruction for resetting the "manipulator_start" signal to be false. Flow step 39 is a conditional branch operation flow for determining whether the protective door 201 of the machine tool is properly opened and there is workpiece 400 detected in the output area 202 of the machine tool, and if so, executing flow steps 41, 42, otherwise, executing flow step 45.

Flow step 41 is an operation instruction for starting the operation of the manipulator to grasp a workpiece.

Flow step 42 is an operation instruction for setting the "manipulator_state" to be 400, that is, "manipulator grasping workpiece".

Flow step 45 is an operation instruction for setting the "manipulator_state" to be 300, that is, "manipulator workpiece grasping error alarm".

Flow step 49 is a conditional branch operation flow for determining whether the value of the variable "manipulator_state" equals to 300, that is, "manipulator workpiece grasping error alarm", and if so, executing flow step 51, otherwise, executing flow step 53.

Flow step 51 is an operation instruction for setting the "indicator_state" to be "red_on".

Flow step 53 is a conditional branch operation flow for determining whether the value of the variable "manipulator_state" equals to 400, that is, "the manipulator grasping a workpiece", and if so, executing flow steps 55, 56, otherwise, executing flow step 62.

Flow step 55 is an operation instruction for setting the value of the variable "indicator_state" to be "green_on".

Flow step 56 is a conditional branch operation flow for determining whether the operation of the manipulator to grasp a workpiece is completed, and if so, executing flow steps 58, 59.

Flow step 58 is an operation instruction for starting the operation of the manipulator to place a workpiece.

Flow step 59 is an operation instruction for setting the value of the variable "manipulator_state" to be 500, that is, "the manipulator placing a workpiece".

Flow step 62 is a conditional branch operation flow for determining whether the value of the variable "manipulator_state" equals to 500, that is, "manipulator placing workpiece", and if so, executing flow steps 64, 65, otherwise, executing flow step 73.

Flow step 64 is an operation instruction for setting the value of the variable "indicator_state" to be "green_on".

Flow step 65 is a conditional branch operation flow for determining whether the operation of the manipulator to place the workpiece is completed, and if so, executing flow step 67.

Flow step 67 is a conditional branch operation flow for determining whether a workpiece 400 is detected between the gripper jaws 301 of the manipulator, and if so, executing flow step 68, otherwise, executing flow step 70.

Flow step 68 is an operation instruction for setting the value of the variable "manipulator_state" to be 600, that is, "manipulator workpiece placing error alarm".

Flow step 70 is an operation instruction for setting the value of the variable "manipulator_state" to be 200, that is, "manipulator waiting to grasp workpiece".

Flow step 73 is a conditional branch operation flow for determining whether the value of the variable "manipulator_state" equals to 600, that is, "the manipulator workpiece placing error alarm", and if so, executing flow step 74.

Flow step 74 is an operation instruction for setting the value of the variable "indicator_state" to be "red_on".

Flow step 78 is a conditional branch operation flow for determining whether the "machine_tool_stop" signal is true, and if so, executing flow steps 80, 81, 82, otherwise, executing flow step 87.

Flow step 80 is an operation instruction for resetting the "machine_tool_stop" signal to be false.

Flow step 81 is an operation instruction for setting the value of the variable "machine_tool_state" to be 100, that is, "machine tool stopping".

Flow step 82 is a conditional branch operation flow for determining whether the value of the variable "machine_tool_state" equals to 300, that is, "machine tool working", and if so, executing flow step 83.

Flow step 83 is an operation instruction for pausing the operation of the machine tool.

Flow step 87 is an operation instruction for calling the machine tool sub-flow, which is used for switching the corresponding operation flow according to the state of the machine tool. The first flow step to be executed in the machine tool sub-flow is flow step 89.

Flow step 89 is a conditional branch operation flow for determining whether the value of the variable "machine_tool_state" equals 100, that is, "machine tool stopping", and if so, executing flow step 91, otherwise, executing flow step 119.

Flow step 91 is a conditional branch operation flow for determining whether the "machine_tool start" signal is true, and if so, executing flow steps 93, 94.

Flow step 93 is an operation instruction for resetting the "machine_tool start" signal to be false.

Flow step 94 is a conditional branch operation flow for determining whether there is workpiece 400 in the output area 202 of the machine tool, and if so, executing flow steps 98, 99, otherwise, executing flow steps 103, 104.

Flow step 98 is an operation instruction for opening the protective door of the machine tool.

Flow step 99 is an operation instruction for setting the value of the variable "machine_tool_state" to be 400, that is, "machine tool protective door opening".

Flow step 103 is an operation instruction for starting grasping operation of the manipulator 300.

Flow step 104 is an operation instruction for setting the value of the variable "machine_tool_state" to be 500, that is, "machine tool waiting to grasp workpiece".

Flow step 107 is a conditional branch operation flow for determining whether the protective door 201 of the machine tool is properly closed, and if so, executing flow steps 109, 110, otherwise, executing flow steps 114, 115.

Flow step 109 is an operation instruction for closing the protective door 201 of the machine tool.

Flow step 110 is an operation instruction for setting the value of the variable "machine_tool_state" to be 200, that is, "machine tool protective door closing".

Flow step 114 is an operation instruction for starting the machining of the machine tool.

Flow step 115 is an operation instruction for setting the value of the variable "machine_tool_state" to be 300, that is, "machine tool working".

Flow step 119 is a conditional branch operation flow for determining whether the value of the variable "machine_tool_state" equals to 200, that is, "machine tool protective door closing", and if so, executing flow step 121, otherwise, executing flow step 127.

Flow step 121 is a conditional branch operation flow for determining whether the protective door 201 of the machine tool is properly closed, and if so, executing flow steps 123, 124.

Flow step 123 is an operation instruction for starting the machining of the machine tool.

Flow step 124 is an operation instruction for setting the value of the variable "machine_tool_state" to be 300, that is, "machine tool working".

Flow step 127 is a conditional branch operation flow for determining whether the value of the variable "machine_tool_state" equals to 300, that is, "machine tool working", and if so, executing flow step 129, otherwise, executing flow step 135.

Flow step 129 is a conditional branch operation flow for determining whether the machining of the machine tool is completed, and if so, executing flow steps 131, 132.

Flow step 131 is an operation instruction for opening the protective door of the machine tool.

Flow step 132 is an operation instruction for setting the value of the variable "machine_tool_state" to be 400, that is, "machine tool protective door opening".

Flow step 135 is a conditional branch operation flow for determining whether the value of the variable "machine_tool_state" equals to 400, that is, "machine tool protective door opening", and if so, executing flow step 137, otherwise, executing flow step 143.

Flow step 137 is a conditional branch operation flow for determining whether the protective door 201 of the machine tool is properly opened, and if so, executing flow steps 139, 140.

Flow step 139 is an operation instruction for starting the grasping operation of the manipulator 300.

Flow step 140 is an operation instruction for setting the value of the variable "machine_tool_state" to be 500, that is, "machine tool is waiting to grasp workpiece".

Flow step 143 is a conditional branch operation flow for determining whether the value of the variable "machine_tool_state" equals 500, that is, "machine tool waiting to grasp workpiece", and if so, executing flow step 145.

Flow step 145 is a conditional branch operation flow for determining whether the grasping operation of the manipulator is completed and there is no workpiece 400 in the output area 202 of the machine tool, and if so, executing flow steps 147, 148.

Flow step 147 is an operation instruction for closing the protective door 201 of the machine tool.

Flow step 148 is an operation instruction for setting the value of the variable "machine_tool_state" to be 200, that is, "machine tool protective door closing".

Flow step 153 is an operation instruction for pausing the operation flow for 100 ms.

Text-based programming languages are a more common way of defining the operation flow. The aforementioned operation flow described by the C language program is provided below. The C language program can be used as the input form of the operation flow of the solution provided by the present invention. The aforementioned operation flow corresponds to the line number of the following C language program codes.

```
1:   while (system_power_on)
2:   {
3:     if (manipulator_stop)
4:     {
5:       manipulator_stop = false;
6:       manipulator_state = 100;
7:       if (manipulator_state == 400)||(manipulator_state == 500))
8:       {
9:         manipulator_pause( );
10:      }
11:    }
12:    else
13:    {
14:      // manipulator sub-flow
15:      // branch operation flow
16:      if (manipulator state == 100) // manipulator stopped
17:      {
18:        indicator_state = yellow_on;
19:        if (manipulator_start)
20:        {
21:          manipulator_start = false;
22:          if (workpiece_in_manipulator_jaws)
23:            manipulator_place_start( );
24:          else if (protective_door_opened_properly&&workpiece_in_output_area)
25:          {
26:            manipulator_grasp_start( );
27:            manipulator_state = 400;
28:          }
29:          else
30:            manipulator_state = 300;
```

```
 31:         }
 32:       }
 33:       else if (manipulator_state == 200) //manipulator waiting to grasp workpiece
 34:       {
 35:         indicator_state = yellow_on;
 36:         if(manipulator_start)
 37:         {
 38:           manipulator_start = false;
 39:           if (protective_door_opened_properly&&workpiece_in_output_area)
 40:           {
 41:             manipulator_grasp_start( );
 42:             manipulator_state = 400;
 43:           }
 44:           else
 45:             manipulator_state = 300;
 46:         }
 47:       }
 48:     }
 49:     else if (manipulator_state == 300) // manipulator workpiece grasping error alarm
 50:     {
 51:       indicator_state = red_on;
 52:     }
 53:     else if (manipulator_state == 400) // manipulator grasping workpiece
 54:     {
 55:       indicator_state = green_on;
 56:       if (manipulator_grasp_done)
 57:       {
 58:         manipulator_place_start( );
 59:         manipulator_state = 500;
 60:       }
 61:     }
 62:     else if (manipulator_state == 500) // manipulator placing workpiece
 63:     {
 64:       indicator_state = green_on;
 65:       if (manipulator_place_done)
 66:       {
 67:         if (workpiece_in_manipulator_jaws)
 68:           manipulator_state = 600;
 69:         else
 70:           manipulator_state = 200;
 71:       }
 72:     }
 73:     else if (manipulator_state == 600) // manipulator workpiece placement error alarm
 74:       indicator_state = red_on;
 75:     //
 76:     //
 77: }
 78: if (machine_tool_stop)
 79: {
 80:   machine_tool_stop = false;
 81:   machine_tool_state = 100;
 82:   if (machine_tool_state == 300)
 83:     machine_tool_pause( );
 84: }
 85: else
 86: {
 87:   // machine tool sub-flow
 88:   // branch operation flow
 89:   if (machine_tool_state == 100) // machine tool stopped
 90:   {
 91:     if (machine_tool_start)
 92:     {
 93:       machine_tool_start = false;
 94:       if (workpiece_in_output_area)
 95:       {
 96:         if (!protective_door_open_properly)
 97:         {
 98:           protective_door_open = true;
 99:           machine_tool_state = 400;
100:         }
101:         else
102:         {
103:           manipulator_start = true;
104:           machine_tool_state = 500;
105:         }
106:       }
107:       else if (!protective_door_close_properly)
108:       {
109:         protective_door_open = false;
```

```
110:            machine_tool_state = 200;
111:        }
112:        else
113:        {
114:            machine_tool_work_start( );
115:            machine_tool_state = 300;
116:        }
117:    }
118: }
119: else if (machine_tool_state == 200) // protective door closed
120: {
121:    if (protective_door_close_properly)
122:    {
123:        machine_tool_work_start( );
124:        machine_tool_state = 300;
125:    }
126: }
127: else if (machine_tool_state = 300) // machine tool machining
128: {
129:    if (machine_tool_work_done)
130:    {
131:        protective_door_open = true;
132:        machine_tool_state = 400;
133:    }
134: }
135: else if (machine_tool_state == 400) // protective door opened
136: {
137:    if (protective_door_open_properly)
138:    {
139:        manipulator_start = true;
140:        machine_tool_state = 500;
141:    }
142: }
143: else if (machine_tool_state == 500) // machine tool waiting to grasp workpiece
144: {
145:    if (manipulator_grasp_done && !workpiece_in_output_area)
146:    {
147:        protective_door_open = false;
148:        machine_tool_state = 200;
149:    }
150: }
151: //
152: }
153: ThreadSleep(100);
154: }
```

In the present embodiment, the aforementioned operation flow is taken as an example, and each flow step of the aforementioned operation flow is subjected to tabular processing by using the method for tabular processing of operation flow. The tabular processing of flow steps is described below with reference to FIGS. 6-8.

Step 1, for the main flow, creating an operation flow table 10000, the operation flow table 10000 comprises a condition column 601 and an instruction column 602. Adding an operation flow table row 10001 in the operation flow table 10000, the operation flow table row 10001 comprises a condition cell corresponding to the condition column 601 of the operation flow table and a instruction cell corresponding to the instruction column 602 of the operation flow table. Acquiring the aforementioned flow step 1. Flow step 1 is a conditional branch operation flow, therefore, adding the execution condition "systempower on" of flow step 1 to the condition cell of the operation flow table row 10001.

Further, flow step 1 means executing the subsequent instructions cyclically on the premise that the execution condition of flow step 1 is met, therefore, setting the loop execution attribute value of the operation flow table row 10001 to loop execution, and correspondingly, setting a mark 610 with a circle and a rotation arrow inside the circle on the left side of the content of the condition cell of the operation flow table row 10001. The mark 610 is a corresponding setting on the format of the cell according to the loop execution attribute of the operation flow table row 10001, used for reflecting the execution method of flow step 1.

In order to describe the present embodiment more clearly, the flow steps in the operation flow table are correspondingly marked with a number of the flow steps before the content, which does not indicate that the mark is also included in the actual implementation.

Then, starting from step 2, processing the branch operation flows that are determined to be true in flow step 1.

Step 2, as the flow step 3 is a conditional branch operation flow, creating a new operation flow table 11000 for the flow step 3 and hierarchically embedding the operation flow table 11000 under the operation flow table row 10001. The operation flow table 11000 comprises a condition column 601 and an instruction column 602. Creating an operation flow table row 11001 in the operation flow table 11000, the operation flow table row 11001 comprises a condition cell corresponding to the condition column 601 of the operation flow table and an instruction cell corresponding to the instruction column 602 of the operation flow table. Adding the execution condition "manipulator_stop" in the flow step 3 to the condition cell of the operation flow table row 11001, and adding the subsequent operation instructions, that is, the "manipulator_stop=false;" in the flow step 5 and the "manipulator_state=100;" in the flow step 6, to the instruction cell of the operation flow table row 11001.

Further, setting the cell format of the condition cell of the operation flow table row 11001 according to the hierarchical relationship between the operation flow table 10000 and the operation flow table 11000, so that the content in the condition cell of the operation flow table 11000 is indented by a set width compared to the content of the operation flow table row 11001, indicating the hierarchical relationship between the two.

Then, starting from step 3, processing other flow steps in the branch operation flow that are determined to be true by the flow step 3. And starting from step 4, processing the branch operation flow that are determined to be false by the flow step 3.

Step 3, as the flow step 7 is a conditional branch operation flow, creating a new operation flow table 11100 for the flow step 7, and embedding the operation flow table 11100 hierarchically under the operation flow table row 11001. The operation flow table 11100 comprises a condition column 601 and an instruction column 602. Creating a operation flow table row 11101 in the operation flow table 11100, and the operation flow table row 11101 comprises a condition cell corresponding to the condition column 601 of the operation flow table and an instruction cell corresponding to the instruction column 602 of the operation flow table. Adding the execution condition of the flow step 7 to the condition cell of the operation flow table row 11101, and adding the subsequent operation instructions, that is, the content of the flow step 9, to the instruction cell of the operation flow table row 11101.

Further, setting the cell format of the condition cell of the operation flow table row 11101 according to the hierarchical relationship between the operation flow table 11000 and the operation flow table 11100, so that the content in the condition cell of the operation flow table 11100 is indented by a set width compared to the content of the operation flow table row 11101, indicating the hierarchical relationship between the two.

Step 4, as the flow step 14 is an operation instruction calling the manipulator sub-flow, creating a new operation flow table row 11002 after the operation flow table row 11001, and adding a constant "ELSE" representing "true" as the content of the condition cell of the operation flow table row 11002. And adding the content of the flow step 14 to the instruction cell of the operation flow table row 11002.

Further, the operation flow table row 11001 and the operation flow table row 11002 are two mutually exclusive branch operation flows of the conditional branch operation flow, therefore, setting the operation flow table row 11001 and the operation flow table row 11002 to be mutually exclusive, and correspondingly, setting circular marks on the left side of the condition cells of the two operation flow table rows and connecting the two circular marks with a vertical line, indicating the mutually exclusive relationship between the two in the format.

Step 5, further acquiring the subsequent operation flows, and creating a new operation flow table row 11003 for the flow step 78. The operation flow table row 11003 comprises a condition cell corresponding to the condition column 601 of the operation flow table and an instruction cell corresponding to the instruction column 602 of the operation flow table. As the flow step 78 is a conditional branch operation flow, adding the execution condition of the flow step 78 to the condition cell of the operation flow table row 11003, and adding the subsequent operation instructions, that is, the content of the flow steps 80 and 81, to the instruction cell of the operation flow table row 11003.

Then, starting from step 6, processing the other flow steps in the branch operation flow that are determined to be true by the flow step 78. And starting from step 7, processing the branch operation flow that is determined to be false by the flow step 78.

Step 6, as the flow step 82 is a conditional branch operation flow, creating a new operation flow table 11200 for the flow step 82, and embedding the operation flow table 11200 hierarchically under the operation flow table row 11003. The operation flow table 11200 comprises a condition column 601 and an instruction column 602. Creating an operation flow table row 11201 in the operation flow table 11200, the operation flow table row 11201 comprises a condition cell corresponding to the condition column 601 of the operation flow table and an instruction cell corresponding to the instruction column 602 of the operation flow table. Adding the execution condition of the flow step 82 to the condition cell of the operation flow table row 11201, and adding the subsequent operation instructions, that is, the content of the flow step 83, to the instruction cell of the operation flow table row 11201.

Further, setting the cell format of the condition cell of the operation flow table row 11201 according to the hierarchical relationship between the operation flow table 11000 and the operation flow table 11200, so that the content in the condition cell of the operation flow table row 11201 is indented by a set width compared to the content of the operation flow table row 11003, indicating the hierarchical relationship between the two.

Step 7, as the flow step 87 is an operation instruction for calling the machine tool sub-flow, creating a new operation flow table row 11004 after the operation flow table row 11003, and adding a constant "ELSE" representing "true" as the content of the condition cell of the operation flow table row 11004, and adding the content of the flow step 87 to the instruction cell of the operation flow table row 11004.

Further, as the operation flow table row 11003 and the operation flow table row 11004 are two mutually exclusive branch operation flows of the conditional branch operation flow, therefore, setting the operation flow table row 11003 and the operation flow table row 11004 to be mutually exclusive, and correspondingly, setting circular marks on the left side of the condition cells of the two operation flow table rows and connecting the two circular marks with a vertical line, indicating the mutually exclusive relationship between the two in the format.

Step 8, as the flow step 153 is an operation instruction, creating a new operation flow table row 11005 after the operation flow table row 11004, and adding constant "ELSE" representing "true" as the content of the condition cell of the operation flow table row 11005, and adding the content of the flow step 153 to the instruction cell of the operation flow table row 11005.

Step 9, acquiring the first flow step in the manipulator sub-flow. As the flow step 16 is a conditional branch operation flow, creating a new operation flow table 20000 for the flow step 16. The operation flow table 20000 comprises a condition column 601 and an instruction column 602. Creating an operation flow table row 20001 in the operation flow table 20000, the operation flow table row 20001 comprises a condition cell corresponding to the condition column 601 of the operation flow table and an instruction cell corresponding to the instruction column 602 of the operation flow table. Adding the execution condition of the flow step 16 to the condition cell of the operation flow table row 20001, and adding the subsequent operation instructions, that is, the content of the flow step 18, to the instruction cell of the operation flow table row 20001.

Then, starting from step 10, processing the other flow steps in the branch operation flow that is determined to be true by the flow step 16, and starting from step 14, processing the branch operation flow that is determined to be false by the flow step 16.

Step 10, as the flow step 19 is a conditional branch operation flow, creating a new operation flow table 21000 for the flow step 19, and embedding the operation flow table 21000 hierarchically under the operation flow table row 20000. The operation flow table 21000 comprises a condition column 601 and an instruction column 602. Creating an operation flow table row 21001 in the operation flow table 21000, the operation flow table row 21001 comprises a condition cell corresponding to the condition column 601 of the operation flow table and an instruction cell corresponding to the instruction column 602 of the operation flow table. Adding the execution condition of the flow step 19 to the condition cell of the operation flow table row 21001, and adding the subsequent operation instructions, that is, the content of the flow step 21 to the instruction cell of the operation flow table row 21001.

Further, setting the cell format of the condition cell of the operation flow table row 21001 according to the hierarchical relationship between the operation flow table 20000 and the operation flow table 21000, so that the content in the condition cell of the operation flow table row 21001 is indented by a set width compared to the content of the operation flow table row 20001, indicating the hierarchical relationship between the two.

Then, starting from step 11, processing the other flow steps in the branch operation flow that is determined to be true by the flow step 19.

Step 11, as the flow step 22 is a conditional branch operation flow, creating a new operation flow table 21100 for the flow step 22, and embedding the operation flow table 21100 hierarchically under the operation flow table row 21000. The operation flow table 21100 comprises a condition column 601 and an instruction column 602. Creating an operation flow table row 21101 in the operation flow table 21100, the operation flow table row 21101 comprises a condition cell corresponding to the condition column 601 of the operation flow table and an instruction cell corresponding to the instruction column 602 of the operation flow table. Adding the execution condition of the flow step 22 to the condition cell of the operation flow table row 21101, and adding the subsequent operation instructions, that is, the content of the flow step 23, to the instruction cell of the operation flow table row 21101.

Further, setting the cell format of the condition cell of the operation flow table row 21101 according to the hierarchical relationship between the operation flow table 21000 and the operation flow table 21100, so that the content in the condition cell of the operation flow table row 21101 is indented by a set width compared to the content of the operation flow table row 21001, indicating the hierarchical relationship between the two.

Step 12, further acquiring the subsequent operation flow, and creating a new operation flow table row 21102 for the flow step 24. The operation flow table row 21102 comprises a condition cell corresponding to the condition column 601 of the operation flow table and an instruction cell corresponding to the instruction column 602 of the operation flow table. As the flow step 24 is a conditional branch operation flow, adding the execution condition of the flow step 24 to the condition cell of the operation flow table row 21102, and adding the subsequent operation instructions, that is, the content of flow steps 26 and 27, to the instruction cell of the operation flow table row 21102.

Step 13, as the flow step 30 is an operation instruction, creating a new operation flow table row 21103 after the operation flow table row 21102, and adding a constant "ELSE" representing "true" as the content of the condition cell of the operation flow table row 21103, and adding the content of the flow step 30 to the instruction cell of the operation flow table row 21103.

Further, the operation flow table row 21102 and the operation flow table row 21103 are two mutually exclusive branch operation flows of the conditional branch operation flow, therefore, setting the operation flow table row 21102 and the operation flow table row 21103 to be mutually exclusive, and correspondingly, setting circular marks on the left side of the condition cells of the two operation flow table rows and connecting the two circular marks with a vertical line, indicating the mutually exclusive relationship between the two in the format.

Step 14, further acquiring the subsequent operation flow, and creating a new operation flow table row 20002 for the flow step 33. The operation flow table row 20002 comprises a condition cell corresponding to the condition column 601 of the operation flow table and an instruction cell corresponding to the instruction column 602 of the operation flow table. As the flow step 33 is a conditional branch operation flow, adding the execution condition of the flow step 33 to the condition cell of the operation flow table row 20002, and adding the subsequent operation instructions, that is, the content of flow step 35, to the instruction cell of the operation flow table row 20002.

Then, starting from step 15, processing the other flow steps in the branch operation flow that is determined to be true by the flow step 33.

And starting from step 18, processing the branch operation flow that is determined to be false by the flow step 33.

Step 15, as the flow step 36 is a conditional branch operation flow, creating a new operation flow table 22000 for the flow step 36, and embedding the operation flow table 22000 hierarchically under the operation flow table row 20000. The operation flow table 22000 comprises a condition column 601 and an instruction column 602. Creating an operation flow table row 22001 in the operation flow table 22000, the operation flow table row 22001 comprises a condition cell corresponding to the condition column 601 of the operation flow table and an instruction cell corresponding to the instruction column 602 of the operation flow table. Adding the execution condition of the flow step 36 to the condition cell of the operation flow table row 22001, and adding the subsequent operation instructions, that is, the content of flow step 38, to the instruction cell of the operation flow table row 22001.

Further, setting the cell format of the condition cell of the operation flow table row 22001 according to the hierarchical relationship between the operation flow table 20000 and the operation flow table 22000, so that the content in the condition cell of the operation flow table row 22001 is indented by a set width compared to the content of the operation flow table row 20002, indicating the hierarchical relationship between the two.

Then, starting from step 16, processing other flow steps in the branch operation flow that is determined to be true by the flow step 36.

Step 16, as the flow step 39 is a conditional branch operation flow, creating a new operation flow table 22100 for the flow step 39, and embedding the operation flow table 22100 hierarchically under the operation flow table row 22000. The operation flow table 22100 comprises a condition column 601 and an instruction column 602. Creating an operation flow table row 22101 in the operation flow table 22100, the operation flow table row 22101 comprises a condition cell corresponding to the condition column 601 of the operation flow table and an instruction cell corresponding to the instruction column 602 of the operation flow table. Adding the execution condition of the flow step 39 to the condition cell of the operation flow table row 22101, and adding the subsequent operation instructions, that is, the content of flow steps 41, 42, to the instruction cell of the operation flow table row 22101.

Further, setting the cell format of the condition cell of the operation flow table row 22101 according to the hierarchical relationship between the operation flow table 22000 and the operation flow table 22100, so that the content in the condition cell of the operation flow table row 22101 is indented by a set width compared to the content of the operation flow table row 22001, indicating the hierarchical relationship between the two.

Step 17, as the flow step 45 is an operation instruction, creating a new operation flow table row 22102 after the operation flow table row 22101, and adding a constant "ELSE" representing "true" as the content of the condition cell of the operation flow table row 22102, and adding the content of the flow step 30 to the instruction cell of the operation flow table row 22102.

Further, the operation flow table row 22101 and the operation flow table row 22102 are two mutually exclusive branch operation flows of the conditional branch operation flow, therefore, setting the operation flow table row 22101 and the operation flow table row 22102 to be mutually exclusive, and correspondingly, setting circular marks on the left side of the condition cells of the two operation flow table rows and connecting the two circular marks with a vertical line, indicating the mutually exclusive relationship between the two in the format.

Step 18, further acquiring the subsequent operation flow, and creating a new operation flow table row 20003 for the flow step 49. The operation flow table row 20003 comprises a condition cell corresponding to the condition column 601 of the operation flow table and an instruction cell corresponding to the instruction column 602 of the operation flow table. As the flow step 49 is a conditional branch operation flow, adding the execution condition of the flow step 49 to the condition cell of the operation flow table row 20003, and adding the subsequent operation instructions, that is, the content of flow step 51, to the instruction cell of the operation flow table row 20003.

Step 19, further acquiring the subsequent operation flow, and creating a new operation flow table row 20004 for the flow step 53. The operation flow table row 20004 comprises a condition cell corresponding to the condition column 601 of the operation flow table and an instruction cell corresponding to the instruction column 602 of the operation flow table. As the flow step 53 is a conditional branch operation flow, adding the execution condition of the flow step 53 to the condition cell of the operation flow table row 20004, and adding the subsequent operation instructions, that is, the content of flow step 59, to the instruction cell of the operation flow table row 20004.

Then, starting from step 20, processing the other flow steps in the branch operation flow that is determined to be true by the flow step 53.

And starting from step 21, processing the branch operation flow that is determined to be false by the flow step 53.

Step 20, as the flow step 56 is a conditional branch operation flow, creating a new operation flow table 24000 for the flow step 56. The operation flow table 24000 comprises a condition column 601 and an instruction column 602. Creating an operation flow table row 24001 in the operation flow table 24000. The operation flow table row 24001 comprises a condition cell corresponding to the condition column 601 of the operation flow table and an instruction cell corresponding to the instruction column 602 of the operation flow table. Adding the execution condition of the flow step 56 to the condition cell of the operation flow table row 24001, and adding the subsequent operation instructions, that is, the content of flow steps 58, 59, to the instruction cell of the operation flow table row 24001.

Further, setting the cell format of the condition cell of the operation flow table row 24001 according to the hierarchical relationship between the operation flow table 20000 and the operation flow table 24000, so that the content in the condition cell of the operation flow table row 24001 is indented by a set width compared to the content of the operation flow table row 20004, indicating the hierarchical relationship between the two.

Step 21, further acquiring the subsequent operation flow, and creating a new operation flow table row 20005 for the flow step 62. The operation flow table row 20005 comprises a condition cell corresponding to the condition column 601 of the operation flow table and an instruction cell corresponding to the instruction column 602 of the operation flow table. As the flow step 62 is a conditional branch operation flow, adding the execution condition of the flow step 62 to the condition cell of the operation flow table row 20005, and adding the subsequent operation instructions, that is, the content of flow step 64, to the instruction cell of the operation flow table row 20005.

Then, starting from step 22, processing the other flow steps in the branch operation flow that is determined to be true by the flow step 62.

And starting from step 25, processing the branch operation flow that is determined to be false by the flow step 62.

Step 22, as the flow step 65 is a conditional branch operation flow, creating a new operation flow table 25000 for the flow step 65, and embedding the operation flow table 25000 hierarchically under the operation flow table row 20000. The operation flow table 25000 comprises a condition column 601 and an instruction column 602. Creating an operation flow table row 25001 in the operation flow table 25000. The operation flow table row 25001 comprises a condition cell corresponding to the condition column 601 of the operation flow table and an instruction cell corresponding to the instruction column 602 of the operation flow table. Adding the execution condition of the flow step 65 to the condition cell of the operation flow table row 25001.

Further, setting the cell format of the condition cell of the operation flow table row 25001 according to the hierarchical relationship between the operation flow table 20000 and the operation flow table 25000, so that the content in the condition cell of the operation flow table row 25001 is indented by a set width compared to the content of the operation flow table row 20005, indicating the hierarchical relationship between the two.

Then, starting from step 23, processing the other flow steps in the branch operation flow that is determined to be true by the flow step 65.

Step 23, as the flow step 67 is a conditional branch operation flow, creating a new operation flow table 25100 for the flow step 67, and embedding the operation flow table 25100 hierarchically under the operation flow table row 25000. The operation flow table 25100 comprises a condition column 601 and an instruction column 602. Creating an operation flow table row 25101 in the operation flow table 25100. The operation flow table row 25101 comprises a condition cell corresponding to the condition column 601 of the operation flow table and an instruction cell corresponding to the instruction column 602 of the operation flow table. Adding the execution condition of the flow step 67 to the condition cell of the operation flow table row 25101, and adding the subsequent operation instructions, that is, the content of flow step 68, to the instruction cell of the operation flow table row 25101.

Further, setting the cell format of the condition cell of the operation flow table row 25101 according to the hierarchical relationship between the operation flow table 25000 and the operation flow table 25100, so that the content in the condition cell of the operation flow table row 25101 is indented by a set width compared to the content of the operation flow table row 25001, indicating the hierarchical relationship between the two.

Then, starting from step 24, processing the branch operation flow that is determined to be false by the flow step 67.

Step 24, as the flow step 70 is an operation instruction, creating a new operation flow table row 25102 after the operation flow table row 25101. Adding a constant "ELSE" representing "true" as the content of the condition cell of the operation flow table row 25102, and adding the content of the flow step 70 to the instruction cell of the operation flow table row 25102.

Further, the operation flow table row 25101 and the operation flow table row 25102 are two mutually exclusive branch operation flows of the conditional branch operation flow, therefore, setting the operation flow table row 25101 and the operation flow table row 25102 to be mutually exclusive, and correspondingly, setting circular marks on the left side of the condition cells of the two operation flow table rows and connecting the two circular marks with a vertical line, indicating the mutually exclusive relationship between the two in the format.

Step 25, further acquiring the subsequent operation flow, and creating a new operation flow table row 20006 for the flow step 73. The operation flow table row 20006 comprises a condition cell corresponding to the condition column 601 of the operation flow table and an instruction cell corresponding to the instruction column 602 of the operation flow table. As the flow step 73 is a conditional branch operation flow, adding the execution condition of the flow step 73 to the condition cell of the operation flow table row 20006, and adding the subsequent operation instructions, that is, the content of flow step 74, to the instruction cell of the operation flow table row 20006.

Step 26, acquiring the first flow step in the machine tool sub-flow. As the flow step 89 is a conditional branch operation flow, creating a new operation flow table 30000 for the flow step 89. The operation flow table 30000 comprises a condition column 601 and an instruction column 602. Creating an operation flow table row 30001 in the operation flow table 30000. The operation flow table row 30001 comprises a condition cell corresponding to the condition column 601 of the operation flow table and an instruction cell corresponding to the instruction column 602 of the operation flow table. Adding the execution condition of the flow step 89 to the condition cell of the operation flow table row 30001.

Then, starting from step 27, processing other flow steps in the branch operation flow that is determined to be true by the flow step 89.

Step 27, as the flow step 91 is a conditional branch operation flow, creating a new operation flow table 31000 for the flow step 91, and embedding the operation flow table 31000 hierarchically under the operation flow table row 30000. The operation flow table 31000 comprises a condition column 601 and an instruction column 602. Creating an operation flow table row 31001 in the operation flow table 31000. The operation flow table row 31001 comprises a condition cell corresponding to the condition column 601 of the operation flow table and an instruction cell corresponding to the instruction column 602 of the operation flow table. Adding the execution condition of the flow step 91 to the condition cell of the operation flow table row 31001, and adding the subsequent operation instructions, that is, the content of flow step 93, to the instruction cell of the operation flow table row 31001.

Further, setting the cell format of the condition cell of the operation flow table row 31001 according to the hierarchical relationship between the operation flow table 30000 and the operation flow table 31000, so that the content in the condition cell of the operation flow table row 31001 is indented by a set width compared to the content of the operation flow table row 30001, indicating the hierarchical relationship between the two.

Then, starting from step 28, processing other flow steps of the branch operation flow that is determined to be true by the flow step 91.

Step 28, as the flow step 94 is a conditional branch operation flow, creating a new operation flow table 31100 for the flow step 94, and embedding the operation flow table 31100 hierarchically under the operation flow table row 31000. The operation flow table 31100 comprises a condition column 601 and an instruction column 602. Creating an operation flow table row 31101 in the operation flow table 31100. The operation flow table row 31101 comprises a condition cell corresponding to the condition column 601 of the operation flow table and an instruction cell corresponding to the instruction column 602 of the operation flow table. Adding the execution condition of the flow step 94 to the condition cell of the operation flow table row 31101.

Further, setting the cell format of the condition cell of the operation flow table row 31101 according to the hierarchical relationship between the operation flow table 31000 and the operation flow table 31100, so that the content in the condition cell of the operation flow table row 31101 is indented by a set width compared to the content of the operation flow table row 31001, indicating the hierarchical relationship between the two.

Then, starting from step 29, processing other flow steps of the branch operation flow that is determined to be true by the flow step 94.

Step 29, as the flow step 96 is a conditional branch operation flow, creating a new operation flow table 31110 for the flow step 94, and embedding the operation flow table 31110 hierarchically under the operation flow table row 31100. The operation flow table 31110 comprises a condition column 601 and an instruction column 602. Creating an operation flow table row 31111 in the operation flow table 31110. The operation flow table row 31111 comprises a condition cell corresponding to the condition column 601 of the operation flow table and an instruction cell corresponding to the instruction column 602 of the operation flow table. Adding the execution condition of the flow step 96 to the condition cell of the operation flow table row 31111, and adding the subsequent operation instructions, that is, the content of flow steps 98, 99, to the instruction cell of the operation flow table row 31111.

Further, setting the cell format of the condition cell of the operation flow table row 31111 according to the hierarchical relationship between the operation flow table 31100 and the operation flow table 31110, so that the content in the condition cell of the operation flow table row 31111 is indented by a set width compared to the content of the operation flow table row 31101, indicating the hierarchical relationship between the two.

Step 30, as the flow steps 103, 104 are operation instructions, creating a new operation flow table row 31112 after the operation flow table row 31111, and adding a constant "ELSE" representing "true" as the content of the condition cell of the operation flow table row 31112, and adding the content of the flow steps 103, 104 to the instruction cell of the operation flow table row 31112.

Further, the operation flow table row 31111 and the operation flow table row 31112 are two mutually exclusive branch operation flows of the conditional branch operation flow, therefore, setting the operation flow table row 31111 and the operation flow table row 31112 to be mutually exclusive, and correspondingly, setting circular marks on the left side of the condition cells of the two operation flow table rows and connecting the two circular marks with a vertical line, indicating the mutually exclusive relationship between the two in the format.

Step 31, further acquiring the subsequent operation flow, and creating a new operation flow table row 31102 for the flow step 107. The operation flow table row 31102 comprises a condition cell corresponding to the condition column 601 of the operation flow table and an instruction cell corresponding to the instruction column 602 of the operation flow table. As the flow step 107 is a conditional branch operation flow, adding the execution condition of the flow step 107 to the condition cell of the operation flow table row 31102, and adding the subsequent operation instructions, that is, the content of flow steps 109, 110, to the instruction cell of the operation flow table row 31102.

Then, starting from step 32, processing the branch operation flow that is determined to be false by the flow step 107.

Step 32, as the flow steps 114, 115 are operation instructions, creating a new operation flow table row 31103 after the operation flow table row 31102, and adding a constant "ELSE" representing "true" as the content of the condition cell of the operation flow table row 31103, and adding the content of the flow steps 114, 115 to the instruction cell of the operation flow table row 31103.

Further, the operation flow table row 31102 and the operation flow table row 31103 are two mutually exclusive branch operation flows of the conditional branch operation flow, therefore, setting the operation flow table row 31102 and the operation flow table row 31103 to be mutually exclusive, and correspondingly, setting circular marks on the left side of the condition cells of the two operation flow table rows and connecting the two circular marks with a vertical line, indicating the mutually exclusive relationship between the two in the format.

Step 33, further acquiring the subsequent operation flow, and creating a new operation flow table row 30002 for the flow step 119. The operation flow table row 30002 comprises a condition cell corresponding to the condition column 601 of the operation flow table and an instruction cell corresponding to the instruction column 602 of the operation flow table. As the flow step 119 is a conditional branch operation flow, adding the execution condition of the flow step 119 to the condition cell of the operation flow table row 30002.

Then, starting from step 34, processing other flow steps of the branch operation flow that is determined to be true by the flow step 119.

And starting from step 35, processing the branch operation flow that is determined to be false by the flow step 119.

Step 34, as the flow step 121 is a conditional branch operation flow, creating a new operation flow table 32000 for the flow step 121, and embedding the operation flow table 32000 hierarchically under the operation flow table row 30000. The operation flow table 32000 comprises a condition column 601 and an instruction column 602. Creating an operation flow table row 32001 in the operation flow table 32000. The operation flow table row 32001 comprises a condition cell corresponding to the condition column 601 of the operation flow table and an instruction cell corresponding to the instruction column 602 of the operation flow table. Adding the execution condition of the flow step 121 to the condition cell of the operation flow table row 32001, and adding the subsequent operation instructions, that is, the content of flow steps 123, 124, to the instruction cell of the operation flow table row 32001.

Further, setting the cell format of the condition cell of the operation flow table row 32001 according to the hierarchical relationship between the operation flow table 30000 and the operation flow table 32000, so that the content in the condition cell of the operation flow table row 32001 is indented by a set width compared to the content of the operation flow table row 30002, indicating the hierarchical relationship between the two.

Step 35, further acquiring the subsequent operation flow, can creating a new operation flow table row 30003 for the flow step 127. The operation flow table row 30003 comprises a condition cell corresponding to the condition column 601 of the operation flow table and an instruction cell corresponding to the instruction column 602 of the operation flow table. As the flow step 127 is a conditional branch operation flow, adding the execution condition of the flow step 127 to the condition cell of the operation flow table row 30003.

Then, starting from step 36, processing other flow steps of the branch operation flow that is determined to be true by the flow step 127.

And starting from step 27, processing the branch operation flow that is determined to be false by the flow step 127.

Step 36, as the flow step 129 is a conditional branch operation flow, creating a new operation flow table 33000 for the flow step 129, and embedding the operation flow table 33000 hierarchically under the operation flow table row 30000. The operation flow table 33000 comprises a condition column 601 and an instruction column 602. Creating an operation flow table row 33001 in the operation flow table 33000. The operation flow table row 33001 comprises a condition cell corresponding to the condition column 601 of the operation flow table and an instruction cell corresponding to the instruction column 602 of the operation flow table. Adding the execution condition of the flow step 129 to the condition cell of the operation flow table row 33001, and adding the subsequent operation instructions, that is, the content of flow steps 131, 132, to the instruction cell of the operation flow table row 33001.

Further, setting the cell format of the condition cell of the operation flow table row 33001 according to the hierarchical relationship between the operation flow table 30000 and the operation flow table 33000, so that the content in the condition cell of the operation flow table row 33001 is indented by a set width compared to the content of the operation flow table row 30003, indicating the hierarchical relationship between the two.

Step 37, further acquiring the subsequent operation flow, and can creating a new operation flow table row 30004 for the flow step 135. The operation flow table row 30004 comprises a condition cell corresponding to the condition column 601 of the operation flow table and an instruction cell corresponding to the instruction column 602 of the operation flow table. As the flow step 135 is a conditional branch operation flow, adding the execution condition of the flow step 135 to the condition cell of the operation flow table row 30004.

Then, starting from step 38, processing other flow steps of the branch operation flow that is determined to be true by the flow step 135.

And starting from step 39, processing the branch operation flow that is determined to be false by the flow step 135.

Step 38, as the flow step 137 is a conditional branch operation flow, creating a new operation flow table 34000 for the flow step 137, and embedding the operation flow table 34000 hierarchically under the operation flow table row 30000. The operation flow table 34000 comprises a condition column 601 and an instruction column 602. Creating an operation flow table row 34001 in the operation flow table 34000. The operation flow table row 34001 comprises a condition cell corresponding to the condition column 601 of the operation flow table and an instruction cell corresponding to the instruction column 602 of the operation flow table. Adding the execution condition of the flow step 137 to the condition cell of the operation flow table row 34001, and adding the subsequent operation instructions, that is, the content of flow steps 139, 140, to the instruction cell of the operation flow table row 34001.

Further, setting the cell format of the condition cell of the operation flow table row 34001 according to the hierarchical relationship between the operation flow table 30000 and the operation flow table 34000, so that the content in the condition cell of the operation flow table row 34001 is indented by a set width compared to the content of the operation flow table row 30004, indicating the hierarchical relationship between the two.

Step 39, further acquiring the subsequent operation flow, and creating a new operation flow table row 30005 for the flow step 143. The operation flow table row 30005 comprises a condition cell corresponding to the condition column 601 of the operation flow table and an instruction cell corresponding to the instruction column 602 of the operation flow table. As the flow step 143 is a conditional branch operation flow, adding the execution condition of the flow step 143 to the condition cell of the operation flow table row 30005.

Then, starting from step 40, processing other flow steps of the branch operation flow that is determined to be true by the flow step 143.

Step 40, as the flow step 145 is a conditional branch operation flow, creating a new operation flow table 35000 for the flow step 145, and embedding the operation flow table 35000 hierarchically under the operation flow table row 30000. The operation flow table 35000 comprises a condition column 601 and an instruction column 602. Creating an operation flow table row 35001 in the operation flow table 35000. The operation flow table row 35001 comprises a condition cell corresponding to the condition column 601 of the operation flow table and an instruction cell corresponding to the instruction column 602 of the operation flow table. Adding the execution condition of the flow step 145 to the condition cell of the operation flow table row 35001, and adding the subsequent operation instructions, that is, the content of flow step 147, 148, to the instruction cell of the operation flow table row 35001.

Further, setting the cell format of the condition cell of the operation flow table row 35001 according to the hierarchical relationship between the operation flow table 30000 and the operation flow table 35000, so that the content in the condition cell of the operation flow table row 35001 is indented by a set width compared to the content of the operation flow table row 30005, indicating the hierarchical relationship between the two.

By the aforementioned steps 1-40, the specific process of the tabular processing the detailed operation flow of the automated production system of the present embodiment by the method for tabular processing of operation flow is described.

Figure 6:
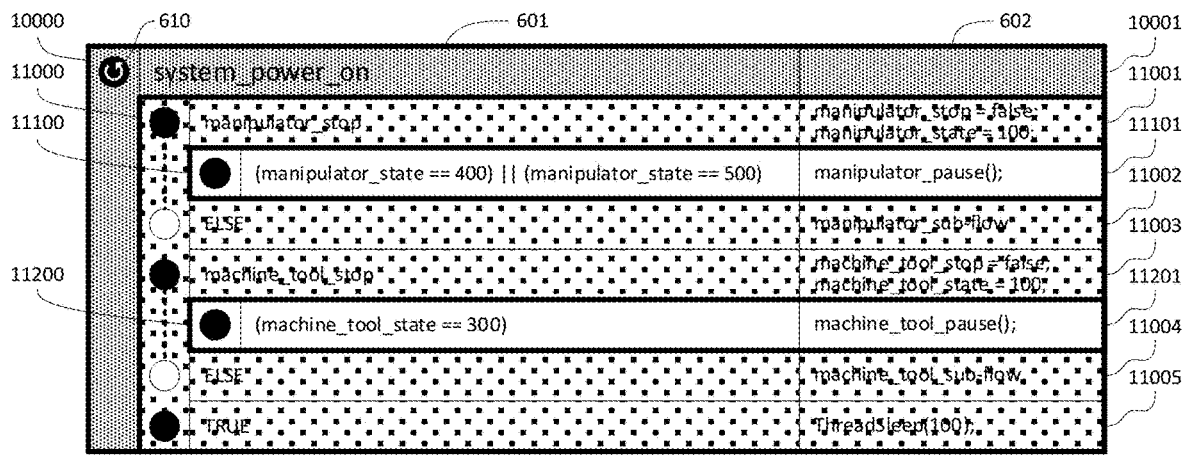
FIG. 6 shows an operation flow table of the main flow in embodiment 1 of the present invention.
Figure 8:
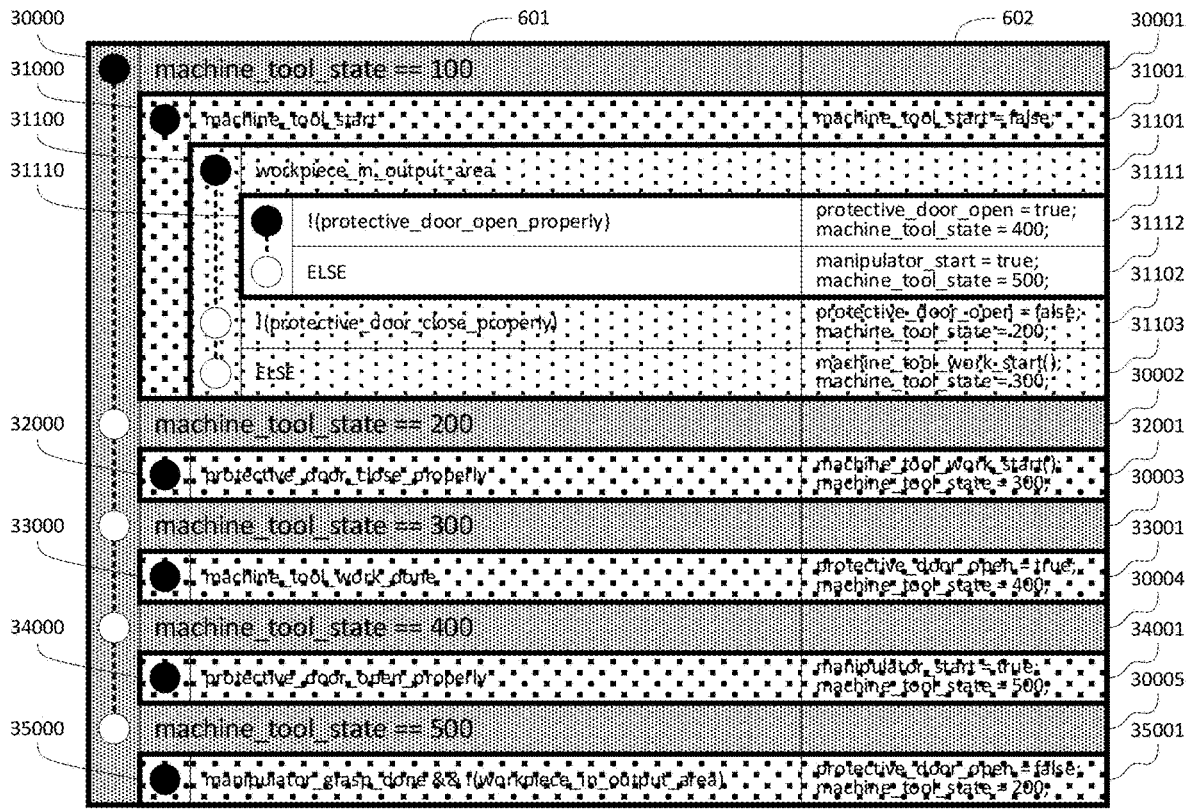
FIG. 8 shows an operation flow table of the machine tool sub-flow in embodiment 1 of the present invention.

During the aforementioned tabular processing of operation flow, according to the creation of operation flow table 10000 for the main flow in step 1, and further adding 40 operation flow table rows in the operation flow table 10000 (as shown in FIGS. 6 and 8) by steps 1-40, it can be seen that the method for tabular processing of operation flow automatically creates a blank operation flow table for the operation flow (step S1). By gradually adding each flow step of the operation flow to the operation flow table, a final operation flow table equivalent to the operation flow is generated.

After creating the blank operation flow table, it is necessary to acquire the flow steps of the operation flow sequentially, and determine the types of the flow steps, that is, whether the flow step is an operation instruction, a conditional branch operation flow or a loop operation flow. It is equivalent to determining the operation flow type corresponding to the flow step in the operation flow (step S2).

After determining the operation flow type of the flow step, in step 1, creating an operation flow table row 10001 according to the corresponding loop operation flow, and creating an operation flow table 11000 hierarchically embedded under the operation flow table row 10001 for generating the subsequent operation flow table row. From the above process, it can be seen that for a series of flow steps that belong to the same loop in the operation flow, an operation flow table row is generated correspondingly. This process is equivalent to combining, according to a predetermined flow step sequence, the continuous flow steps in the operation flow into at least one flow step sequence corresponding to the operation flow types (step S3), and generating a corresponding operation flow table row in the current operation flow table for the flow step sequence. This can also be reflected in steps 2 to 4. In steps 2 to 4, the corresponding operation flow table row 11001 and operation flow table row 11002 are generated for the flow steps 3, 5, 6, 7, 9, 14 that belong to the same conditional branch operation flow (flow steps 7, 9 are conditional branch operation flows of a conditional branch operation flow, therefore, they are processed by embedding an operation flow table 11100 hierarchically under the operation flow table row 11001).

Further, according to steps 2 to 8, it can be seen that for the first flow step sequence as conditional branch operation flow (flow steps 3, 5, 6, 7, 9, 14), the second flow step sequence as conditional branch operation flow (flow steps 78, 80, 81, 82, 83, 87) and the flow step 153 as an operation instruction (equivalent to a third flow step sequence as an operation instruction), sequentially acquiring these flow step sequences and generating corresponding operation flow table rows 11001 to 11005. This process is equivalent to sequentially acquiring the flow step sequence from the operation flow, according to the operation flow type of the flow step sequence, on the basis of a predetermined row generation rule corresponding to the flow step sequence having the operation flow types, sequentially generating, in the operation flow table, operation flow table rows corresponding to the flow step sequence (step S4).

Finally, after all the flow steps are acquired, the operation flow table corresponding to the entire operation flow is generated. This is equivalent to judging whether the flow steps have all been acquired, if it is judged to be no, returning to said step S2, if it is judged to be yes, obtaining and outputting the final operation flow table (step S5). Besides, the above process still acquires flow steps by the steps 9 to 40 after the flow step 153 is acquired. In fact, the steps 9 to 40 correspond to the procedures in processing flow step 14 and flow step 87, which are placed after step 8 for ease of description.

The method for tabular processing of operation flow of the present embodiment is roughly described above, and the tabularization of the operation flow can be achieved by the method. Next, the method for tabular processing of operation flow will be described in more detail.

The operation flow table comprises a condition column and an instruction column (refer to the condition column 601 and the instruction column 602 in FIG. 6).

Figure 7:
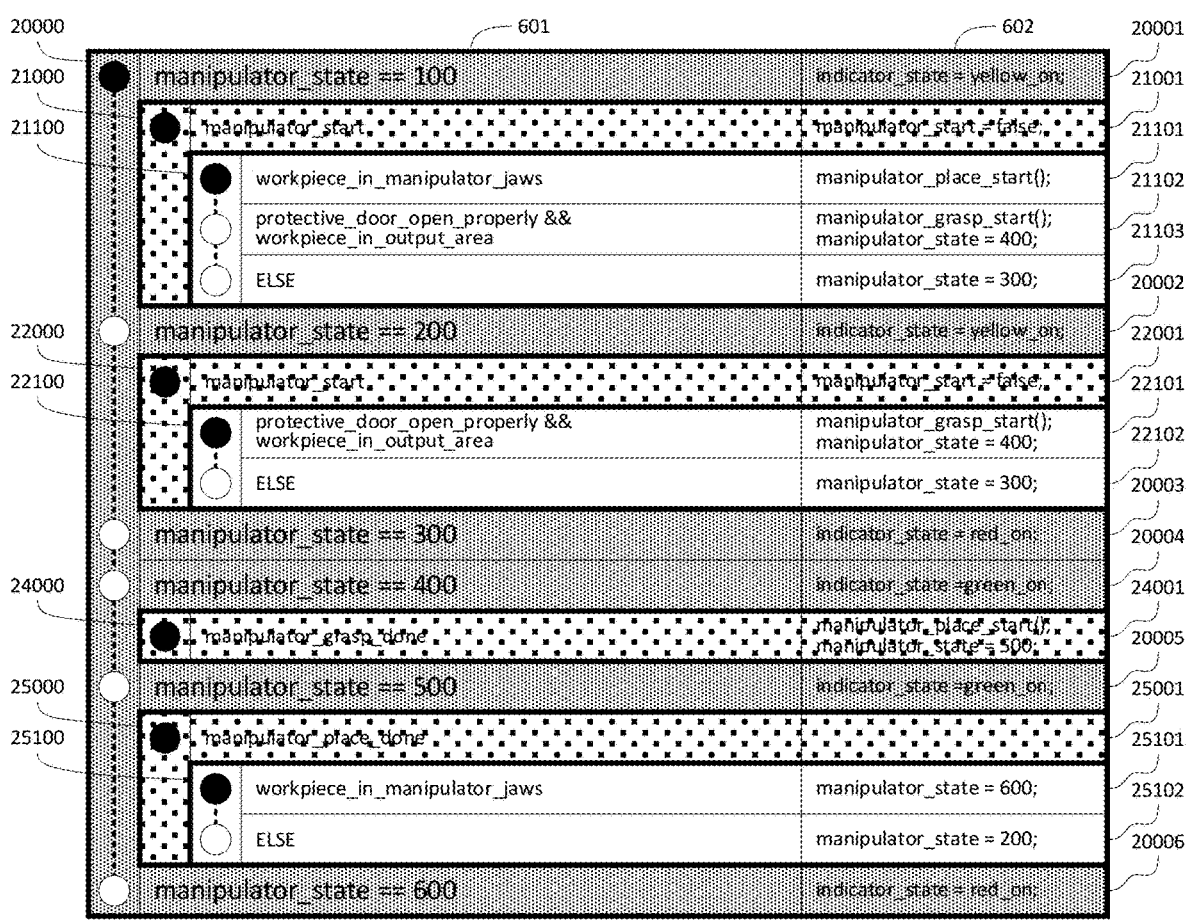
FIG. 7 shows an operation flow table of the manipulator sub-flow in embodiment 1 of the present invention.

In the present embodiment, when generating the operation flow table row 10001 in the operation flow table 10000, the operation flow table row 10001 comprises a condition cell corresponding to the condition column 601 of the operation flow table and an instruction cell corresponding to the instruction column 602 of the operation flow table. As shown in FIGS. 6 to 8, the condition cell is positioned at the condition column 601, and the instruction cell is positioned at the instruction column 602.

According to step 2, for the flow step 3 corresponding to a conditional branch operation flow, the execution condition "manipulator_stop" is added to the condition cell of the operation flow table row 11001, which is equivalent to that the condition cell is at least used for adding the flow step for executing determination in the operation flow, and taking the flow step as execution condition.

According to step 2, the flow steps 5 and 6 as operation instructions (equivalent to the flow step sequence corresponding to operation instruction type operation flow) is added to the instruction cell of the operation flow table row 11001, which is equivalent to that the instruction cell is at least used for adding the flow step for executing operation in the operation flow as operation instruction.

In step S4 of the method for tabular processing of operation flow, according to the different operation flow types corresponding to the flow step sequences, it is necessary to generate operation flow table rows according to different predetermined row generation row.

When the operation flow type is operation instruction type operation flow (that is, the flow step is an operation instruction), as mentioned in step 8, the third flow step sequence (the flow step 153) is an operation instruction type flow step sequence. At this point, creating a new operation flow table row 11005 after the operation flow table row 11004, and adding a constant "TRUE" representing "true" as the content of the condition cell of the operation flow table row 11005, further, adding the content of the flow step 153 to the instruction cell of the operation flow table row 11005. This process is equivalent to the following steps: sequentially generating an operation flow table row as a current operation flow table row (step A1); adding a true value as execution condition to the condition cell of the current operation flow table row (step A2); sequentially acquiring the flow steps in the corresponding operation instruction type flow step sequence and adding the flow steps to the instruction cell of the current operation flow table row (step A3).

Meanwhile, as mentioned in step 2, the subsequent flow steps 5, 6 is added to the instruction cell of the operation flow table row 11001 as operation instructions. It is the same in steps 5, 12 and etc. Therefore, the flow steps that are both operation instructions and consecutive is processed uniformly, which is equivalent to that the flow step combination rule corresponding to these flow steps is combing the continuous flow steps in the instruction type operation flow into an operation instruction type flow step sequence.

When the operation flow type is conditional branch operation flow, as mentioned in steps 2 to 4, for the first flow step sequence as conditional branch operation flow (flow steps 3, 5, 6, 7, 9, 14), corresponding operation flow table rows 11001 and 11002 is generated for the two branch flows of the flow step sequence (flow steps 5, 6, 7, 9 and flow step 14) respectively. This is equivalent to that the flow step combination rule for the conditional branch operation flow is combining the branch operation flow in the conditional branch operation flow and the execution condition corresponding to the branch operation flow into a conditional branch type flow step sequence, and sequentially generating corresponding operation flow table rows in the operation flow table according to the conditional branch type flow step sequence (step B1).

Meanwhile, the condition cells of the two rows 11001 and 11002 are respectively added with the flow step 3 as execution condition and the constant "ELSE" representing "true". Meanwhile, the two rows are correspondingly set to be mutually exclusive. This is equivalent to adding the execution conditions corresponding to the conditional branch type flow step sequence to the condition cell of the operation flow table rows, and setting the generated operation flow table rows to be mutually exclusive (step B2).

Next, after creating the operation flow table row and adding the execution condition, in step 2 and 3, sequentially processing in the operation flow table row 11001 for the flow steps 5, 6, 7, 9, and in step 4, processing in the operation flow table row 11002 for the flow step 14. Therefore, this process is equivalent to that for each conditional branch type flow step sequence, sequentially acquiring the flow steps in the branch operation flow and sequentially processing thereof (step B3).

Similarly, corresponding to steps S2, S3, S4, when processing each branch operation flow, determining the operation flow type corresponding to each flow step in the corresponding branch operation flow. Further, combing the continuous flow steps corresponding to the same operation flow type into a flow step sequence corresponding to the operation flow type (equivalent to a sub-flow step sequence).

If the first sub-flow step sequence corresponds to the operation instruction type operation flow, as shown in the processing procedure of flow steps 5 and 6 in step 2, the procedure is equivalent to sequentially adding each flow step in the sub-flow step sequence as an operation instruction to the instruction cell of the operation flow table row of the corresponding branch operation flow.

If the sub-flow step sequence does not correspond to operation instruction type operation flow in the conditional branch operation flow, as shown in the processing procedure of flow steps 7 and 9 in step 3, the procedure is equivalent to generating a sub-operation flow table corresponding to the corresponding branch operation flow, and sequentially generating operation flow table rows corresponding to the sub-flow step sequence in the sub-operation flow table based on the predetermined row generation rule corresponding to the conditional branch type flow step sequence. Wherein, the sub-operation flow table is embedded hierarchically under the operation flow table row corresponding to the branch operation flow (for example, the sub-operation flow table 11101 is embedded under the operation flow table row 11001).

Meanwhile, for each branch operation flow that is a sub-flow step sequence of the conditional branch operation flow, the processing method also adopts the predetermined row generation rule. The specific process is the same as the aforementioned process. Similarly, generating operation flow table rows corresponding to each branch operation flow, and sequentially processing the flow steps of each branch operation flow.

When the operation flow type is loop operation flow, as mentioned in step 1, for the flow step sequence as the loop operation flow, first adding an operation flow table row 10001 in the operation flow table 10000, which is equivalent to sequentially generating an operation flow table row in the operation flow table as a current operation flow table row (step D1).

Next, adding the execution condition "systempower on" of the flow step 1 to the condition cell of the operation flow table row 10001, and setting a mark 610 with a circle and a rotation arrow inside the circle on the left side of the content of the condition cell of the operation flow table row 10001. This is equivalent to that the current operation flow table row further comprises a loop attribute cell, adding the current flow step as execution condition to the condition cell of the current operation flow table row, and adding a loop execution attribute in the loop attribute cell (step D2).

According to step 2, as the flow step 3 is a conditional branch operation flow, generating a new operation flow table 11000 for the flow step 3. Therefore, when processing the loop sub-flow, it is necessary to determine the operation flow type of each flow step in the loop sub-flow. Further, combining the continuous flow steps in the loop operation flow step sequence into sub-flow step sequence having the corresponding operation flow type (step D3), which is the same as the corresponding processing procedure in the predetermined row generation rule of the conditional branch operation flow. Meanwhile, as each flow step in the loop sub-flow is processed sequentially, it is equivalent to treating the loop sub-flow as a loop operation flow step sequence. That is, the flow step combination rule for the loop operation flow is combining the execution condition of the loop operation flow and the loop sub-flow into a loop operation flow step sequence.

If the sub-flow step sequence does not correspond to operation instruction type in the conditional branch operation flow, as shown in the processing procedure of flow step 3 in step 2, the procedure is equivalent to first generating a sub-operation flow table corresponding to the loop operation flow, and sequentially generating operation flow table rows corresponding to the sub-flow step sequence in the sub-operation flow table according to the predetermined row generation rule corresponding to the operation flow type. Wherein, the sub-operation flow table is hierarchically embedded under the corresponding operation flow table row (for example, the sub-operation flow table 11000 is embedded under the operation flow table row 10001).

If the first sub-flow step sequence corresponds to operation instruction type operation flow in the conditional branch operation flow, adding each flow step in the sub-flow step sequence to the instruction cell of the operation flow table row corresponding to the branch operation flow as operation instructions.

Next, taking the operation flow table 10000 obtained by the above tabular processing procedure as an example, the method for executing operation flow according to the operation flow table 10000 is introduced below. The specific steps are as follows:

Step 1, acquiring the first operation flow table row 10001 of the operation flow table 10000, determining whether the execution condition "system_power_on" in the condition cell of the operation flow table row 10001 is true, and if so, further acquiring the lower-level operation flow table 11000 embedded in the operation flow table row 10001. Executing the next step.

Step 2, acquiring the first operation flow table row 110001 of the operation flow table 11000, and determining whether execution condition "manipulator_stop" in the condition cell of the operation flow table row 110001 is true.

If yes, acquiring and executing the content "manipulator_stop=false;" and "manipulator_state=100;" in the instruction cell of the operation flow table row 110001, then, further acquiring the lower-level operation flow table 11000 embedded in the operation flow table row 10001, and executing step 3, then, acquiring the next operation flow table row 10003 that is non-mutually exclusive with the operation flow table row 11001, and executing step 5.

Otherwise, acquiring the next operation flow table row 11002 and executing step 4.

Step 3, acquiring the first operation flow table row 11101 of the operation flow table 11100, and determining whether the execution condition in the condition cell of the operation flow table row 11101 is true.

If yes, acquiring the content in the instruction cell of the operation flow table row 11101.

Step 4, the execution condition in the condition cell of the operation flow table row 11002 is true, therefore acquiring and executing the content in the instruction cell of the operation flow table row 11001. The operation instruction in the instruction cell of the operation flow table row 11001 is calling the manipulator sub-flow, therefore starting from step 9, executing the manipulator sub-flow. The operation flow table row 11002 does not have any lower-level operation flow table embedded, therefore immediately executing step 5 after the manipulator sub-flow is completed.

Step 5, determining whether the execution condition in the condition cell of the operation flow table row 11003 is true.

If yes, acquiring the content in the instruction cell of the operation flow table row 11003, then, further acquiring the lower-level operation flow table 11200 embedded in the operation flow table row 11003, and executing step 6, then, acquiring the next operation flow table row 11005 that is non-mutually exclusive with the operation flow table row 11003, and executing step 8.

Otherwise, acquiring the next operation flow table row 11004 and executing step 7.

Step 6, acquiring the first operation flow table row 11201 of the operation flow table 11200, and determining whether the execution condition in the condition cell of the operation flow table row 11201 is true.

If yes, acquiring and executing the content in the instruction cell of the operation flow table row 11201.

Step 7, the execution condition in the condition cell of the operation flow table row 11004 is true, therefore acquiring and executing the content in the instruction cell of the operation flow table row 11004. The operation instruction in the instruction cell of the operation flow table row 11004 is calling the machine tool sub-flow, therefore starting from step 26 and executing the machine tool sub-flow. The operation flow table row 11004 does not have any lower-level operation flow table embedded, therefore immediately executing step 8 after the machine tool sub-flow is completed.

Step 8, the execution condition in the condition cell of the operation flow table row 11005 is true, therefore acquiring and executing the content in the instruction cell of the operation flow table row 11005. As it is the last flow table row of the main operation flow table, and the loop execution attribute value of the operation flow table row 11001 is executing cyclically, therefore returning to step 1 and continue execution.

Step 9, acquiring the first operation flow table row 20001 of the operation flow table 20000, and determining whether the execution condition in the condition cell of the operation flow table row 20001 is true.

If yes, executing the content in the instruction cell of the operation flow table row 20001, further acquiring the lower-level operation flow table 21000 embedded in the operation flow table row 20001, and executing step 10.

Step 10, acquiring the first operation flow table row 21001 of the operation flow table 21000, and determining whether the execution condition in the condition cell of the operation flow table row 21001 is true.

If yes, acquiring the content in the instruction cell of the operation flow table row 21001, further acquiring the lower-level operation flow table 21100 embedded in the operation flow table row 21001, and executing step 11.

Step 11, acquiring the first operation flow table row 21101 of the operation flow table 21100, and determining whether the execution condition in the condition cell of the operation flow table row 21101 is true.

If yes, acquiring and executing the content in the instruction cell of the operation flow table row 21101.

Otherwise, acquiring the next operation flow table row 21102 and executing step 12.

Step 12, determining whether the execution condition in the condition cell of the operation flow table row 21102 is true.

If yes, acquiring and executing the content in the instruction cell of the operation flow table row 21102.

Otherwise, acquiring the next operation flow table row 21103 and executing step 13.

Step 13, determining whether the execution condition in the condition cell of the operation flow table row 21103 is true.

If yes, acquiring and executing the content in the instruction cell of the operation flow table row 21103.

Step 14, determining whether the execution condition in the condition cell of the operation flow table row 20002 is true.

If yes, acquiring and executing the content in the instruction cell of the operation flow table row 20002, further acquiring the lower-level operation flow table 22000 embedded in the operation flow table row 20002, and executing step 15.

Otherwise, acquiring the next operation flow table row 20003 and executing step 18.

Step 15, acquiring the first operation flow table row 22001 of the operation flow table 22000, and determining whether the execution condition in the condition cell of the operation flow table row 22001 is true.

If yes, acquiring and executing the content in the instruction cell of the operation flow table row 22001, further acquiring the lower-level operation flow table 22100 embedded in the operation flow table row 22001, and executing step 16.

Step 16, acquiring the first operation flow table row 22101 of the operation flow table 22100, and determining whether the execution condition in the condition cell of the operation flow table row 22101 is true.

If yes, acquiring and executing the content in the instruction cell of the operation flow table row 22101.

Otherwise, acquiring the next operation flow table row 22102 and executing step 17.

Step 17, determining whether the execution condition in the condition cell of the operation flow table row 22102 is true.

If yes, acquiring and executing the content in the instruction cell of the operation flow table row 22102.

Step 18, determining whether the execution condition in the condition cell of the operation flow table row 20003 is true.

If yes, acquiring and executing the content in the instruction cell of the operation flow table row 20003.

Otherwise, acquiring the next operation flow table row 20004 and executing step 19.

Step 19, determining whether the execution condition in the condition cell of the operation flow table row 20004 is true.

If yes, acquiring and executing the content in the instruction cell of the operation flow table row 20004, further acquiring the lower-level operation flow table 24000 embedded in the operation flow table row 20004, and executing step 20.

Otherwise, acquiring the next operation flow table row 20005 and executing step 21.

Step 20, determining whether the execution condition in the condition cell of the operation flow table row 24001 is true.

If yes, acquiring and executing the content in the instruction cell of the operation flow table row 24001.

Step 21, determining whether the execution condition in the condition cell of the operation flow table row 20005 is true.

If yes, acquiring and executing the content in the instruction cell of the operation flow table row 20005, further acquiring the lower-level operation flow table 25000 embedded in the operation flow table row 20005, and executing step 22.

Otherwise, acquiring the next operation flow table row 20006 and executing step 25.

Step 22, acquiring the first operation flow table row 25001 of the operation flow table 25000, and determining whether the execution condition in the condition cell of the operation flow table row 25001 is true.

If yes, acquiring and executing the content in the instruction cell of the operation flow table row 25001, further acquiring the lower-level operation flow table 25100 embedded in the operation flow table row 25001, and executing step 23.

Step 23, acquiring the first operation flow table row 25101 of the operation flow table 25100, and determining whether the execution condition in the condition cell of the operation flow table row 25101 is true.

If yes, acquiring and executing the content in the instruction cell of the operation flow table row 25101.

Otherwise, acquiring the next operation flow table row 25102 and executing step 24.

Step 24, determining whether the execution condition in the condition cell of the operation flow table row 25102 is true.

If yes, acquiring and executing the content in the instruction cell of the operation flow table row 25102.

Step 25, determining whether the execution condition in the condition cell of the operation flow table row 20006 is true.

If yes, acquiring and executing the content in the instruction cell of the operation flow table row 20006.

Step 26, acquiring the first operation flow table row 30001 of the operation flow table 30000, and determining whether the execution condition in the condition cell of the operation flow table row 30001 is true.

If yes, acquiring and executing the content in the instruction cell of the operation flow table row 30001, further acquiring the lower-level operation flow table 31000 embedded in the operation flow table row 30001, and executing step 27.

Otherwise, acquiring the next operation flow table row 30002 and executing step 33.

Step 27, acquiring the first operation flow table row 31001 of the operation flow table 31000, and determining whether the execution condition in the condition cell of the operation flow table row 31001 is true.

If yes, acquiring and executing the content in the instruction cell of the operation flow table row 31001, further acquiring the lower-level operation flow table 31100 embedded in the operation flow table row 31001, and executing step 28.

Step 28, acquiring the first operation flow table row 31101 of the operation flow table 31100, and determining whether the execution condition in the condition cell of the operation flow table row 31101 is true.

If yes, acquiring and executing the content in the instruction cell of the operation flow table row 31101, further acquiring the lower-level operation flow table 31110 embedded in the operation flow table row 31101, and executing step 29.

Otherwise, acquiring the next operation flow table row 31102 and executing step 31.

Step 29, acquiring the first operation flow table row 31111 of the operation flow table 31110, and determining whether the execution condition in the condition cell of the operation flow table row 31111 is true.

If yes, acquiring and executing the content in the instruction cell of the operation flow table row 31111.

Otherwise, acquiring the next operation flow table row 31112 and executing step 30.

Step 30, determining whether the execution condition in the condition cell of the operation flow table row 31112 is true.

If yes, acquiring and executing the content in the instruction cell of the operation flow table row 31112.

Step 31, determining whether the execution condition in the condition cell of the operation flow table row 31102 is true.

If yes, acquiring and executing the content in the instruction cell of the operation flow table row 31102.

Otherwise, acquiring the next operation flow table row 31103 and executing step 32.

Step 32, determining whether the execution condition in the condition cell of the operation flow table row 31103 is true.

If yes, acquiring and executing the content in the instruction cell of the operation flow table row 31103.

Step 33, determining whether the execution condition in the condition cell of the operation flow table row 30002 is true.

If yes, acquiring and executing the content in the instruction cell of the operation flow table row 30002, further acquiring the lower-level operation flow table 32000 embedded in the operation flow table row 30002, and executing step 34.

Otherwise, acquiring the next operation flow table row 30003 and executing step 35.

Step 34, acquiring the first operation flow table row 32001 of the operation flow table 32000, and determining whether the execution condition in the condition cell of the operation flow table row 32001 is true.

If yes, acquiring and executing the content in the instruction cell of the operation flow table row 32001.

Step 35, determining whether the execution condition in the condition cell of the operation flow table row 30003 is true.

If yes, acquiring and executing the content in the instruction cell of the operation flow table row 30003, further acquiring the lower-level operation flow table 33000 embedded in the operation flow table row 30003, and executing step 36.

Otherwise, acquiring the next operation flow table row 30004 and executing step 37.

Step 36, acquiring the first operation flow table row 33001 of the operation flow table 33000, and determining whether the execution condition in the condition cell of the operation flow table row 33001 is true.

If yes, acquiring and executing the content in the instruction cell of the operation flow table row 33001.

Step 37, determining whether the execution condition in the condition cell of the operation flow table row 30004 is true.

If yes, acquiring and executing the content in the instruction cell of the operation flow table row 30004, further acquiring the lower-level operation flow table 34000 embedded in the operation flow table row 30004, and executing step 38.

Otherwise, acquiring the next operation flow table row 30005 and executing step 39.

Step 38, acquiring the first operation flow table row 34001 of the operation flow table 34000, and determining whether the execution condition in the condition cell of the operation flow table row 34001 is true.

If yes, acquiring and executing the content in the instruction cell of the operation flow table row 34001.

Step 39, determining whether the execution condition in the condition cell of the operation flow table row 30005 is true.

If yes, acquiring and executing the content in the instruction cell of the operation flow table row 30005, further acquiring the lower-level operation flow table 35000 embedded in the operation flow table row 30005, and executing step 40.

Step 40, acquiring the first operation flow table row 35001 of the operation flow table 35000, and determining whether the execution condition in the condition cell of the operation flow table row 35001 is true.

If yes, acquiring and executing the content in the instruction cell of the operation flow table row 35001.

By the aforementioned steps 1 to 40, the specific execution process of the operation flow table corresponding to the automated production system of the present embodiment by the method for executing operation flow according to operation flow table is described.

According to steps 1 to 40, the method for executing operation flow according to operation flow table is mainly to sequentially read each row in the operation flow table and determine whether to execute and operation instruction in the instruction cell according to the execution condition in the condition cell. The specific process comprises essentially: sequentially acquiring operation flow table rows from the operation flow table as current operation flow table row (step S11); judging whether execution condition of condition cell of the current operation flow table row is true value, if it is judged to be no, return to step S11 (step S12); acquiring and executing operation instructions in instruction cell of the current operation flow table row (step S13); judging whether all the flow steps in the operation flow table have been executed, if it judged to be no, return to step S11, if it is judged to be yes, the operation flow has been executed (step S14).

Further, some operation flow contains branch operation flow, therefore, some of the operation flow table rows contains a sub-operation flow table hierarchically under the operation flow table row. In this situation, after processing the current operation flow table row by steps B11 to B13 which is identical to steps S11 to S13, an additional determination of the sub-operation flow table is necessary. As mentioned in step 2, after acquiring and executing the content in the instruction cell of the operation flow table row 11001, further acquiring the lower-level operation flow table 11100 embedded in the operation flow table row 11001, and executing step 3. Therefore, the process is equivalent to that after step B13, further judging whether there is the sub-operation flow embedded under the current operation flow table row, and if yes, executing the sub-operation flow table until the sub-operation flow table is executed (step B14).

Meanwhile, if there is a conditional branch operation flow, except that step B14 needs to be executed after step S13, the original step S14 also needs to be modified accordingly. As mentioned in step 2, after executing step 3, that is, after the operation flow table row 11001 is processed, further acquiring the next operation flow table row 11003 that is non-mutually exclusive with the operation flow table row 11001. This is equivalent to judging whether all the flow steps in the operation flow table have been executed, if it is judged to be no, acquiring next operation flow table row whose execution condition is non-mutually exclusive with the execution condition in condition cell of the current operation flow table row as current operation flow table row, and return to step B12, if it judged to be yes, the operation flow has been executed (step B15).

Further, if there is a loop operation flow, after processing the current operation flow table row by the steps D11 to D14 which is identical to the steps B11 to B14, an additional determination of the loop attribute cell is necessary. As mentioned in step 8, after acquiring and executing the content in the instruction cell of the operation flow table row 11005, the loop execution attribute value of the operation flow table row 10001 is executing cyclically, therefore, returning to step 1 to achieve the loop execution. This is equivalent to judging whether the loop attribute cell of the current operation flow table row has a loop execution attribute, and if it is judged to be yes, return to step D12, repeating executing the current operation flow table row (step D15). After the processing of step D15 is completed, traversing the operation flow table rows by step D16 which is identical to step B15.

Embodiment 2

In the aforementioned embodiment 1, the manipulator sub-flow and the machine tool sub-flow both comprise a plurality of chained conditional branch operation flow for determining the manipulator state and the machine tool state, respectively, and selecting to execute the branch operation flow that is consistent with the target state.

Therefore, it can be regarded as a switching branch operation flow, and the manipulator state and the machine tool state are the target index variables. In the present embodiment 2, the target state of each branch operation flow is the branch index value of the branch operation flow. When the value of the target index variable matches the branch index value of the branch operation flow, executing the branch operation flow. In the C language, the branch operation flow can also be described by switch . . . case statement. A plurality of mutually exclusive judgement statements represented by if . . . else statements can be equivalently rewritten as switch . . . case statements. In the following program, the corresponding command lines in the C language program in embodiment 1 is rewritten with the switch . . . case statements, and the operation flows of the two programs are consistent. The flow step numbers of the aforementioned operation flow correspond to the line numbers of the following C language program code. The C language program codes of the present embodiment 2 is as follows.

```
1:   while (system_power_on)
2:   {
3:     if (manipulator_stop)
4:     {
5:       manipulator_stop = false;
6:       manipulator_state = 100;
7:       if((manipulator_state == 400) || (manipulator_state == 500))
8:       {
9:         manipulator_pause( );
10:      }
11:    }
12:    else
13:    {
14:      switch (manipulator_state) // manipulator sub-flow
15:      { // branch operation flow
16:        case 100:
17:          // manipulator stopped
18:          indicator_state = yellow_on;
19:          if (manipulator_start)
20:          {
21:            manipulator_start = false;
22:            if (workpiece_in_manipulator_jaws)
23:              manipulator_place_start( );
```

```
24:            else if (protective_door_open_properly && workpiece_in_output_area)
25:            {
26:               manipulator_grasp_start( );
27:               manipulator_state = 400;
28:            }
29:            else
30:               manipulator_state = 300;
31:         }
32:         break;
33:      case 200:
34:         // manipulator waiting to grasp workpiece
35:         indicator_state = yellow_on;
36:         if (manipulator_start)
37:         {
38:            manipulator_start = false;
39:            if (protective_door_open_properly && workpiece_in_output_area)
40:            {
41:               manipulator_grasp_start( );
42:               manipulator_state = 400;
43:            }
44:            else
45:               manipulator_state = 300; // manipulator workpiece grasping error alarm
46:         }
47:         break;
48:      //
49:      case 300:
50:         // manipulator workpiece grasping error alarm
51:         indicator_state = red_on;
52:         break;
53:      case 400:
54:         // manipulator grasping workpiece
55:         indicator_state = green_on;
56:         if (manipulator_grasp_done)
57:         {
58:            manipulator_place_start( );
59:            manipulator_state = 500;
60:         }
61:         break;
62:      case 500:
63:         // manipulator placing workpiece
64:         indicator_state = green_on;
65:         if (manipulator_place_done)
66:         {
67:            if (workpiece_in_manipulator_jaws)
68:               manipulator_state = 600;
69:            else
70:               manipulator_state = 200;
71:         }
72:         break;
73:      case 600: // manipulator workpiece placing error alarm
74:         indicator_state = red_on;
75:         break;
76:   }
77: }
78: if (machine_tool_stop)
79: {
80:    machine_tool_stop = false;
81:    machine_tool_state = 100;
82:    if (machine_tool_state == 300)
83:       machine_tool_pause( );
84: }
85: else
86: {
87:    switch (machine_tool_state) // machine tool sub-flow
88:    { // branch operation flow
89:       case 100:
90:          // machine tool stepped
91:          if (machine_tool_start)
92:          {
93:             machine_tool_start = false;
94:             if (workpiece_in_output_area)
95:             {
96:                if (!protective_door_open_properly)
97:                {
98:                   protective_door_open = true;
99:                   machine_tool_state = 400;
100:               }
101:               else
102:               {
```

```
103:            manipulator_start = true;
104:            machine_tool_state = 500;
105:          }
106:        }
107:        else if (!protective_door_close_properly)
108:        {
109:          protective_door_open = false;
110:          machine_tool_state = 200;
111:        }
112:        else
113:        {
114:          machine_tool_work_start( );
115:          machine_tool_state = 300;
116:        }
117:      }
118:      break;
119:    case 200:
120:      // protective door closing
121:      if (protective_door_close_properly)
122:      {
123:        machine_tool_work_start( );
124:        machine_tool_state = 300;
125:      }
126:      break;
127:    case 300;
128:      // machine tool working
129:      if (machine_tool_work_done)
130:      {
131:        protective_door_open = true;
132:        machine_tool_state = 400;
133:      }
134:      break;
135:    case 400:
136:      // protective door opened
137:      if (protective_door_open_properly)
138:      {
139:        manipulator_start = true;
140:        machine_tool_state = 500;
141:      }
142:      break;
143:    case 500:
144:      // machine tool waiting to grasp workpiece
145:      if (manipulator_grasp_done && !workpiece_in_output_area)
146:      {
147:        protective_door_open = false;
148:        machine_tool_state = 200;
149:      }
150:      break;
151:    }
152:  }
153:  ThreadSleep(100);
154: }
```

Figure 9:
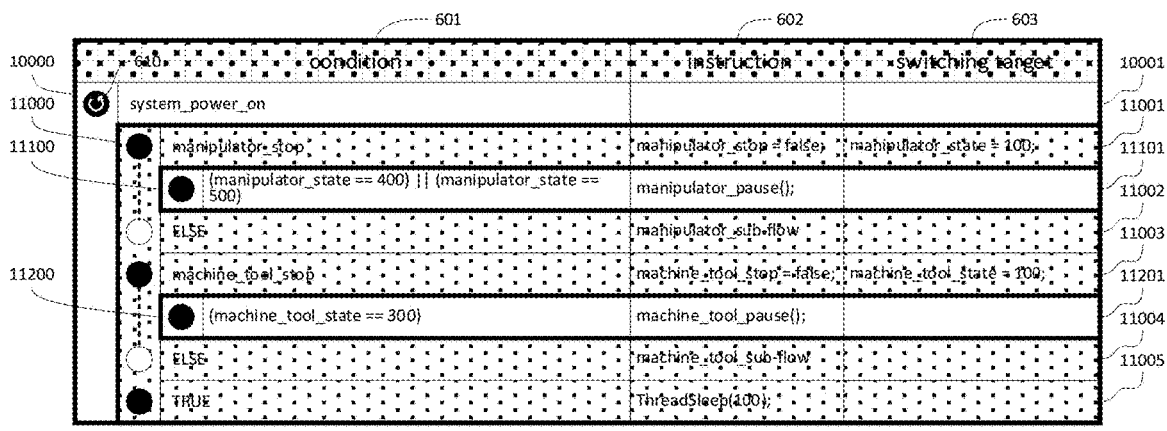
FIG. 9 shows an operation flow table of the main flow in embodiment 2 of the present invention.

In this embodiment 2, taking the tabular processing of the aforementioned operation flow as an example, the processing procedure is described in detail with reference to FIGS. 9 to 11.

Step 1, creating an operation flow table 10000 for the main flow. The operation flow table 10000 comprises a condition column 601, an instruction column 602 and a switching target column 603. Setting column titles "condition", "instruction" and "switching target" for these three columns, respectively. Adding an operation flow table row 10001 in the operation flow table 10000. The operation flow table row 10001 comprises a condition cell, an instruction cell and a switching target cell corresponding to the condition column 601, the instruction column 602 and the switching target column 603 of the operation flow table, respectively. Acquiring the aforementioned flow step 1, and as the flow step 1 is a conditional branch operation flow, adding the execution condition "systempower on" of the flow step 1 to the condition cell of the operation flow table row 10001.

Further, flow step 1 means executing the subsequent instructions cyclically on the premise that the execution condition of flow step 1 is met, therefore, setting the loop execution attribute value of the operation flow table row 10001 to loop execution, and correspondingly, setting a mark 610 with a circle and a rotation arrow inside the circle on the left side of the content of the condition cell of the operation flow table row 10001. The mark 610 is a corresponding setting on the format of the cell according to the loop execution attribute of the operation flow table row 10001, used for reflecting the execution method of flow step 1.

Then, starting from step 2, processing the branch operation flow that is determined to be true by the flow step 1.

Step 2, as the flow step 3 is a conditional branch operation flow, creating a new operation flow table 11000 for the flow step 3, and embedding the operation flow table 11000 hierarchically under the operation flow table row 10000. The operation flow table 11000 comprises a condition column 601, an instruction column 602 and a switching target column 603. Creating an operation flow table row 11001 in the operation flow table 11000. The operation flow table row 11001 comprises a condition cell, an instruction cell and a switching target cell corresponding to the condition column 601, the instruction column 602 and the switching target column 603 of the operation flow table, respectively. Adding the execution condition "manipulator_stop" of the flow step 3 to the condition cell of the operation flow table row 11001, and adding the subsequent operation instructions, that is, the content of the flow step 5, to the instruction cell of the operation flow table row 11001. The flow step 6 is an instruction for setting the value of the target index variable "manipulator_state", therefore, adding the content of the flow step 6 to the switching target cell of the operation flow table row 11001, and no longer adding it to the instruction cell of the operation flow table row 11001.

Further, setting the cell format of the condition cell of the operation flow table row 11001 according to the hierarchical relationship between the operation flow table 10000 and the operation flow table 11000, so that the content in the condition cell of the operation flow table row 11001 is indented by a set width compared to the content of the operation flow table row 10001, indicating the hierarchical relationship between the two.

Then, starting from step 3, processing other flow steps in the branch operation flow that is determined to be true by the flow step 3, and starting from step 4, processing the branch operation flow that is determined to be false by the flow step 3.

Step 3, as the flow step 7 is a conditional branch operation flow, creating a new operation flow table 11100 for the flow step 7, and embedding the operation flow table 11100 hierarchically under the operation flow table row 11001. The operation flow table 11100 comprises a condition column 601, an instruction column 602 and a switching target column 603. Creating an operation flow table row 11101 in the operation flow table 11100. The operation flow table row 11101 comprises a condition cell, an instruction cell and a switching target cell corresponding to the condition column 601, the instruction column 602 and the switching target column 603 of the operation flow table, respectively. Adding the execution condition of the flow step 7 to the condition cell of the operation flow table row 11101, and adding the subsequent operation instructions, that is, the content of the flow step 9, to the instruction cell of the operation flow table row 11101.

Further, setting the cell format of the condition cell of the operation flow table row 11101 according to the hierarchical relationship between the operation flow table 11000 and the operation flow table 11100, so that the content in the condition cell of the operation flow table row 11101 is indented by a set width compared to the content of the operation flow table row 11001, indicating the hierarchical relationship between the two.

Step 4, as the flow step 14 is an operation instruction calling the manipulator sub-flow, creating a new operation flow table row 11002 after the operation flow table row 11001, and adding a constant "ELSE" representing "true" as the content of the condition cell of the operation flow table row 11002, further, adding the content of the flow step 14 to the instruction cell of the operation flow table row 11002.

Further, the operation flow table row 11001 and the operation flow table row 11002 are two mutually exclusive branch operation flows of the conditional branch operation flow, therefore, setting the operation flow table row 11001 and the operation flow table row 11002 to be mutually exclusive, and correspondingly, setting circular marks on the left side of the condition cells of the two operation flow table rows and connecting the two circular marks with a vertical line, indicating the mutually exclusive relationship between the two in the format.

Step 5, further acquiring the subsequent operation flow, and creating a new operation flow table row 11003 for the flow step 78. The operation flow table row 11003 comprises a condition cell, an instruction cell and a switching target cell corresponding to the condition column 601, the instruction column 602 and the switching target column 603 of the operation flow table, respectively. As the flow step 78 is a conditional branch operation flow, adding the execution condition of the flow step 78 to the condition cell of the operation flow table row 11003, and adding the subsequent operation instructions, that is, the content of flow step 80, to the instruction cell of the operation flow table row 11003. As the flow step 81 is an instruction for setting the value of the target index variable "machine_state", therefore, adding the content of the flow step 81 to the switching target cell of the operation flow table row 11003, and longer adding it to the instruction cell of the operation flow table row 11003.

Then, starting from step 6, processing other flow steps in the branch operation flow that is determined to be true by the flow step 78, and starting from step 7, processing the branch operation flow that is determined to be false by the flow step 78.

Step 6, as the flow step 82 is a conditional branch operation flow, creating a new operation flow table 11200 for the flow step 82, and embedding the operation flow table 11200 hierarchically under the operation flow table row 11003. The operation flow table 11200 comprises a condition column 601, an instruction column 602 and a switching target column 603. Creating an operation flow table row 11201 in the operation flow table 11200. The operation flow table row 11201 comprises a condition cell, an instruction cell and a switching target cell corresponding to the condition column 601, the instruction column 602 and the switching target column 603 of the operation flow table, respectively. Adding the execution condition of the flow step 82 to the condition cell of the operation flow table row 11201, and adding the subsequent operation instructions, that is, the content of the flow step 83, to the instruction cell of the operation flow table row 11201.

Further, setting the cell format of the condition cell of the operation flow table row 11201 according to the hierarchical relationship between the operation flow table 11000 and the operation flow table 11200, so that the content in the condition cell of the operation flow table row 11201 is indented by a set width compared to the content of the operation flow table row 11003, indicating the hierarchical relationship between the two.

Step 7, as the flow step 87 is an operation instruction calling the machine tool sub-flow, creating a new operation flow table row 11004 after the operation flow table row 11003, and adding a constant "ELSE" representing "true" as the content of the condition cell of the operation flow table row 11004, further, adding the content of the flow step 87 to the instruction cell of the operation flow table row 11004.

Further, the operation flow table row 11003 and the operation flow table row 11004 are two mutually exclusive branch operation flows of the conditional branch operation flow, therefore, setting the operation flow table row 11003 and the operation flow table row 11004 to be mutually exclusive, and correspondingly, setting circular marks on the left side of the condition cells of the two operation flow table rows and connecting the two circular marks with a vertical line, indicating the mutually exclusive relationship between the two in the format.

Step 8, as the flow step 153 is an operation instruction, creating a new operation flow table row 11005 after the operation flow table row 11004, and adding a constant "TRUE" representing "true" as the content of the condition cell of the operation flow table row 11005, further, adding the content of the flow step 153 to the instruction cell of the operation flow table row 11005.

Step 9, as the manipulator sub-flow is a switching branch operation flow, creating an operation flow table 40000 for the switching branch operation flow, and creating an operation flow table row 40001 in the operation flow table 40000, further, adding a constant "TRUE" representing "true" as the content of the condition cell of the operation flow table row 40001. taking a plurality of mutually exclusive execution conditions for determining the target index variable "manipulator_state" as a switching branch instruction "switch (manipulator_state)", and adding the switching branch instruction to the instruction cell of the operation flow table row 40001.

Acquiring the first flow step of the manipulator sub-flow. As the flow step 16 is a branch operation flow of a switching branch operation flow, creating a branch operation flow table 41000 for the flow step 16, and embedding the branch operation flow table 41000 hierarchically under the branch operation flow table row 40001. The branch operation flow table 41000 comprises an index column 611 and a comment column 612. Creating a branch operation flow table row 41001 in the branch operation flow table 41000. The branch operation flow table row 41001 comprises an index cell 6211 and a comment cell 6212 corresponding to the index column 611 and the comment column 612, respectively. The target value 100 of the manipulator_state in the flow step 16 is the branch index value of the branch operation flow, therefore, adding the branch index value to the index cell 6211, and adding the meaning of the target value 100 of the manipulator_state in the flow step 16 to the comment cell 6212.

Further, creating an operation flow table 21000 for the flow steps of the branch operation flow. The operation flow table 21000 comprises a condition column 601, an instruction column 602 and a switching target column 603. Embedding the operation flow table 21000 hierarchically under the operation flow table row 41001. Further, setting the operation flow table 21000 and the operation flow table 40000 to be aligned by column. Creating an operation flow table row 21001 in the operation flow table 21000. The operation flow table row 21001 comprises a condition cell, an instruction cell and a switching target cell corresponding to the condition column 601, the instruction column 602 and the switching target column 603 of the operation flow table, respectively.

In each branch operation flow of the manipulator sub-flow, the value of the state variable of the indicator is determined by an operation instruction for assigning value to the variable indicator_state, therefore, the variable indicator_state is a state variable. In some embodiments of the present invention, the branch operation flow table 41000 further comprises a branch state column 613 corresponding to the indicator_state variable, and the branch operation flow table row further comprises a branch state cell 6213 corresponding to the branch state column 613. The flow step 18 is an operation instruction for assigning value to the variable indicator_state, therefore, setting the target value of the assignment instruction as the content of the branch state cell 6213.

Then, starting from step 10, processing other flow steps in the branch operation flow corresponding to the flow step 16.

Then, starting from step 14, processing the next branch operation flow in the manipulator sub-flow.

Step 10, as the flow step 19 is a conditional branch operation flow, adding the execution condition of the flow step 19 to the condition cell of the operation flow table row 21001, and adding the subsequent operation instructions, that is, the content of flow step 21, to the instruction cell of the operation flow table row 21001.

Then, starting from step 11, processing other flow steps in the branch operation flow that is determined to be true by the flow step 19.

Step 11, as the flow step 22 is a conditional branch operation flow, creating a new operation flow table 21100 for the flow step 22, and embedding the operation flow table 21100 hierarchically under the operation flow table row 21000. The operation flow table 21100 comprises a condition column 601, an instruction column 602 and a switching target column 603. Creating an operation flow table row 21101 in the operation flow table 21000. The operation flow table row 21101 comprises a condition cell, an instruction cell and a switching target cell corresponding to the condition column 601, the instruction column 602 and the switching target column 603 of the operation flow table, respectively. Adding the execution condition of the flow step 22 to the condition cell of the operation flow table row 21101, and adding the subsequent operation instructions, that is, the content of flow step 23, to the instruction cell of the operation flow table row 21101.

Further, setting the cell format of the condition cell of the operation flow table row 21101 according to the hierarchical relationship between the operation flow table 21000 and the operation flow table 21100, so that the content in the condition cell of the operation flow table row 21101 is indented by a set width compared to the content of the operation flow table row 21001, indicating the hierarchical relationship between the two.

Step 12, further acquiring the subsequent operation flow, and creating a new operation flow table row 21102 for the flow step 24. The operation flow table row 21102 comprises a condition cell, an instruction cell and a switching target cell corresponding to the condition column 601, the instruction column 602 and the switching target column 603 of the operation flow table, respectively. As the flow step 24 is a conditional branch operation flow, adding the execution condition of the flow step 24 to the condition cell of the operation flow table row 21102, and adding the subsequent operation instructions, that is, the content of flow step 26, to the instruction cell of the operation flow table row 21102. As the flow step 27 is an instruction for setting the value of the target index variable "manipulator_state", therefore, adding the content of the flow step 27 to the switching target cell of the operation flow table row 21102 rather than adding it to the instruction cell of the operation flow table row 21102.

Step 13, as the flow step 30 is an operation instruction, creating a new operation flow table row 21103 after the operation flow table row 21102. The operation flow table row 21103 comprises a condition cell, an instruction cell and a switching target cell corresponding to the condition column 601, the instruction column 602 and the switching target column 603 of the operation flow table, respectively. The flow step 30 is an instruction for setting the value of the target index variable "manipulator_state", therefore, adding the content of the flow step 30 to the switching target cell of the operation flow table row 21103 rather than adding it to the instruction cell of the operation flow table row 21103.

Step 14, as the flow step 33 is a branch operation flow of a switching branch operation flow, adding a branch operation flow table row 41002 in the branch operation flow table 41000. The branch operation flow table row 41002 comprises an index cell 6221 and a comment cell 6222 corresponding to the index column 611 and the comment cell 612, respectively.

The target value 200 of the manipulator_state in the flow step 33 is the branch index value of the branch operation flow, therefore, adding the branch index value to the index cell 6221, and adding the meaning of the target value 200 of the manipulator_state in the flow step 33 to the comment cell 6222.

Further, creating an operation flow table 22000 for the flow steps of the branch operation flow. The operation flow table 22000 comprises a condition column 601, an instruction column 602 and a switching target column 603. Embedding the operation flow table 22000 hierarchically under the branch operation flow table row 41002. Further, setting the operation flow table 22000 and the operation flow table 40000 to be aligned by column. Creating an operation flow table row 22001 in the operation flow table 22000. The operation flow table row 22001 comprises a condition cell, an instruction cell and a switching target cell corresponding to the condition column 601, the instruction column 602 and the switching target column 603 of the operation flow table, respectively.

In some embodiments of the present invention, the branch operation flow table row 41002 further comprises a branch state cell 6223 corresponding to the branch state column 613. The flow step 35 is an operation instruction for assigning value to the variable indicator_state, therefore, setting the target value of this assignment instruction as the content of the branch state cell 6223.

Then, starting from step 15, processing other flow steps of the branch operation flow corresponding to the flow step 33.

Then, starting from step 18, processing the next branch operation flow in the manipulator sub-flow.

Step 15, as the flow step 36 is a conditional branch operation flow, adding the execution condition of the flow step 36 to the condition cell of the operation flow table row 21001, and adding the subsequent operation instructions, that is, the content of flow step 38, to the instruction cell of the operation flow table row 21001.

Then, starting from step 16, processing other flow steps of the branch operation flow that is determined to be true by the flow step 36.

Step 16, as the flow step 39 is a conditional branch operation flow, creating a new operation flow table 22100 for the flow step 39, and embedding the operation flow table 22100 hierarchically under the operation flow table row 22000. The operation flow table 22100 comprises a condition column 601, an instruction column 602 and a switching target column 603. Creating an operation flow table row 22101 in the operation flow table 22100. The operation flow table row 22101 comprises a condition cell, an instruction cell and a switching target cell corresponding to the condition column 601, the instruction column 602 and the switching target column 603 of the operation flow table, respectively. Adding the execution condition of the flow step 39 to the condition cell of the operation flow table row 22101, and adding the subsequent operation instructions, that is, the content of flow step 42, to the instruction cell of the operation flow table row 22101. The flow step 42 is an instruction for setting the value of the target index variable "machine_tool_state", therefore, adding the content of the flow step 42 to the switching target cell of the operation flow table row 22101 rather than adding it to the instruction cell of the operation flow table row 22101.

Further, setting the cell format of the condition cell of the operation flow table row 22101 according to the hierarchical relationship between the operation flow table 22000 and the operation flow table 22100, so that the content in the condition cell of the operation flow table row 22101 is indented by a set width compared to the content of the operation flow table row 22001, indicating the hierarchical relationship between the two.

Step 17, as the flow step 45 is an operation instruction, creating a new operation flow table row 22102 after the operation flow table row 22101, and adding a constant "ELSE" representing "true" as the content of the condition cell of the operation flow table row 22102. The flow step 45 is an instruction for setting the value of the target index variable "machine_tool_state", therefore, adding the content of the flow step 45 to the switching target cell of the operation flow table row 22102 rather than adding it to the instruction cell of the operation flow table row 22102.

Further, the operation flow table row 22101 and the operation flow table row 22102 are two mutually exclusive branch operation flows of the conditional branch operation flow, therefore, setting the operation flow table row 22101 and the operation flow table row 22102 to be mutually exclusive, and correspondingly, setting circular marks on the left side of the condition cells of the two operation flow table rows and connecting the two circular marks with a vertical line, indicating the mutually exclusive relationship between the two in the format.

Step 18, as the flow step 49 is a branch operation flow of a switching branch operation flow, adding a branch operation flow table row 41003 in the branch operation flow table 41000. The branch operation flow table row 41003 comprises an index cell 6231 and a comment cell 6232 corresponding to the index column 611 and the comment column 612, respectively.

The target value 300 of the manipulator_state in the flow step 49 is the branch index value of the branch operation flow, therefore, adding the branch index value to the index cell 6231, and adding the meaning of the target value 100 of the manipulator_state in the flow step 49 to the comment cell 6232.

Creating an operation flow table 23000 for the flow steps of the branch operation flow. The operation flow table 23000 comprises a condition column 601, an instruction column 602 and a switching target column 603. Embedding the operation flow table 23000 hierarchically under the operation flow table row 41003, and setting the operation flow table 23000 and the operation flow table 40000 to be aligned by column. Creating an operation flow table row 23001 in the operation flow table 23000. The operation flow table row 23001 comprises a condition cell, an instruction cell and a switching target cell corresponding to the condition column 601, the instruction column 602 and the switching target column 603 of the operation flow table, respectively.

In some embodiments of the present invention, the branch operation flow table row 41003 further comprises a branch state cell 6233 corresponding to the branch state column 613. The flow step 51 is an instruction for setting the value of the variable indicator_state, therefore, setting the target value of this assignment instruction as the content of the branch state cell 6233.

Then, starting from step 19, processing the next branch operation flow in the manipulator sub-flow.

Step 19, as the flow step 53 is a branch operation flow of the switching branch operation flow, adding a branch operation flow table row 41004 in the branch operation flow table 41000. The branch operation flow table row 41004 comprises an index cell 6241 and a comment cell 6242 corresponding to the index column 611 and the comment column 612, respectively.

The target value 400 of the manipulator_state in the flow step 53 is the branch index value of the branch operation flow, therefore, adding the branch index value to the index cell 6241, and adding the meaning of the target value 400 of the manipulator_state in the flow step 53 to the comment cell 6242.

Further, creating an operation flow table 24000 for the flow steps of the branch operation flow. The operation flow table 24000 comprises a condition column 601, an instruction column 602 and a switching target column 603. Embedding the operation flow table 24000 hierarchically under the operation flow table row 41004, and setting the operation flow table 24000 and the operation flow table 40000 to be aligned by column. Creating an operation flow table row 24001 in the operation flow table 24000. The operation flow table 24001 comprises a condition cell, an instruction cell and a switching target cell corresponding to the condition column 601, the instruction column 602 and the switching target column 603 of the operation flow table, respectively.

In some embodiments of the present invention, the branch operation flow table row 41004 further comprises a branch state cell 6243 corresponding to the branch state column 613. The flow step 55 is an instruction for setting the value of the variable indicator_state, therefore, setting the target value of this assignment instruction as the content of the branch state cell 6243.

Then, starting from step 20, processing other flow steps of the branch operation flow corresponding to the flow step 53.

Then, starting from step 21, processing the next branch operation flow in the manipulator sub-flow.

Step 20, as the flow step 56 is a conditional branch operation flow, adding the execution condition of the flow step 56 to the condition cell of the operation flow table row 24001, and adding the subsequent operation instructions, that is, the content of flow step 58, to the instruction cell of the operation flow table row 24001. The flow step 59 is an instruction for setting the value of the target index variable "machine_tool_state", therefore, adding the content of the flow step 59 to the switching target cell of the operation flow table row 24001 rather than adding it to the instruction cell of the operation flow table row 24001.

Step 21, as the flow step 62 is a branch operation flow of the switching branch operation flow, adding a branch operation flow table row 41005 in the branch operation flow table 41000. The branch operation flow table row 41005 comprises an index cell 6251 and a comment cell 6252 corresponding to the index column 611 and the comment column 612, respectively.

The target value 500 of the manipulator_state in the flow step 62 is the branch index value of the branch operation flow, therefore, adding the branch index value to the index cell 6251, and adding the meaning of the target value 500 of the manipulator_state in the flow step 62 to the comment cell 6252.

Creating an operation flow table 25000 for the flow steps of the branch operation flow. The operation flow table 25000 comprises a condition column 601, an instruction column 602 and a switching target column 603. Embedding the operation flow table 25000 hierarchically under the operation flow table row 41005, and setting the operation flow table 25000 and the operation flow table 40000 to be aligned by column. Creating an operation flow table row 25001 in the operation flow table 25000. The operation flow table row 25001 comprises a condition cell, an instruction cell and a switching target cell corresponding to the condition column 601, the instruction column 602 and the switching target column 603 of the operation flow table, respectively.

In some embodiments of the present invention, the branch operation flow table 41005 further comprises a branch state cell 6253 corresponding to the branch state column 613. The flow step 64 is an operation instruction for assigning value to the variable indicator_state, therefore, setting the target value of this assignment instruction as the content of the branch state cell 6253.

Then, starting from step 25, processing the next branch operation flow in the manipulator sub-flow.

Step 22, as the flow step 65 is a conditional branch operation flow, adding the execution condition of the flow step 65 to the condition cell of the operation flow table row 25001, and starting from step 23, processing other flow steps of the branch operation flow that is determined to be true by the flow step 65.

Step 23, as the flow step 67 is a conditional branch operation flow, creating a new operation flow table 25100 for the flow step 67, and embedding the operation flow table 25100 hierarchically under the operation flow table row 25000. The operation flow table 25100 comprises a condition column 601, an instruction column 602 and a switching target column 603. Creating an operation flow table row 25101 in the operation flow table 11000. The operation flow table row 25101 comprises a condition cell, an instruction cell and a switching target cell corresponding to the condition column 601, the instruction column 602 and the switching target column 603 of the operation flow table, respectively. Adding the execution condition of the flow step 67 to the condition cell of the operation flow table row 25101. The flow step 68 is an instruction for setting the value of the target index variable "machine_tool_state", therefore, adding the content of the flow step 68 to the switching target cell of the operation flow table row 25101 rather than adding it to the instruction cell of the operation flow table row 25101.

Further, setting the cell format of the condition cell of the operation flow table row 25101 according to the hierarchical relationship between the operation flow table 25000 and the operation flow table 25100, so that the content in the condition cell of the operation flow table row 25101 is indented by a set width compared to the content of the operation flow table row 25001, indicating the hierarchical relationship between the two.

Then, starting from step 24, processing the branch operation flow that is determined to be false by the flow step 67.

Step 24, as the flow step 70 is an operation instruction, creating a new operation flow table row 25102 after the operation flow table row 25101, and adding a constant "ELSE" representing "true" as the content of the condition cell of the operation flow table row 25102. The flow step 70 is an instruction for setting the value of the target index variable "machine_tool_state", therefore, adding the content of the flow step 70 to the switching target cell of the operation flow table row 25102 rather than adding it to the instruction cell of the operation flow table row 25102.

Further, the operation flow table row 25101 and the operation flow table row 25102 are two mutually exclusive branch operation flows of the conditional branch operation flow, therefore, setting the operation flow table row 25101 and the operation flow table row 25102 to be mutually exclusive, and correspondingly, setting circular marks on the left side of the condition cells of the two operation flow table rows and connecting the two circular marks with a vertical line, indicating the mutually exclusive relationship between the two in the format.

Step 25, as the flow step 73 is a branch operation flow of the switching branch operation flow, adding a branch operation flow table row 41006 in the branch operation flow table 41000. The branch operation flow table row 41006 comprises an index cell 6261 and a comment cell 6262 corresponding to the index column 611 and the comment column 612, respectively.

The target value 600 of the manipulator_state in the flow step 73 is the branch index value of the branch operation flow, therefore, adding the branch index value to the index cell 6261, and adding the meaning of the target value 100 of the manipulator_state in the flow step 73 to the comment cell 6262.

Further, creating an operation flow table 26000 for the flow steps of the branch operation flow. The operation flow table 26000 comprises a condition column 601, an instruction column 602 and a switching target column 603. Embedding the operation flow table 26000 hierarchically under the branch operation flow table row 41006. Further, setting the operation flow table 26000 and the operation flow table 40000 to be aligned by column. Creating an operation flow table row 26001 in the operation flow table 26000. The operation flow table row 26001 comprises a condition cell, an instruction cell and a switching target cell corresponding to the condition column 601, the instruction column 602 and the switching target column 603 of the operation flow table, respectively.

In some embodiments of the present invention, the branch operation flow table row 41006 further comprises a branch state cell 6263 corresponding to the branch state column 613. The flow step 74 is an operation instruction for assigning value to the variable indicator_state, therefore, setting the target value of this assignment instruction as the content of the branch state cell 6263.

Step 26, as the machine tool sub-flow is a switching branch operation flow, creating an operation flow table 50000 for the switching branch operation flow, and adding an operation flow table row 50001 in the operation flow table 50000. Adding a constant "TRUE" representing "true" as the content of the condition cell of the operation flow table row 50001, taking a plurality of mutually exclusive execution conditions for determining the target index variable "machine_tool_state" as a branch switching instruction "switch (machine_tool_state)", and adding the branch switching instruction to the instruction cell of the operation flow table row 50001.

Acquiring the first flow step in the machine tool sub-flow. As the flow step 89 is a branch operation flow of the switching branch operation flow, creating a branch operation flow table 51000 for the flow step 89, and embedding the branch operation flow table 51000 hierarchically under the operation flow table row 50001. The branch operation flow table 51000 comprises an index column 611 and a comment column 612. Creating a branch operation flow table row 51001 in the branch operation flow table 51000. The branch operation flow table row 51001 comprises an index cell 6311 and a comment cell 6312 corresponding to the index column 611 and the comment column 612, respectively.

The target value 100 of the machine_tool_state in the flow step 89 is the branch index value of the branch operation flow, therefore, adding the branch index value to the index cell 6311, and adding the meaning of the target value 100 of the manipulator_state in the flow step 89 to the comment cell 6312.

Creating an operation flow table 31000 for the flow steps of the branch operation flow. The operation flow table 31000 comprises a condition column 601, an instruction column 602 and a switching target column 603. Embedding the operation flow table 31000 hierarchically under the branch operation flow table row 51001, and setting the operation flow table 31000 and operation flow table 50000 to be aligned by column. Creating an operation flow table row 31001 in the operation flow table 31000. The operation flow table row 31001 comprises a condition cell, an instruction cell and a switching target cell corresponding to the condition column 601, the instruction column 602 and the switching target column 603 of the operation flow table, respectively.

In the machine tool sub-flow, the operation instruction "protective_door_open" is usually executed when the state of the machine tool is changed. Moreover, the signals "protective_door_open_properly" and "protective_door_close_properly" are usually the preconditions for changing the state of the machine tool, therefore, the state of the protective door of the machine tool is determined by a specific machine tool state, and therefore that state of the protective door can be regarded as a state variable. In some embodiments of the present invention, the operation flow table 51000 further comprises a branch state cell 6313 corresponding to the branch state column 613. However, when setting the state "machine_tool_stop", the state of the protective door can not be determined by the operation instruction "protective_door_open" and the signals "protective_door_open_properly" and "protective_door_close_properly". Therefore, the branch state cell 6313 of the branch operation flow table row 51001 leaves to be unset.

Then, starting from step 27, processing other flow steps of the branch operation flow corresponding to the flow step 89.

Then, starting from step 33, processing the next branch operation flow in the machine tool sub-flow.

Step 27, as the flow step 91 is a conditional branch operation flow, adding the execution condition of the flow step 91 to the condition cell of the operation flow table row 31001, and adding the subsequent operation instructions, that is, the content of flow step 93, to the instruction cell of the operation flow table row 31001.

Then, starting from step 28, processing other flow steps of the branch operation flow that is determined to be true by the flow step 91.

Step 28, as the flow step 94 is a conditional branch operation flow, creating a new operation flow table 31100 for the flow step 94, and embedding the operation flow table 31100 hierarchically under the operation flow table row 31000. The operation flow table 31100 comprises a condition column 601, an instruction column 602 and a switching target column 603. Creating an operation flow table row 31101 in the operation flow table 31100. The operation flow table row 31101 comprises a condition cell, an instruction cell and a switching target cell corresponding to the condition column 601, the instruction column 602 and the switching target column 603 of the operation flow table, respectively. Adding the execution condition of the flow step 94 to the condition cell of the operation flow table row 31101.

Further, setting the cell format of the condition cell of the operation flow table row 31101 according to the hierarchical relationship between the operation flow table 31000 and the operation flow table 31100, so that the content in the condition cell of the operation flow table row 31101 is indented by a set width compared to the content of the operation flow table row 31001, indicating the hierarchical relationship between the two.

Then, starting from step 29, processing other flow steps of the branch operation flow that is determined to be true by the flow step 94, and starting from step 31, processing the branch operation flow that is determined to be false by the flow step 94.

Step 29, as the flow step 96 is a conditional branch operation flow, creating a new operation flow table 31110 for the flow step 96, and embedding the operation flow table 31110 hierarchically under the operation flow table row 31100. The operation flow table 31110 comprises a condition column 601, an instruction column 602 and a switching target column 603. Creating an operation flow table row 31111 in the operation flow table 31110. The operation flow table row 31111 comprises a condition cell, an instruction cell and a switching target cell corresponding to the condition column 601, the instruction column 602 and the switching target column 603 of the operation flow table, respectively. Adding the execution condition of the flow step 96 to the condition cell of the operation flow table row 31111, and adding the subsequent operation instructions, that is, the content of flow step 98, to the instruction cell of the operation flow table row 31111. The flow step 99 is an instruction for setting the value of the target index variable "machine_tool_state", therefore, adding the content of the flow step 99 to the switching target cell of the operation flow table row 31111 rather than adding it to the instruction cell of the operation flow table row 31111.

Further, setting the cell format of the condition cell of the operation flow table row 31111 according to the hierarchical relationship between the operation flow table 31100 and the operation flow table 31110, so that the content in the condition cell of the operation flow table row 31111 is indented by a set width compared to the content of the operation flow table row 31101, indicating the hierarchical relationship between the two.

Step 30, as the flow steps 103 and 104 are both operation instructions, creating a new operation flow table row 31112 after the operation flow table row 31111, and adding a constant "ELSE" representing "true" as the content of the condition cell of the operation flow table row 31112, and adding the content of the flow step 103 to the instruction cell of the operation flow table row 31112. As the flow step 104 is an instruction for setting the value of the target index variable "machine_tool_state", therefore, adding the content of the flow step 104 to the switching target cell of the operation flow table row 31112 rather than adding it to the instruction cell of the operation flow table row 31112.

Further, the operation flow table row 31111 and the operation flow table row 31112 are two mutually exclusive branch operation flows of the conditional branch operation flow, therefore, setting the operation flow table row 31111 and the operation flow table row 31112 to be mutually exclusive, and correspondingly, setting circular marks on the left side of the condition cells of the two operation flow table rows and connecting the two circular marks with a vertical line, indicating the mutually exclusive relationship between the two in the format.

Step 31, further acquiring the subsequent operation flow, and creating a new operation flow table row 31102 for the flow step 107. The operation flow table row 31102 comprises a condition cell, an instruction cell and a switching target cell corresponding to the condition column 601, the instruction column 602 and the switching target column 603 of the operation flow table, respectively. As the flow step 107 is a conditional branch operation flow, adding the execution condition of the flow step 107 to the condition cell of the operation flow table row 31102, and adding the subsequent operation instructions, that is, the content of flow step 109, to the instruction cell of the operation flow table row 31102.

The flow step 110 is an instruction for setting the value of the target index variable "machine_tool_state", therefore, adding the content of the flow step 110 to the switching target cell of the operation flow table row 31102 rather than adding it to the instruction cell of the operation flow table row 31102.

Then, starting from step 32, processing the branch operation flow that is determined to be false by the flow step 107.

Step 32, as the flow steps 114 and 115 are both operation instructions, creating a new operation flow table row 31103 after the operation flow table row 31102, and adding a constant "ELSE" representing "true" as the content of the condition cell of the operation flow table row 31103, and adding the content of the flow step 114 to the instruction cell of the operation flow table row 31103. As the flow step 115 is an instruction for setting the value of the target index variable "machine_tool_state", therefore, adding the content of the flow step 115 to the switching target cell of the operation flow table row 31103 rather than adding it to the instruction cell of the operation flow table row 31103.

Further, the operation flow table row 31102 and the operation flow table row 31103 are two mutually exclusive branch operation flows of the conditional branch operation flow, therefore, setting the operation flow table row 31102 and the operation flow table row 31103 to be mutually exclusive, and correspondingly, setting circular marks on the left side of the condition cells of the two operation flow table rows and connecting the two circular marks with a vertical line, indicating the mutually exclusive relationship between the two in the format.

Step 33, as the flow step 119 is a branch operation flow of the switching branch operation flow, adding a branch operation flow table row 51002 in the branch operation flow table 51000. The branch operation flow table row 51002 comprises an index cell 6321 and a comment cell 6322 corresponding to the index column 611 and the comment column 612, respectively.

The target value 200 of the machine_tool_state in the flow step 119 is the branch index value of the branch operation flow, therefore, adding the branch index value to the index cell 6321, and adding the meaning of the target value 100 of the machine_tool_state in the flow step 119 to the comment cell 6322.

Creating an operation flow table 32000 for the flow steps of the branch operation flow. The operation flow table 32000 comprises a condition column 601, an instruction column 602 and a switching target column 603. Embedding the operation flow table 32000 hierarchically under the branch operation flow table row 51002, and setting the operation flow table 32000 and the operation flow table 50000 to be aligned by column. Creating an operation flow table row 32001 in the operation flow table 32000. The operation flow table row 32001 comprises a condition cell, an instruction cell and a switching target cell corresponding to the condition column 601, the instruction column 602 and the switching target column 603 of the operation flow table, respectively.

In some embodiments of the present invention, the operation flow table 50000 further comprises a branch state column 613 corresponding to the state variable of the protective door. The branch operation flow table row 51002 further comprises a branch state cell 6323 corresponding to the branch state column 613. Since the machine_tool_state is set to 200 immediately after execution of the operation instruction "protective_door_close" in the flow step 109 or the flow step 147, the state of the protective door can be determined as "protective door closing" when the machine- _tool_state equals to 200. Therefore, for the branch operation flow table row 51002, setting the content of the branch state cell 6323 to "protective door closing".

Then, starting from step 34, processing other flow steps of the branch operation flow corresponding to the flow step 119.

Then, starting from step 35, processing the next branch operation flow of the machine tool sub-flow.

Step 34, as the flow step 121 is a conditional branch operation flow, adding the execution condition of the flow step 121 to the condition cell of the operation flow table row 32001, and adding the subsequent operation instructions, that is, the content of flow step 123, to the instruction cell of the operation flow table row 32001. The flow step 124 is an instruction for setting the value of the target index variable "machine_tool_state", therefore, adding the content of the flow step 124 to the switching target cell of the operation flow table row 32001 rather than adding it to the instruction cell of the operation flow table row 32001.

Step 35, as the flow step 127 is a branch operation flow of the switching branch operation flow, adding a branch operation flow table row 51003 in the branch operation flow table 51000. The branch operation flow table row 51003 comprises an index cell 6331 and a comment cell 6332 corresponding to the index column 611 and the comment column 612, respectively.

The target value 300 of the machine_tool_state in the flow step 127 is the branch index value of the branch operation flow, therefore, adding the branch index value to the index cell 6331, and adding the meaning of the target value 300 of the machine_tool_state in the flow step 16 to the comment cell 6332.

Creating an operation flow table 33000 for the flow steps of the branch operation flow. The operation flow table 33000 comprises a condition column 601, an instruction column 602 and a switching target column 603. Embedding the operation flow table 33000 hierarchically under the operation flow table row 51003, and setting the operation flow table 33000 and the operation flow table 50000 to be aligned by column. Creating an operation flow table row 33001 in the operation flow table 33000. The operation flow table row 33001 comprises a condition cell, an instruction cell and a switching target cell corresponding to the condition column 601, the instruction column 602 and the switching target column 603 of the operation flow table, respectively.

In some embodiments of the present invention, the operation flow table 51000 further comprises a branch state column 613 corresponding to the state variable of the protective door of the machine tool. The branch operation flow table row 51003 further comprises a branch state cell 6333 corresponding to the branch state column 613. Since the machine_tool_state is set to 300 under the condition that "protective_door_open_properly" is true, when the machine_tool_state equals to 300, the state of the protective door can be determined to be "protective door closed". Therefore, for the branch operation flow table row 51003, setting the content of the branch state cell 6333 to "protective door closed".

Then, starting from step 36, processing other flow steps of the branch operation flow corresponding to the flow step 127.

Then, starting from step 37, processing the next branch operation flow of the machine tool sub-flow.

Step 36, as the flow step 129 is a conditional branch operation flow, adding the execution condition of the flow step 129 to the condition cell of the operation flow table row 33001, and adding the subsequent operation instructions, that is, the content of flow step 131, to the instruction cell of the operation flow table row 33001. The flow step 132 is an instruction for setting the value of the target index variable "machine_tool_state", therefore, adding the content of the flow step 132 to the switching target cell of the operation flow table row 33001 rather than adding it to the instruction cell of the operation flow table row 33001.

Step 37, as the flow step 135 is a branch operation flow of the switching branch operation flow, adding a branch operation flow table row 51004 in the branch operation flow table 51000. The branch operation flow table row 51004 comprises an index cell 6341 and a comment cell 6342 corresponding to the index column 611 and the comment column 612, respectively.

The target value 400 of the machine_tool_state in the flow step 135 is the branch index value of the branch operation flow, therefore, adding the branch index value to the index cell 6341, and adding the meaning of the target value 400 of the machine_tool_state in the flow step 135 to the comment cell 6342.

Creating an operation flow table 34000 for the flow steps of the branch operation flow. The operation flow table 34000 comprises a condition column 601, an instruction column 602 and a switching target column 603. Embedding the operation flow table 34000 hierarchically under the branch operation flow table row 51004, and setting the operation flow table 34000 and the operation flow table 50000 to be aligned by column. Creating an operation flow table row 34001 in the operation flow table 34000. The operation flow table row 34001 comprises a condition cell, an instruction cell and a switching target cell corresponding to the condition column 601, the instruction column 602 and the switching target column 603 of the operation flow table, respectively.

In some embodiments of the present invention, the operation flow table 50000 further comprises a branch state column 613 corresponding to the state variable of the protective door of the machine tool. The branch operation flow table row 51004 further comprises a branch state cell 6343 corresponding to the branch state column 613. Since the machine_tool_state is set to 400 immediately after the execution of the operation instruction "protective_door_open" in the flow step 98 or the flow step 131, the state of the protective door can be determined as "protective door opening" when the machine_tool_state equals to 400. Therefore, for the branch operation flow table row 51004, setting the content of the branch state cell 6343 to "protective door opening".

Then, starting from step 38, processing other flow steps of the branch operation flow corresponding to the flow step 135.

Then, starting from step 39, processing the next branch operation flow of the machine tool sub-flow.

Step 38, as the flow step 137 is a conditional branch operation flow, adding the execution condition of the flow step 137 to the condition cell of the operation flow table row 34001, and adding the subsequent operation instructions, that is, the content of flow step 139, to the instruction cell of the operation flow table row 34001. The flow step 140 is an instruction for setting the value of the target index variable "machine_tool_state", therefore, adding the content of the flow step 140 to the switching target cell of the operation flow table row 34001 rather than adding it to the instruction cell of the operation flow table row 34001.

Step 39, as the flow step 143 is a branch operation flow of the switching branch operation flow, creating a branch operation flow table row 51005 in the branch operation flow table 51000. The branch operation flow table row 51005 comprises an index cell 6351 and a comment cell 6352 corresponding to the index column 611 and the comment column 612, respectively.

The target value 500 of the machine_tool_state in the flow step 143 is the branch index value of the branch operation flow, therefore, adding the branch index value to the index cell 6351, and adding the meaning of the target value 100 of the manipulator_state in the flow step 16 to the comment cell 6352.

Creating an operation flow table 35000 for the flow steps of the branch operation flow. The operation flow table 35000 comprises a condition column 601, an instruction column 602 and a switching target column 603. Embedding the operation flow table 35000 hierarchically under the operation flow table row 51005, and setting the operation flow table 35000 and the operation flow table 50000 to be aligned by column. Creating an operation flow table row 35001 in the operation flow table 35000. The operation flow table row 35001 comprises a condition cell, an instruction cell and a switching target cell corresponding to the condition column 601, the instruction column 602 and the switching target column 603 of the operation flow table, respectively.

In some embodiments of the present invention, the operation flow table 50000 further comprises a branch state column 613 corresponding to the state variable of the protective door of the machine tool. The branch operation flow table row 51005 further comprises a branch state cell 6353 corresponding to the branch state column 613. Since the machine_tool_state is set to 500 under the condition that "protective_door_open_properly" is true, the state of the protective door can be determined as "protective door opened" when the machine_state equals 400. Therefore, for the branch operation flow table row 51005, setting the content of the branch state cell 6353 to "protective door opened".

Then, starting from step 40, processing other flow steps of the branch operation flow corresponding to the flow step 143.

Step 40, as the flow step 145 is a conditional branch operation flow, adding the execution condition of the flow step 145 to the condition cell of the operation flow table row 35001, and adding the subsequent operation instructions, that is, the content of flow step 147, to the instruction cell of the operation flow table row 35001. The flow step 148 is an instruction for setting the value of the target index variable "machine_tool_state", therefore, adding the content of the flow step 148 to the switching target cell of the operation flow table row 35001 rather than adding it to the instruction cell of the operation flow table row 35001.

By the aforementioned steps 1 to 40, the specific process of tabular processing of the detailed operation flow of the automated production system by the method for tabular processing of operation flow of this embodiment is described.

The above tabular processing procedure of operation flow is substantially the same as the procedure in embodiment 1, and will not be repeated. The difference is that when the operation flow type is determined, and when it is determined to be a switching branch operation flow, the corresponding flow step sequence and row generation rule are different.

When the operation flow type is a switching branch operation flow, as shown in step 9, when processing the manipulator sub-flow as a switching branch operation flow, creating an operation flow table 40000, adding an operation flow table row 40001, further, taking a plurality of mutually exclusive execution conditions for determining the target index variable "manipulator_state" as a branch switching instruction "switch (manipulator_state)", and adding the branch switching instruction to the instruction cell of the operation flow table row 40001. It can be seen that the branch switching instruction is a kind of operation instruction, and is added to the instruction cell. Therefore, when the branch switching instruction is determined to be a switching branch operation flow, it is also determined to be an operation instruction type operation flow (that is, an operation instruction type flow step sequence). Meanwhile, the branch switching instruction is processed in the same way as the flow steps as operation instructions, that is, sequentially generating an operation flow table row as a current operation flow table row (step A1); adding a true value as execution condition to the condition cell of the current operation flow table row (step A2); sequentially acquiring the flow steps in the corresponding operation instruction type flow step sequence and adding the flow steps to the instruction cell of the current operation flow table row (step A3).

But meanwhile, when the branch switching instruction belongs to a conditional branch type flow step sequence, if the first sub-flow sequence corresponds to operation instruction type operation flow in the conditional branch operation flow, sequentially adding each flow step of the sub-flow step sequence as operation instruction to the instruction cell of the operation flow table row of a corresponding branch operation flow, which is similar to the predetermined row generation rule for the conditional branch operation flow in embodiment 1. Therefore, if the sub-flow step sequence is a switching branch type flow step sequence, the switching branch instruction is also added to the corresponding instruction cell as operation instruction. The above procedure is equivalent to that if the continuous flow steps before the flow steps of the corresponding branch switching instruction belong to the operation instruction type flow step sequence, taking the operation flow table row generated according to the operation instruction type flow step sequence as current operation flow table row (step C1).

Second, after creating the operation flow table row and added the execution conditions, in step 9, taking a plurality of mutually exclusive execution conditions for determining the target index variable "manipulator_state" as a branch switching instruction "switch (manipulator_state)", and adding the branch switching instruction to the instruction cell of the operation flow table row 40001. Therefore, this procedure is equivalent to adding the flow steps corresponding to the branch switching instruction as operation instruction to the instruction cell of the current operation flow table row (step C2).

Next, as mentioned in step 9, as the flow step 16 is a branch operation flow of the switching branch operation flow, creating a branch operation flow table 41000 for the flow step 16, adding a branch operation flow table row 41001 in the branch operation flow table 41000, and adding the meaning of the target value 100 of the manipulator_state in the flow step 16 the index cell 6211 of the branch operation flow table row 41001. Meanwhile, the flow steps 14, 18, 19, etc. all create corresponding operation flow table rows for the flow steps 33, 39, 53 as branch operation flows. Therefore, this procedure is equivalent to generating a branch operation flow table corresponding to the switching branch type flow step sequence, the branch operation flow table is hierarchically embedded under the current operation flow table row (step C3).

Further, step 9 further mentioned after creating the branch operation flow table row 41001, creating an operation flow table 21000 for the flow steps of the branch operation flow, and embedding the operation flow table 21000 hierarchically under the branch operation flow table row 41001, then, starting from step 10, processing other flow steps of the branch operation flow corresponding to the flow step 16. This procedure is equivalent to that for each of the branch operation flow, sequentially generating, in the branch operation flow table, branch operation flow table rows comprising index cells positioned at the index columns, and adding the branch index conditions to the index cells, meanwhile, creating a sub-operation flow table hierarchically embedded under the branch operation flow table row (step C4).

Besides, after creating the sub-operation flow table, similar to the predetermined row generation rule corresponding to the conditional branch type flow step sequence in embodiment 1, according to the predetermined row generation rule corresponding to the switching branch type flow step sequence in the present embodiment, for each of the sub-operation flow tables, sequentially acquiring the flow steps in the corresponding branch operation flow, and sequentially determining the operation flow type corresponding to each of the flow steps in the corresponding branch operation flow, further, respectively combining the continuous flow steps in the branch operation flow into at least one sub-flow step sequence having the corresponding operation flow type according to a predetermined flow step sequence combination rule, and further, sequentially generating operation flow table rows corresponding to the sub-flow step sequence in the sub-operation flow table (step C5).

Next, taking the operation flow table 10000 obtained by the method for tabular processing of operation flow of embodiment 2 as an example, the method for executing operation flow according to the operation flow table 10000 is described below. The specific steps are as follows:

Step 1, acquiring the first operation flow table row 10001 of the operation flow table 10000, and determining whether the execution condition "system_power_on" in the condition cell of the operation flow table row 10001 is true; if yes, further acquiring the lower-level operation flow table 11000 embedded in the operation flow table row 10001, and executing the next step.

Step 2, acquiring the first operation flow table row 11001 of the operation flow table 11000, and determining whether the execution condition "manipulator_stop" in the condition cell of the operation flow table row 11001 is true.

If yes, acquiring and executing the content "manipulator_stop=false;" in the instruction cell and the content "manipulator_state=100;" in the switching target cell of the operation flow table row 11001, then further acquiring the lower-level operation flow table 11100 embedded in the operation flow table row 11001 and executing step 3; then, acquiring the next operation flow table row 11003 that is not mutually exclusive with the operation flow table row 11001, and executing step 5.

Otherwise, acquiring the next operation flow table row 11002, and executing step 4.

Step 3, acquiring the first operation flow table row 11101 of the operation flow table 11100, and determining whether the execution condition in the condition cell of the operation flow table row 11101 is true.

If yes, acquiring and executing the content of the instruction cell of the operation flow table row 11101.

Step 4, the execution condition in the condition cell of the operation flow table row 11002 is true, therefore, acquiring and executing the content of the instruction cell of the operation flow table row 11001; the operation instruction in the instruction cell of the operation flow table row 11001 is calling the manipulator sub-flow, therefore, starting from step 9, executing the manipulator sub-flow; the operation flow table row 11002 does not have any lower-level operation flow table, therefore, executing step 5 immediately after the execution of the manipulator sub-flow is done.

Step 5, determining whether the execution condition in the condition cell of the operation flow table row 11003 is true.

If yes, acquiring and executing the contents of the instruction cell and the switching target cell of the operation flow table row 11003, then, further acquiring the lower-level operation flow table 11200 embedded in the operation flow table row 11003, and executing step 6; then, acquiring the next operation flow table row 11005 that is not mutually exclusive with the operation flow table row 11003, and executing step 8.

Otherwise, acquiring and next operation flow table row 11004, and executing step 7.

Step 6, acquiring the first operation flow table row 11201 of the operation flow table 11200, and determining whether the execution condition in the condition cell of the operation flow table row 11201 is true.

If yes, acquiring and executing the content of the instruction cell of the operation flow table row 11201.

Step 7, the execution condition in the condition cell of the operation flow table row 11004 is true, therefore, acquiring and executing the content of the instruction cell of the operation flow table row 11004; the operation instruction in the instruction cell of the operation flow table row 11001 is calling the machine tool sub-flow, therefore, starting from step 26, executing the machine tool sub-flow; the operation flow table row 11004 does not have any lower-level operation flow table, therefore, executing step 8 immediately after the execution of the machine tool sub-flow is done.

Step 8, the execution condition in the condition cell of the operation flow table row 11005 is true, therefore, acquiring and executing the content of the instruction cell of the operation flow table row 11005; it is the last flow table row of the main operation flow table, and the loop attribute value of the operation flow table row 11005 is executing cyclically, therefore, returning to step 1 to continue the execution.

Step 9, acquiring the first operation flow table row 40001 of the operation flow table 40000, as the execution condition in the condition cell of the operation flow table row 40001 is always true, executing the content of the instruction cell of the operation flow table row 40001 immediately; the content of the instruction cell is a branch switching instruction, therefore, acquiring the branch operation flow table 41000 embedded under the operation flow table row 40001, and determining whether the value of the target index variable "manipulator_state" matches the content of the index cell 6211 of the branch operation flow table row 41001.

If yes, first acquiring the content of the branch state cell 6213, and setting the state of the indicator according to the content of the branch state cell 6213; then, acquiring the operation flow table 21000 embedded under the branch operation flow table row 41001, and executing step 10.

Otherwise, executing step 14.

Step 10, acquiring the first operation flow table row 21001 of the operation flow table 21000, and determining whether the execution condition in the condition cell of the operation flow table row 21001 is true.

If yes, acquiring and executing the content of the instruction cell of the operation flow table row 21001, further acquiring the lower-level operation flow table 21100 embedded under the operation flow table row 21001, and executing step 11.

Step 11, acquiring the first operation flow table row 21101 of the operation flow table 21100, and determining whether the execution condition in the condition cell of the operation flow table row 21101 is true.

If yes, acquiring and executing the content of the instruction cell of the operation flow table row 21101.

Otherwise, acquiring the next operation flow table row 21102, and executing step 12.

Step 12, determining whether the execution condition in the condition cell of the operation flow table row 21102 is true.

If yes, acquiring and executing the content of the instruction cell of the operation flow table row 21102.

Otherwise, acquiring the next operation flow table row 21103, and executing step 13.

Step 13, determining whether the execution condition in the condition cell of the operation flow table row 21103 is true. If yes, acquiring and executing the content of the instruction cell of the operation flow table row 21103.

Step 14, determining whether the value of the target index variable "manipulator_state" matches the content of the index cell 6221 of the branch operation flow table row 41002. If yes, first acquiring the content of the branch state cell 6223, and setting the state of the indicator according to the content of the branch state cell 6223; then, acquiring the operation flow table 22000 embedded under the branch operation flow table row 41002, and executing step 15. Otherwise, executing step 18.

Step 15, acquiring the first operation flow table row 22001 of the operation flow table 22000, and determining whether the execution condition in the condition cell of the operation flow table row 22001 is true. If yes, acquiring and executing the content of the instruction cell of the operation flow table row 22001, then further acquiring the lower-level operation flow table 22100 embedded under the operation flow table row 22001, and executing step 16.

Step 16, acquiring the first operation flow table row 22101 of the operation flow table 22100, and determining whether the execution condition in the condition cell of the operation flow table row 22101 is true. If yes, acquiring and executing the content of the instruction cell of the operation flow table row 22101. Otherwise, acquiring the next operation flow table row 22102, and executing step 17.

Step 17, determining whether the execution condition in the condition cell of the operation flow table row 22102 is true. If yes, acquiring and executing the content of the instruction cell of the operation flow table row 22102.

Step 18, determining whether the value of the target index variable "manipulator_state" matches the content of the index cell 6231 of the branch operation flow table row 41003. If yes, acquiring the content of the branch state cell 6233, and setting the state of the indicator according to the content of the branch state cell 6233, otherwise, executing step 19.

Step 19, determining whether the value of the target index variable "manipulator_state" matches the content of the index cell 6241 of the branch operation flow table row 41004. If yes, first acquiring the content of the branch state cell 6243, and setting the state of the indicator according to the content of the branch state cell 6243; then, acquiring the operation flow table 24000 embedded under the branch operation flow table row 41004, and executing step 20, otherwise, executing step 21.

Step 20, determining whether the execution condition in the condition cell of the operation flow table row 24001 is true. If yes, acquiring and executing the content of the instruction cell of the operation flow table row 24001.

Step 21, determining whether the value of the target index variable "manipulator_state" matches the content of the index cell 6251 of the branch operation flow table row 41005. If yes, first acquiring the content of the branch state cell 6253, and setting the state of the indicator according to the content of the branch state cell 6253. Then, acquiring the operation flow table 25000 embedded under the branch operation flow table row 41005, and executing step 22. Otherwise, executing step 25.

Step 22, acquiring the first operation flow table row 25001 of the operation flow table 25000, and determining whether the execution condition in the condition cell of the operation flow table row 25001 is true. If yes, acquiring and executing the content of the instruction cell of the operation flow table row 25001, then further acquiring the operation flow table 25100 embedded under the operation flow table row 25001, and executing step 23.

Step 23, acquiring the first operation flow table row 25101 of the operation flow table 25100, and determining whether the execution condition in the condition cell of the operation flow table row 25101 is true. If yes, acquiring and executing the content of the instruction cell of the operation flow table row 25101, otherwise, acquiring the next operation flow table row 25102, and executing step 24.

Step 24, determining whether the execution condition in the condition cell of the operation flow table row 25102 is true. If yes, acquiring and executing the content of the instruction cell of the operation flow table row 25102.

Step 25, determining whether the value of the target index variable "manipulator_state" matches the content of the index cell 6261 of the branch operation flow table row 41006. If yes, acquiring the content of the branch state cell 6263, and setting the state of the indicator according to the content of the branch state cell 6263.

Step 26, acquiring the first operation flow table row 50001 of the operation flow table 50000, the execution condition in the condition cell of the operation flow table row 50001 is always true, therefore, executing the content of the instruction cell of the operation flow table row 50001 immediately; the content of the instruction cell is a branch switching instruction, therefore, acquiring the branch operation flow table 51000 embedded under the operation flow table row 50001, and determining whether the value of target index variable "machine_tool_state" matches the content of the index cell 6311 of the branch operation flow table row 51001. If yes, acquiring the operation flow table 31000 embedded under the branch operation flow table row 51001, and executing step 27, otherwise, executing step 33.

Step 27, acquiring the first operation flow table row 31001 of the operation flow table 31000, and determining whether the execution condition in the condition cell of the operation flow table row 31001 is true. If yes, acquiring and executing the content of the instruction cell of the operation flow table row 31001, then further acquiring the lower-level operation flow table 31100 embedded under the operation flow table row 31001, and executing step 28.

Step 28, acquiring the first operation flow table row 31101 of the operation flow table 31100, and determining whether the execution condition in the condition cell of the operation flow table row 31101 is true, If yes, acquiring and executing the content of the instruction cell of the operation flow table row 31101, then further acquiring the lower-level operation flow table 31110 embedded under the operation flow table row 31101, and executing step 29. Otherwise, acquiring the next operation flow table row 31102, and executing step 31.

Step 29, acquiring the first operation flow table row 31111 of the operation flow table 31110, and determining whether the execution condition in the condition cell of the operation flow table row 31111 is true. If yes, acquiring and executing the content of the instruction cell of the operation flow table row 31111, otherwise, acquiring the next operation flow table row 31112, and executing step 30.

Step 30, determining whether the execution condition in the condition cell of the operation flow table row 31112 is true. If yes, acquiring and executing the content of the instruction cell of the operation flow table row 31112.

Step 31, determining whether the execution condition in the condition cell of the operation flow table row 31102 is true. If yes, acquiring and executing the content of the instruction cell of the operation flow table row 31102, otherwise, acquiring the next operation flow table row 31103, and executing step 32.

Step 32, determining whether the execution condition in the condition cell of the operation flow table row 31103 is true. If yes, acquiring and executing the content of the instruction cell of the operation flow table row 31103.

Step 33, determining whether the value of the target index variable "machine_tool_state" matches the content of the index cell 6321 of the branch operation flow table row 51002. If yes, acquiring the operation flow table 32000 embedded under the branch operation flow table row 51002, and executing step 34, otherwise, executing step 35.

Step 34, acquiring the first operation flow table row 32001 of the operation flow table 32000, and determining whether the execution condition in the condition cell of the operation flow table row 32001 is true. If yes, acquiring and executing the content of the instruction cell of the operation flow table row 32001.

Step 35, determining whether the value of the target index variable "machine_tool_state" matches the content of the index cell 6331 of the branch operation flow table row 51003. If yes, acquiring the operation flow table 33000 embedded under the branch operation flow table row 51003, and executing step 36, otherwise, executing step 37.

Step 36, acquiring the first operation flow table row 33001 of the operation flow table 33000, and determining whether the execution condition in the condition cell of the operation flow table row 33001 is true. If yes, acquiring and executing the content of the instruction cell of the operation flow table row 33001.

Step 37, determining whether the value of the target index variable "machine_tool_state" matches the content of the index cell 6341 of the branch operation flow table row 51004. If yes, acquiring the operation flow table 34000 embedded under the branch operation flow table row 51004, and executing step 38, otherwise, executing step 39.

Step 38, acquiring the first operation flow table row 34001 of the operation flow table 34000, and determining whether the execution condition in the condition cell of the operation flow table row 34001 is true. If yes, acquiring and executing the content of the instruction cell of the operation flow table row 34001.

Step 39, determining whether the value of the target index variable "machine_tool_state" matches the content of the index cell 6351 of the branch operation flow table row 51005. If yes, acquiring the operation flow table 35000 embedded under the branch operation flow table row 51005, and executing step 40.

Step 40, acquiring the first operation flow table row 35001 of the operation flow table 35000, and determining whether the execution condition in the condition cell of the operation flow table row 35001 is true. If yes, acquiring and executing the content of the instruction cell of the operation flow table row 35001.

By the aforementioned steps 1 to 40, the specific execution process of the operation flow table corresponding to the automated production system of the present embodiment by the method for executing operation flow according to operation flow table is described.

According to steps 1 to 40, and compared to embodiment 1, for the method for executing operation flow according to operation flow table of the present embodiment, after processing the current operation flow table row by steps C11 to C12 which is identical to steps S11 to S12, it is also necessary to judge whether the operation instruction in the instruction cell is a branch switching instruction. As mentioned in step 9, the content of the instruction cell of the operation flow table row 40001 is a branch switching instruction, therefore, acquiring the branch operation flow table 41000 embedded under the operation flow table row 40001, and determining whether the value of the target index variable "manipulator_state" matches the content of the index cell 6211 of the branch operation flow table row 41001, and if so, first acquiring the content of the branch state cell 6213. Therefore, this procedure is equivalent to acquiring operation instruction in instruction cell of the current operation flow table row, and judging whether the operation instruction is branch switching instruction, if it is judged to be yes, acquiring the branch operation flow table corresponding to the branch switching instruction embedded under the current operation flow table row, and acquiring branch operation flow table row in which branch index value of the index cell is consistent with value of the target index variable from the branch operation flow table rows, further, acquiring the first operation flow table row of the sub-operation flow table embedded under the branch operation flow table row as current operation flow table row, and return to step C12, if it is judged to be no, executing the operation instruction (step C13).

Next, in step 9, further acquiring the operation flow table 21000 embedded under the branch operation flow table row 41001, and executing step 10. This is equivalent to judging whether there is the branch operation flow table embedded under the current operation flow table row, if it is judged to be yes, executing the branch operation flow table until the branch operation flow table has been executed (step C14). After the processing of step C14 is completed, traversing the operation flow table rows by step C15 which is identical to step B15.

The operation flow table and the branch operation flow table obtained by the aforementioned procedure can be stored and retrieved in the form of databases. These databases comprises, but are not limited to, relational databases, XML databases, and object-oriented databases. Also, the operation flow table and the branch operation flow table can be rendered and/set up in accordance with the present scheme by spreadsheets such as HTML web pages and Excel™. Further, the operation flow table and the branch operation flow table stored in database can be accessed by executing a computer program implemented according to the solution of the present invention on a computer system comprising a memory and a processor for presenting, setting and/executing the flow steps of the operation flow. In some other embodiments, the computer system further comprises I/O ports for connecting external sensors and actuators for manipulating physical devices such as machine tool and manipulator. The composition of the aforementioned databases, spreadsheets, computer system, sensors and actuators are known, therefore need not be described further.

The aforementioned embodiments are only used to illustrate the specific implementation forms of the present invention, and the present invention is not limited to the description scope of the aforementioned embodiments. Any changes or substitutions that can be easily thought of by those skilled in the art within the technical scope disclosed by the present invention should be covered with the protection scope of the claims of the present invention.

For example, in the present invention, the presentation form of the relationship between the branch operation flow table row and the upper or lower levels of the operation flow table is not limited to the forms shown in FIGS. 10 to 11. In other solutions of the present invention, refer to FIG. 12, the branch operation flow table 51000 can be set on the left side of the operation flow table 50000, and each branch operation flow table row of the branch operation flow table 51000 is aligned with the associated operation flow table to the right of it by row. Although the branch operation flow table row is positioned at the left side rather than upper side of the operation flow table, the relationship between the two is still a subordinate relationship. That is: the operation flow table and the branch operation flow table described in FIGS. 11 and 12 are logically consistent. Therefore, the two different view forms as shown in FIGS. 11 and 12 can be switched as needed. In this way, the display space of the screen can be used more efficiently, the complex operation flow is easier to browse and edit, and the separation degree of different types of flow steps are higher, which is conducive to discovering detailed differences between operation flows and timely detection of program errors.

Further, refer to FIG. 12, for a plurality of continuous, mutually exclusive branch operation flows, a solid circular symbol can be set to the left side of the content of the condition cell of the operation flow table row corresponding to the first branch operation flow, and a hollow circular symbol can be set to left side of the content of the condition cell of the operation flow table row corresponding to other mutually exclusive branch operation flows, thereby reflecting mutually exclusive relationship between these branch operation flows in format.

What is claimed is:

1. A method for tabular processing of operation flow, used for processing an operation flow comprising a plurality of flow steps, comprising:

generating an operation flow table;

sequentially acquiring the plurality of flow steps of the operation flow and sequentially determining operation flow types corresponding to each of the plurality of flow steps in the operation flow;

combining, according to a predetermined flow step sequence, continuous flow steps in the operation flow into at least one flow step sequence corresponding to the operation flow types;

sequentially acquiring a flow step sequence from the operation flow, according to the operation flow type of the flow step sequence, based on a predetermined row generation rule corresponding to said at least one flow step sequence having the operation flow types;

sequentially generating, in the operation flow table, operation flow table rows corresponding to the flow step sequence;

determining whether the plurality of flow steps have all been acquired, obtaining and outputting the operation flow table in response to a determination that the plurality of flow steps have been acquired, otherwise sequentially acquiring the plurality of flow steps of the operation flow;

wherein the operation flow table comprises a condition column and an instruction column, each of the operation flow table rows comprises a condition cell positioned at the condition column and an instruction cell positioned at the instruction column;

wherein the condition cell is at least used for adding a first flow step to execute a determination in the operation flow and taking the first flow step as an execution condition corresponding to the instruction cell in a same operation flow table row;

wherein the instruction cell is at least used for adding a second flow step to execute an operation in the operation flow as an operation instruction, the operation flow types comprise at least an instruction type operation flow and a conditional branch operation flow, the instruction type operation flow comprises at least one continuous flow step as the operation instruction, a flow step combination rule for the corresponding instruction type operation flow is combining said at least one continuous flow step into an operation instruction type flow step sequence;

wherein the conditional branch operation flow comprises at least one branch operation flow and mutually exclusive execution conditions corresponding to each of the branch operation flow, continuous flow steps in said at least one branch operation flow are combined into at least one sub-flow step sequence corresponding to the operation flow type;

wherein if the first sub-flow step sequence is an instruction type flow step sequence, sequentially add each flow step in said at least one sub-flow step sequence as an operation instruction to the instruction cell of the operation flow table row of a corresponding branch operation flow;

wherein if the sub-flow step sequence is a conditional branch type flow step sequence, generate a sub-operation flow table corresponding to the branch operation flow, embed the sub-operation flow table hierarchically under the operation flow table rows corresponding to the branch operation flow, and sequentially generate operation flow table rows corresponding to the sub-flow step sequence in the sub-operation flow table based on the predetermined row generation rule corresponding to the conditional branch type flow step sequence; and wherein if the sub-flow step sequence is an operation instruction type flow step sequence and is not the conditional branch type flow step sequence, generate operation flow table rows in the sub-operation flow table according to the predetermined row generation rule corresponding to the operation instruction type flow step sequence.

2. The method of claim 1, wherein the predetermined row generation rule corresponding to the operation instruction type flow step sequence comprises: sequentially generating an operation flow table row as a current operation flow table row in the operation flow table; adding a true value as an execution condition to the condition cell of the current operation flow table row; sequentially acquiring the flow steps in the corresponding operation instruction type flow step sequence; and adding the flow steps to the instruction cell of the current operation flow table row.

3. The method of claim 2, wherein the flow step combination rule for the conditional branch operation flow combines the branch operation flow in the conditional branch operation flow and the execution condition corresponding to the branch operation flow into a conditional branch type flow step sequence; and wherein the predetermined row generation rule corresponding to the conditional branch type flow step sequence comprises:

sequentially generating corresponding operation flow table rows in the operation flow table according to the conditional branch type flow step sequence;

adding the execution conditions corresponding to the conditional branch type flow step sequence to the condition cell of the operation flow table rows;

setting generated operation flow table rows to be mutually exclusive; and for the conditional branch type flow step sequence, sequentially acquiring the flow steps in the branch operation flow and sequentially determining the corresponding operation flow type corresponding to each of the flow steps in the corresponding branch operation flow, and combining the continuous flow steps in the conditional branch type flow step sequence into at least one sub-flow step sequence having corresponding operation flow type according to a predetermined flow step sequence combination rule.

4. The method of claim 2, wherein the operation flow type further comprises a switching branch operation flow, the switching branch operation flow comprises a plurality of branch operation flows, a branch switching instruction for switching the branch operation flow and mutually exclusive branch index conditions corresponding to the plurality of branch operation flows; wherein the flow step combination rule for the switching branch operation flow combines each branch operation flow included in the switching branch operation flow and a corresponding branch index condition into a switching branch type flow step sequence; and wherein the predetermined row generation rule corresponding to the switching branch type flow step sequence comprises:

taking the operation flow table row generated according to the operation instruction type flow step sequence as a current operation flow table row if the continuous flow steps before the flow steps of the corresponding branch switching instruction belong to the operation instruction type flow step sequence;

adding the flow steps corresponding to the branch switching instruction as an operation instruction to the instruction cell of the current operation flow table row;

generating a branch operation flow table corresponding to the switching branch type flow step sequence, the branch operation flow table is hierarchically embedded under the current operation flow table row, and the branch operation flow table comprises index columns;

for each of the branch operation flow, sequentially generating, in the branch operation flow table, branch operation flow table rows comprising index cells positioned at the index columns, adding the branch index conditions to the index cells, and generates a sub-operation flow table hierarchically embedded under the branch operation flow table row;

for each of the sub-operation flow tables, sequentially acquiring the flow steps in the corresponding branch operation flow, and sequentially determining the operation flow type corresponding to each of the flow steps in the corresponding branch operation flow, respectively combining the continuous flow steps in the branch operation flow into at least one sub-flow step sequence having the corresponding operation flow type according to a predetermined flow step sequence combination rule, and sequentially generating operation flow table rows corresponding to the sub-flow step sequence in the sub-operation flow table based on the predetermined row generation rule corresponding to the type of the flow step sequence;

wherein the branch switching instruction is used to determine the corresponding branch index condition according to the target index variable; and wherein switching execution of operation flow table rows having the corresponding branch index value.

5. The method of claim 4, wherein the branch operation flow table further comprises a switching target column; and wherein the branch operation flow table row further comprises a switching target cell positioned at the switching target column, the switching target cell is added with the flow step to set a value of the target index variable as a switching instruction.

6. The method of claim 4, wherein the branch operation flow table further comprises a branch state column; and wherein the operation flow table row further comprises a branch state cell positioned at the branch state column, the branch state cell is added with an operation instruction for assigning a state variable corresponding to the branch operation flow.

7. The method of claim 2, wherein the operation flow types further comprise a loop operation flow, the loop operation flow comprises an execution condition and a loop sub-flow; wherein the operation flow table further comprises a loop attribute column, the operation flow table row comprises a loop attribute cell positioned at the loop attribute column; wherein the flow step combination rule for the loop operation flow combines the execution condition of the loop operation flow and the loop sub-flow into a loop operation flow step sequence; and wherein the predetermined row generation rule corresponding to the loop operation flow step sequence comprising:

sequentially generating an operation flow table row as a current operation flow table row in the operation flow table;

adding a current flow step as an execution condition to the condition cell of a current operation flow table row and adding a loop execution attribute in the loop attribute cell;

sequentially acquiring the flow steps in the loop sub-flow, sequentially determining an operation flow type corresponding to each of the flow steps in the loop sub-flow, and combining the continuous flow steps in the loop operation flow step sequence into sub-flow step sequence having the corresponding operation flow type according to the predetermined flow step sequence combination rule;

adding the flow steps in the sub-flow step sequence as an operation instruction to the instruction cell of the operation flow table row of the corresponding branch operation flow if the first sub-flow step sequence is an operation instruction type flow step sequence;

if the sub-flow step sequence is a conditional branch type flow step sequence, generating a sub-operation flow table corresponding to the corresponding branch operation flow and sequentially generating operation flow table rows corresponding to the sub-flow step sequence in the sub-operation flow table based on the predetermined row generation rule corresponding to the conditional branch type flow step sequence; and hierarchically embedding the sub-operation flow table under the operation flow table row corresponding to the branch operation flow.

8. A method for executing an operation flow according to an operation flow table, used for executing the operation flow according to the operation flow table obtained by a method for tabular processing of the operation flow, the method for tabular processing of the operation flow comprising:

generating an operation flow table;

sequentially acquiring the plurality of flow steps of the operation flow and sequentially determining operation flow types corresponding to each of the plurality of flow steps in the operation flow;

combining, according to a predetermined flow step sequence, continuous flow steps in the operation flow into at least one flow step sequence corresponding to the operation flow types;

sequentially acquiring a flow step sequence from the operation flow, according to the operation flow type of the flow step sequence, based on a predetermined row generation rule corresponding to said at least one flow step sequence having the operation flow types;

sequentially generating, in the operation flow table, operation flow table rows corresponding to the flow step sequence;

determining whether the plurality of flow steps have all been acquired, obtaining and outputting the operation flow table in response to a determination that the plurality of flow steps have been acquired, otherwise sequentially acquiring the plurality of flow steps of the operation flow;

wherein the operation flow table comprises a condition column and an instruction column, each of the operation flow table rows comprises a condition cell positioned at the condition column and an instruction cell positioned at the instruction column;

wherein the condition cell is at least used for adding a first flow step to execute a determination in the operation flow and taking the first flow step as an execution condition corresponding to the instruction cell in a same operation flow table row;

wherein the instruction cell is at least used for adding a second flow step to execute an operation in the operation flow as an operation instruction, the operation flow types comprise at least an instruction type operation flow and a conditional branch operation flow, the instruction type operation flow comprises at least one continuous flow step as the operation instruction, a flow step combination rule for the corresponding instruction type operation flow is combining said at least one continuous flow step into an operation instruction type flow step sequence;

wherein the conditional branch operation flow comprises at least one branch operation flow and mutually exclusive execution conditions corresponding to each of the branch operation flow, continuous flow steps in said at least one branch operation flow are combined into at least one sub-flow step sequence corresponding to the operation flow type;

sequentially adding each flow step in said at least one sub-flow step sequence as an operation instruction to the instruction cell of the operation flow table row of a corresponding branch operation flow if the first sub-flow step sequence is an instruction type flow step sequence;

if the sub-flow step sequence is a conditional branch type flow step sequence, generating a sub-operation flow table corresponding to the branch operation flow, embedding the sub-operation flow table hierarchically under the operation flow table rows corresponding to the branch operation flow, and sequentially generating operation flow table rows corresponding to the sub-flow step sequence in the sub-operation flow table based on the predetermined row generation rule corresponding to the conditional branch type flow step sequence;

generate operation flow table rows in the sub-operation flow table according to the predetermined row generation rule corresponding to the operation instruction type flow step sequence if the sub-flow step sequence is an operation instruction type flow step sequence and is not the conditional branch type flow step sequence;

wherein the method for executing the operation flow of the instruction type operation flow according to the operation flow table comprises:

sequentially acquiring operation flow table rows from the operation flow table as a current operation flow table row;

determining whether a value of an execution condition of the condition cell of the current operation flow table row is true, returning to the step of sequentially acquiring the operation flow tables in response to a determination that the value of the exaction condition is not true;

acquiring and executing operation instructions in instruction cell of the current operation flow table row; and determining whether the plurality of flow steps in the operation flow table have all been executed, returning to the step of sequentially acquiring operation flow tables in response to a determination that all of the plurality of flow steps have not been executed, otherwise the operation flow has been executed.

9. The method of claim 8, wherein the method for tabular processing of operation flow further comprises the flow step combination rule for the conditional branch operation flow combining the branch operation flow in the conditional branch operation flow and the execution condition corresponding to the branch operation flow into a conditional branch type flow step sequence, the predetermined row generation rule corresponding to the conditional branch type flow step sequence comprises:

sequentially generating corresponding operation flow table rows in the operation flow table according to the conditional branch type flow step sequence;

adding the execution conditions corresponding to the conditional branch type flow step sequence to the condition cell of the operation flow table rows;

setting generated operation flow table rows to be mutually exclusive; and for the conditional branch type flow step sequence, sequentially acquiring the flow steps in the branch operation flow and sequentially determining the corresponding operation flow type corresponding to each of the flow steps in the corresponding branch operation flow, and combining the continuous flow steps in the conditional branch type flow step sequence into at least one sub-flow step sequence having corresponding operation flow type according to a predetermined flow step sequence combination rule; and wherein the method for executing the operation flow of the conditional branch operation flow according to operation flow table further comprises:

sequentially acquiring operation flow table rows from the operation flow table as a current operation flow table row;

determining whether a value of an execution condition of the condition cell of the current operation flow table row is true, returning to the step of sequentially acquiring the operation flow tables in response to a determination that the value of the exaction condition is not true;

acquiring and executing operation instructions in instruction cell of the current operation flow table row;

determining whether the sub-operation flow is embedded under the current operation flow table row, executing the sub-operation flow table until the sub-operation flow table is executed in response to a determination that the sub-operation flow is embedded under the current operation flow table; and determining whether the plurality of flow steps in the operation flow table have all been executed, returning to the step of determining whether the value of the execution condition of the condition cell of the current operation flow table row is true, otherwise acquiring a next operation flow table row whose execution condition is non-mutually exclusive with the execution condition in the condition cell of the current operation flow table row as a new current operation flow table row.

10. The method of claim 8, wherein the method for tabular processing of operation flow further comprises:

the operation flow type comprising a switching branch operation flow, the switching branch operation flow comprises a plurality of branch operation flows, a branch switching instruction for switching the branch operation flow and mutually exclusive branch index conditions corresponding to the branch operation flows;

the flow step combination rule for the switching branch operation flow combining each branch operation flow included in the switching branch operation flow and a corresponding branch index condition into a switching branch type flow step sequence;

the predetermined row generation rule corresponding to the switching branch type flow step sequence comprising:

taking the operation flow table row generated according to the operation instruction type flow step sequence as current operation flow table row if the continuous flow steps before the flow steps of the corresponding branch switching instruction belong to the operation instruction type flow step sequence;

adding the flow steps corresponding to the branch switching instruction as operation instruction to the instruction cell of the current operation flow table row;

generating a branch operation flow table corresponding to the switching branch type flow step sequence and hierarchically embedding the branch operation flow table under the current operation flow table row, the branch operation flow table comprising index columns;

for each of the branch operation flow, sequentially generating, in the branch operation flow table, branch operation flow table rows comprising index cells positioned at the index columns, and adding the branch index conditions to the index cells, meanwhile, generating sub-operation flow tables hierarchically embedded under the branch operation flow table row;

for each of the sub-operation flow tables, sequentially acquiring the flow steps in the corresponding branch operation flow, and sequentially determining operation flow type corresponding to each of the flow steps in the corresponding branch operation flow, respectively combining the continuous flow steps in the branch operation flow into at least one sub-flow step sequence having the corresponding operation flow type according to a predetermined flow step sequence combination rule, and further, and sequentially generating operation flow table rows corresponding to the sub-flow step sequence in the sub-operation flow table based on the predetermined row generation rule corresponding to the type of the flow step sequence;

utilizing the branch switching instruction to determine the corresponding branch index condition according to the target index variable, and switching execution of operation flow table rows having the corresponding branch index value;

the method for executing operation flow of the switching branch operation flow according to operation flow table further comprises:

sequentially acquiring operation flow table rows from the operation flow table as a current operation flow table row;

determining whether a value of an execution condition in condition cell of the current operation flow table row is true, returning to the step of sequentially acquiring the operation flow tables in response to a determination that the value of the exaction condition is not true;

acquiring operation instruction in the instruction cell of the current operation flow table row;

determining whether the operation instruction is a branch switching instruction, executing the operation instruction in response to a determination that the operation is not the branch switching instruction, otherwise acquiring the branch operation flow table corresponding to the branch switching instruction embedded under the current operation flow table row, acquiring branch operation flow table row in which branch index value of the index cell is consistent with value of the target index variable from the branch operation flow table rows, acquiring the first operation flow table row of the sub-operation flow table embedded under the branch operation flow table row as current operation flow table row, and returning to the step of determining whether the value of the execution condition in condition cell of the current operation flow table row is true;

determining whether the branch operation flow table is embedded under the current operation flow table row, executing the branch operation flow table until the branch operation flow table has been executed in response to a determination that the branch operation flow table is embedded under the current operation flow raw; and determining whether the plurality of the flow steps in the operation flow table have all been executed, returning to the step of determining whether the value of the execution condition in condition cell of the current operation flow table row is true in response to a determination that the plurality of flow steps in the operation flow table have all been executed, otherwise acquiring a next operation flow table row whose execution condition is non-mutually exclusive with the execution condition in condition cell of the current operation flow table row as a new current operation flow table row.

11. The method of claim 10, wherein the method for tabular processing of operation flow of the switching branch operation flow further comprises:

the branch operation flow table further comprising a switching target column, the branch operation flow table row further comprising a switching target cell positioned at the switching target column;

adding the switching target cell with the flow step to set a value of the target index variable as a switching instruction;

the method for executing the operation flow of the switching branch operation flow according to operation flow table further comprises, in the step of acquiring the operation instruction in the instruction cell of the current operation flow table row, acquiring the switching instruction of the switching target cell and executing the switching instruction.

12. The method of claim 10, wherein the method for tabular processing of operation flow of the switching branch operation flow further comprises:

the branch operation flow table further comprising a branch state column, the operation flow table row further comprising a branch state cell positioned at the branch state column;

adding the branch state cell with an operation instruction to assign a value to a state variable corresponding to the branch operation flow; and wherein, in the step of acquiring the operation instruction in the instruction cell of the current operation flow table row, acquiring the operation instruction in the branch state cell and assigning a value to the state variable when acquiring the branch operation flow table row in which the branch index value of the index cell is consistent with the value of the target index variable.

13. The method of claim 8, wherein the method for tabular processing of operation flow further comprises:

the operation flow type further comprising a loop operation flow, the loop operation flow comprising an execution condition and a loop sub-flow;

the operation flow table further comprising a loop attribute column, the operation flow table row comprising a loop attribute cell positioned at the loop attribute column;

the flow step combination rule for loop operation flow combining an execution condition of the loop operation flow and the loop sub-flow into a loop operation flow step sequence;

the predetermined row generation rule corresponding to the loop operation flow step sequence comprising:

sequentially generating an operation flow table row as a current operation flow table row in the operation flow table;

adding the current flow step as then execution condition to the condition cell of the current operation flow table row, and adding a loop execution attribute in the loop attribute cell;

sequentially acquiring the flow steps in the loop sub-flow, sequentially determining operation flow type corresponding to each of the flow steps in the loop sub-flow, and combining the continuous flow steps in the loop operation flow step sequence into sub-flow step sequence having the corresponding operation flow type, adding the flow steps in the sub-flow step sequence as operation instruction to the instruction cell of the operation flow table row of the corresponding branch operation flow if the first sub-flow step sequence is an operation instruction type flow step sequence;

if the sub-flow step sequence is a conditional branch type flow step sequence, generating a sub-operation flow table corresponding to the corresponding branch operation flow and sequentially generating operation flow table rows corresponding to the sub-flow step sequence in the sub-operation flow table based on the predetermined row generation rule corresponding to the conditional branch type flow step sequence;

hierarchically embedding the sub-operation flow table under the operation flow table row corresponding to the branch operation flow;

the method for executing the operation flow of the loop operation flow for operation flow table further comprises:

sequentially acquiring an operation flow table row from the operation flow table as a current operation flow table row;

determining whether a value of an execution condition of the current operation flow table row is true, returning to the step of sequentially acquiring the operation flow table row in response to the determination that the value of the execution condition of the current operation flow table is not true;

acquiring the operation instruction in the instruction cell of the current operation flow table row and executing the operation instruction;

determining whether the sub-operation flow table is embedded under the current operation flow table row, executing the sub-operation flow table until the sub-operation flow table has been executed in response to a determination that the sub-operation flow table is embedded under the current operation flow table row;

determining whether the loop attribute cell of the current operation flow table row has a loop execution attribute, returning to step of determining whether the value of the execution condition of the current operation flow table row is true in response to a determination that the loop attribute cell of the current operation flow table row has the loop execution attribute to repeat execution of the current operation flow table row; and determining whether the plurality of flow steps in the operation flow table have all been executed, ending the execution of the operation flow in response to a determination that all of the plurality of flow steps have been executed, otherwise acquiring a next operation flow table row whose execution condition is non-mutually exclusive with the execution condition in the condition cell of the current operation flow table row as a new current operation flow table row and returning to step of determining whether the value of the execution condition of the current operation flow table row is true.

14. A device for tabular processing of operation flow, comprising a memory to store computer programs; and a processor executing the computer programs to implement the method for tabular processing of operation flow of claim 1.

15. A device for executing operation flow according to operation flow table, comprising a memory to store computer programs; and a processor executing the computer programs to implement the method for tabular processing of operation flow of claim 8.

* * * * *